(12) United States Patent
Kaminaga et al.

(10) Patent No.: US 7,086,087 B1
(45) Date of Patent: Aug. 1, 2006

(54) INFORMATION PROCESSING DEVICE, CARD DEVICE AND INFORMATION PROCESSING SYSTEM

(75) Inventors: Masahiro Kaminaga, Sakado (JP); Takashi Endo, Musashimurayama (JP); Masaru Ohki, Tokorozawa (JP); Takashi Tsukamoto, Kodaira (JP); Hiroshi Watase, Kodaira (JP); Chiaki Terauchi, Yokohama (JP); Kunihiko Nakada, Koganei (JP); Nobutaka Nagasaki, Iruma (JP); Satoshi Taira, Hino (JP); Yuuichirou Nariyoshi, Kodaira (JP); Yasuko Fukuzawa, Yokohama (JP)

(73) Assignees: Hitachi, Ltd., Tokyo (JP); Hitachi ULSI Systems Co., Ltd., Tokyo (JP)

( * ) Notice: Subject to any disclaimer, the term of this patent is extended or adjusted under 35 U.S.C. 154(b) by 832 days.

(21) Appl. No.: 09/599,005

(22) Filed: Jun. 22, 2000

(30) Foreign Application Priority Data

Jun. 24, 1999 (JP) ................................. 11-178750

(51) Int. Cl.
*H04L 9/00* (2006.01)
*H04N 7/167* (2006.01)

(52) U.S. Cl. ............................ 726/16; 726/34; 726/36; 713/162; 713/167; 713/170; 713/200; 380/201; 380/203; 380/205; 380/207; 380/220; 380/229; 380/239

(58) Field of Classification Search ................ 713/161, 713/168, 200, 162, 167, 170, 320, 340; 380/201, 380/202, 203, 204, 205, 207, 210, 229, 239
See application file for complete search history.

(56) References Cited

U.S. PATENT DOCUMENTS 4,503,287 A * 3/1985 Morris et al. .................. 380/45

(Continued)

FOREIGN PATENT DOCUMENTS

| EP | 0720098 | 7/1996 |
|---|---|---|
| EP | 9816883 | 4/1998 |
| WO | 9949416 | 9/1999 |

OTHER PUBLICATIONS

The Smart Card Handbook, 1997, John Wiley & Sons, pp. 261-267.

(Continued)

*Primary Examiner*—Kambiz Zand
(74) *Attorney, Agent, or Firm*—Mattingly, Stanger, Malur & Brundidge, P.C.

(57) ABSTRACT

It is a technological object of the present invention to provide an information processing device, a card and a card system that have a high level of security. In order to achieve the object described above, the present invention provides a data processing apparatus comprising at least a first information processing device and a second information processing device connected to the first information processing device by a signal line, the data processing apparatus having a means for changing power consumption on the signal line during transmission of a signal through the signal line in accordance with an actual state of the power consumption that would be observed when the means were not used. Furthermore, the present invention also provides another data processing apparatus comprising at least a first information processing device and a second information processing device connected to the first information processing device by a signal line wherein, between at least either the first information processing device or the second information processing device and the signal line, a signal from the first information processing device or the second information processing device can be encrypted and a signal received from the signal line can be decrypted. In addition, the present invention also provides a further data processing apparatus comprising at least an information processing device, an information memory device and a signal line connected at least to the information processing device wherein at least in an operation to store information into the information memory device, the information is encrypted, and information stored in the information memory device can be decrypted.

10 Claims, 33 Drawing Sheets

(1) id query
(2) id response

U.S. PATENT DOCUMENTS

| | | | |
|---|---|---|---|
| 4,916,333 A | | 4/1990 | Kowalski |
| 4,932,053 A | | 6/1990 | Fruhauf et al. |
| 5,029,207 A | * | 7/1991 | Gammie ............... 380/228 |
| 5,144,664 A | * | 9/1992 | Esserman et al. ........... 380/228 |
| 5,210,854 A | * | 5/1993 | Beaverton et al. .......... 717/174 |
| 5,432,850 A | * | 7/1995 | Rothenberg ............... 713/162 |
| 5,461,674 A | * | 10/1995 | Citta ............... 380/201 |
| 5,500,601 A | | 3/1996 | Lisart et al. |
| 5,991,877 A | * | 11/1999 | Luckenbaugh ............... 713/200 |
| 5,995,623 A | * | 11/1999 | Kawano et al. ............. 713/189 |
| 5,999,623 A | * | 12/1999 | Bowman et al. ........... 380/239 |
| 6,035,380 A | * | 3/2000 | Shelton et al. ............. 711/163 |
| 6,047,377 A | * | 4/2000 | Gong ............... 713/201 |
| 6,073,252 A | * | 6/2000 | Moyer et al. ............... 714/7 |
| 6,163,844 A | * | 12/2000 | Duncan et al. ............. 713/201 |
| 6,173,404 B1 | * | 1/2001 | Colburn et al. ............. 713/200 |
| 6,289,462 B1 | * | 9/2001 | McNabb et al. ............. 713/201 |
| 6,292,900 B1 | * | 9/2001 | Ngo et al. ............. 713/200 |
| 6,295,604 B1 | * | 9/2001 | Callum ............... 713/160 |
| 6,317,832 B1 | * | 11/2001 | Everett et al. ............. 713/172 |
| 6,332,025 B1 | * | 12/2001 | Takahashi et al. ........... 380/281 |
| 6,654,889 B1 | * | 11/2003 | Trimberger ............... 713/191 |

OTHER PUBLICATIONS

Menkus B: "Two Important Data Encryption Structures Reported Broken in Record Times" EDPACS, Auerbach Publishers, NY, vol. 26, No. 7, Jan. 1999, pp. 15-18.

S. Chari et al "Towards Sound Approaches to Counteract Power-Analysis Attacks" Advances in Cryptology, Crypto 1999, 19th Annual International Cryptology Conf. Santa Barbara, CA Aug. 15-19, 1999, Proceedings, Lecture Notes in Computer Science vol. 1666, Berlin: Springer, pp. 398-412.

* cited by examiner (1) id query
(2) id response

FIG.7A state of signal line 1 1 | 0 0 | 1 | 0 | 1 | 0 0 0 | 1 | 0 0 | 1 | 0 0 state of capacitor 0 0 | 1 1 | 0 | 1 | 0 | 1 1 1 | 0 | 1 1 | 0 | 1 1

FIG.7B state of signal line

0 | 1 1 | 0 | 1 | 0 | 1 | 0 0 | 1 | 0 0 | 1 | 0 0 state of capacitor 1 1 | 0 0 0 0 0 0 | 1 1 1 | 0 0 0 | 1

INFORMATION PROCESSING DEVICE, CARD DEVICE AND INFORMATION PROCESSING SYSTEM

BACKGROUND OF THE INVENTION

The present invention relates to an information memory device and a data processing apparatus which offer a high level of security. In addition, the present invention relates to a card and an information processing system. In particular, the card is typically represented by an IC card (smart card) which includes an embedded single-chip CPU (Central Processing Unit) serving as an information processing device.

In a microcomputer chip offering a high level of security such as the representative IC card, data to be kept confidential may be encrypted and decrypted by using a key for encryption. The key for encryption is a kind of secret information or information which can not be rewritten as one pleases.

As shown in FIG. 1, the basic configuration of a microcomputer comprises a central processing unit 8001, a memory device 8002 and a signal line 8003 serving as a path used by a variety of components for exchanging information. The central processing unit 8001 carries out logic and arithmetic processing. The memory device 8002 is implemented typically by using memories such as a ROM (Read Only Memory), a RAM (Random Access Memory), an EEPROM (Electrical Erasable Programmable Read Only Memory) and a FRAM (Ferromagnetic Random Access Memory). A ROM is a memory, data stored in which can not be changed. A ROM is used mainly for storing a program. On the other hand, a RAM is a memory, data stored in which can be rewritten with a high degree of freedom. When power supplied to the RAM is turned off, however, data stored therein is deleted. Thus, when power supplied to an apparatus employing the microcomputer is interrupted, data stored in the RAM disappears. On the other hand, an EEPROM and a FRAM are each a memory capable of holding data stored therein even if power supplied thereto is cut off.

A typical main unit of a computer provided in a contact IC card is shown in FIG. 2. The figure shows only a pin layout of a semiconductor-device chip 51. The main unit of the computer is a chip called a COT (Chip on Tape) placed at the center of the card. It should be noted, however, that the main unit is generally called a module. The layout of pins shown in the figure is a typical pin layout. That is to say, the IC card has a Vcc (power supply) pin, a GND (ground) pin, an RST (reset) pin, an I/O (input/output) pin and a CLK (clock) pin. The chip is driven to operate by signals supplied to the pins from typically a terminal. It should be noted that, as the terminal itself, an ordinary card system capable of sufficiently providing necessary functions can be employed. The amount of power consumed by the chip can be measured by observing signals at the Vcc and GND pins. The measurement of the power consumption is described in Section 8.5.1.1 Passive Protective Mechanisms on Page 263 of a reference with a title of "Smart Card Handbook" authored by W. Rankle and W. Effing and published by John Wiley & Sons in the year of 1997.

SUMMARY OF THE INVENTION

It is an object of the present invention to provide a data processing apparatus offering a high level of security. Representatives of such a data processing apparatus include a computer system, in particular a microcomputer system.

It is another object of the present invention to provide a card which has a high level of security and is represented by an IC card (or a smart card) and to provide a card system.

It is a further object of the present invention to lower the degree of relationship between data processing in a microcomputer chip and the power consumption thereof. In particular, an IC card is used for storing important information and for processing a signal on the card. This is because a program and important information are hermetically sealed in the chip of the IC card. A process to decode encryption in an IC card was considered to have the same degree of complexity as an algorithm for decoding the encryption. By observing the amount of power consumed by an IC card in an encryption process and analyzing the state of power consumption, it becomes possible to suggest a possible capability of inferring the substance of an encryption process and a key for encryption. A technique for observing power consumption is regarded as a technique easier than a method adopted in an algorithm to directly decode the encryption itself.

Thus, if the relationship between the power consumption and the chip processing is loose, it becomes difficult to infer processing in the chip of the IC card and the key for encryption from an observed waveform of the power consumption. A point of interest in the present invention is reduction of the degree of relationship between the power consumption of the microcomputer and the processed data. As a principal means for reducing the degree of such relationship, the amounts of electric charge accumulated into signal lines are made uniform. Examples of signal lines are signal buses, bit lines of a RAM and word lines of the RAM which are one cause of variations in power consumption. As an alternative means, data is deliberately made different from the original data.

The following description begins with an explanation of a possibility to decode a processing signal by observation of power consumption which serves as a background of the present invention. If this explanation is understood, the gist of the present invention will also be comprehended with ease.

An essential part of the measurement of power consumption described above is explained as follows. A CMOS (Complementary Metal Oxide Semiconductor) gate circuit of a chip for an IC card consumes power when the output of the circuit changes from 0 to 1 or 1 to 0. In particular, since a signal line has a large wiring capacitance, the gate circuit consumes a large power for electrically charging the capacitance when the data value of the bus of the line signal changes from 0 to 1 or 1 to 0. It is quite within the bounds of possibility that, by observation of the amount of power consumed in this way, the substance of information processing can be inferred.

FIG. 4 is a diagram showing waveforms of the power consumed in 1 cycle of a chip for an IC card. To be more specific, the figure shows waveforms 1101 and 1102 which differ in dependence on values of data being processed. To put it in detail, the difference between the observed waveforms is generated in dependence on data flowing through a signal line and data being processed by the central processing unit.

At the present time, techniques of controlling a signal line of a chip for an IC card are classified into two major categories, namely, a signal line static control method and a signal line precharge control method.

In the signal line static control method, data on the line is not cleared. According to the signal line precharge control method, on the other hand, data is cleared each time a piece of processing is completed. Thus, in this method, data is asserted on a signal line after all data on the signal line is cleared by being set at 1 or reset to 0. It should be noted that, in the case of a positive-logic circuit, a signal line is precharged to a signal value of 1. In the case of a negative-logic circuit, on the other hand, a signal line is precharged to a signal value of 0. Nevertheless, there is no difference in operation essentials between the positive-logic and negative-logic circuits.

As is obvious from the basic operations of the signal line static control method and the signal line precharge control method, the difference between the control methods results in a difference between the waveforms of the consumed powers. In other words, the difference between the waveforms of the consumed powers can be used for forming a judgment as to which control method is adopted. If the control method of the signal line is known, the key for encryption can be identified. In this case, by changing the data to be processed and observing the power consumption, it becomes possible to observe effects of the key for encryption on bit values. In addition, by analyzing the waveforms of consumed powers, it becomes possible to infer the key for encryption.

First of all, concepts used as the basis of the present invention are explained. Then, some principal embodiments of the present invention disclosed in this specification of the application for a patent are described. The concepts used as the basis of the present invention can be classified into the following four major methods.

1. Making a Sum of Amounts of Consumed Powers Including that Consumed as a Current Flowing through a Signal Line Uniform This first method is adopted to reduce differences in power consumption caused typically by different techniques to drive a memory and by the substances of data in a data processing apparatus or the like. To put it concretely, with this method, in addition to power consumption of a signal line in a data processing apparatus such as a microcomputer, other power is consumed typically by an electrical charging & discharging device in a simple way separately from the power consumption in order to reduce differences in total power consumption of the signal line caused by different techniques to drive the memory and by the substances of data in a data processing apparatus. The total power consumption is the sum of the power consumption of the signal line and the power consumption of the electrical charging & discharging device.

2. Encryption of Data on a Signal Line

With this second method, data transmitted through a signal line in a data processing apparatus or the like is encoded, and power consumption for the signal line is disturbed. That is to say, when data is asserted on a signal line in a microcomputer, for example, the data is encrypted. When the data is received by a receiver, the data is decrypted. In this way, the power consumption for the signal line can be disturbed.

3. Encryption of Stored Information

According to this third method, encrypted data is stored in an information memory device of a data processing apparatus or the like. That is to say, encrypted data is stored in a memory device employed typically in a microcomputer. In an operation to process the data, the data is decrypted before being used. In this way, power consumption for a signal line is disturbed.

4. Changing Data Transfer Order

In this fourth method, an order in which data is transferred in a data processing apparatus or the like is changed. That is to say, when data stored in an information memory device employed in a microcomputer is asserted on a signal line to be transmitted, the order of transmission is changed in order to disturb power consumption for the signal line.

It should be noted that, if necessary, any combinations of the 4 methods provided by the present invention can be adopted. By adopting a combination of the 4 methods provided by the present invention, a high level of security can be assured more effectively in the semiconductor device. Some examples of such combinations are listed as follows.

(1) Method of encrypting data on a signal line while making the sum of the amount of power consumed as a current flowing through a signal line and the power consumption of the electrical charging & discharging device uniform.

(2) Method of encrypting stored information while making the sum of the amount of power consumed as a current flowing through a signal line and the power consumption of the electrical charging & discharging device uniform.

(3) Method of changing the order of transmission while making the sum of the amount of power consumed as a current flowing through a signal line and the power consumption of the electrical charging & discharging device uniform.

(4) Method of encrypting stored information while encrypting data on a signal line.

(5) Method of changing the order of transmission while encrypting data on a signal line.

(6) Method of changing the order of transmission while encrypting stored information.

In addition, it is also possible to adopt a combination of 3 or more methods. Examples of such combinations are listed as follows:

(7) Method of encrypting stored information and making the sum of the amount of power consumed as a current flowing through a signal line and the power consumption of the electrical charging & discharging device uniform while encrypting data on a signal line.

(8) Method of changing the order of transmission and making the sum of the amount of power consumed as a current flowing through a signal line and the power consumption of the electrical charging & discharging device uniform while encrypting data on a signal line.

(9) Method of changing the order of transmission and encrypting stored information while encrypting data on the line.

(10) Method of changing the order of transmission and making the sum of the amount of power consumed as a current flowing through a signal line and the power consumption of the electrical charging & discharging device uniform while encrypting stored information.

A typical combination of 4 methods is:

(11) Method of changing the order of transmission, making the sum of the amount of power consumed as a current flowing through a signal line and the power consumption of the electrical charging & discharging device uniform, encrypting stored information and encrypting data on a signal line.

The methods and the combinations listed above are explained in detail by focusing on the 4 basic methods.

1. Making a Sum of Amounts of Consumed Powers including that Consumed as a Current Flowing through a Signal Line Fixed As described above, the first concept of the present invention described in this specification of the application for a patent is adopted to reduce differences in power consumption caused typically by different techniques to drive the memory and by the substances of data.

According to this method, there is provided a means for consuming power corresponding to power consumption accompanying a transfer of digital data through a signal line in addition to power consumed as a current flowing through the signal line in a microcomputer cited earlier. An example of such a means is a means or a device simply for charging and discharging electric charge. Such an electrical charging & discharging device causes power consumption accompanying a transfer of digital data through a signal line in addition to power consumed as a current flowing through the signal line. In accordance with this method, a difference in power consumption is reduced to make the power consumption independent of a series of transmitted signals. That is to say, the sum of the amount of power consumed by the electrical charging & discharging device and the amount of power consumed in the microcomputer as a current flowing through the signal line is fixed. If the sum of the amount of power consumed by the charging & discharging device and the amount of power as a current flowing through any signal line of the memory device is fixed, it will be extremely difficult to recognize internal information even if the sum itself is known.

It should be noted that a means or a device for charging and discharging electric charge is referred to hereafter as an electrical charging & discharging device. As will be described below, the electrical charging & discharging device can be configured for example by using a dummy data line.

In a transfer of data through a signal line connecting two information processing devices embedded in a microcomputer implemented by an embodiment of the present invention based on the concept, the bits of a digital signal representing the data are inverted and supplied to the electrical charging & discharging device to produce a fixed sum of the amount of power consumed as a current flowing through the signal line and the amount of power consumed by the electrical charging & discharging device. Such a fixed sum can be achieved by driving a power consumption device by using a control signal generated by a control-signal generation device. In this way, since the sum of the amount of power consumed as a current flowing through the signal line and the amount of power consumed by the electrical charging & discharging device can be made invariable all the time. Thus, the degree of relationship between data asserted on a signal line and the power consumption of the microprocessor chip can be reduced.

It should be noted that, speaking in concrete terms, the two data processing units connected by the signal line can be any of a ROM, a PROM, an EPROM, an EEPROM, a RAM and an FRAM.

The following description explains an embodiment including a measure for keeping up with a difference in control technique adopted for a signal line. This is because, input bit data varies in dependence on the control technique adopted for a signal line.

In the so-called CMOS circuit, power is consumed in particular when a bit is inverted, that is, when data changes from 0 to 1 or from 1 to 0. Thus, power consumption for a signal line increases when a bit on the signal line is inverted. In order to solve this problem, the electrical charging & discharging device provided for a memory device in accordance with the present invention is designed to consume compensatory power in accordance with the number of bit inversions. In this way, the sum of the amount of power consumed as a current flowing through a signal line and the amount of power consumed by the electrical charging & discharging device can be made constant and, hence, the degree of relationship between data transmitted through a signal line and the amount of power consumed by the microcomputer can be lowered.

The number of bit inversions occurring on a signal line varies in dependence on the technique adopted for controlling the signal line. As described earlier, there are two techniques for controlling a signal line, namely, the signal line static control method and the signal line precharge control method which are explained as follows.

First of all, the signal line static control method is described. In this case, data is not cleared. That is to say, previous data remains on a signal line. In an actual apparatus, a signal line virtually has the same function as a capacitor. Thus, the phrase stating: "Data remains on a signal line" physically means that electric charge is left on the signal line. Therefore, by storing the value of data previously asserted on a signal line, it is possible to know how power consumption will change in accordance with data to be asserted next.

In order to make the sum of the amount of power consumed as a current flowing through a signal line and the amount of power consumed by the electrical charging & discharging device constant, data supplied to the electrical charging & discharging device is changed when no power is consumed as a current flowing through the signal line so that the sum of both the power amounts remains unchanged all the time. If power consumption having nothing to do with a signal line is excluded, the remaining power consumption is certainly attributed only to bit inversions occurring on a signal line. In this case, the remaining power consumption has nothing to do with data processed internally. Thus, the degree of relationship between the power consumption and the data processed internally can be lowered.

According to the signal line precharge control method, on the other hand, previous data is cleared each time new data is transmitted. Thus, the power consumption for a signal line is not dependent on data asserted previously on the signal line. Instead, the amount of consumed power is proportional to the number of is appearing in a binary expression of data asserted next for the positive logic. It should be noted that, in the case of the negative logic, the amount of consumed power is proportional to the number of 0s.

Thus, in order to make the sum of the amount of power consumed as a current flowing through a signal line and the amount of power consumed by the electrical charging & discharging device constant in the case of the signal line precharge control method, when data is asserted on a signal line, data obtained as bit-by-bit inversion of the asserted data is supplied to the electrical charging & discharging device. In this way, the sum of the amount of power consumed as a current flowing through the signal line and the amount of power consumed by the electrical charging & discharging device constant can be made constant all the time. Also in this case, if power consumption having nothing to do with a signal line is excluded, the remaining power consumption of the microcomputer is surely attributed only to bit inversions occurring on a signal line. In this case, the remaining power consumption has nothing to do with data processed internally. Thus, the degree of relationship between the power consumption and the data processed internally can be lowered.

Inside a number of microcomputer chips, the signal line static control method is mixed with the signal line precharge control method. Thus, in order to lower the degree of relationship between changes in total power consumption of the microcomputer chip and the data processed internally, it is necessary to combine information processing devices adopting both the methods described above.

2. Encryption of Data on a Signal Line

Next, a method of encrypting data asserted on a signal line is described. With this method adopted, the power consumption for a signal line becomes different from the power consumption based on actual data. It is thus difficult to infer internal information of a semiconductor device even if information on the power consumption can be fetched from the semiconductor device.

In a transfer of data through a signal line connecting two information processing devices embedded in a microcomputer implemented by an embodiment of the present invention, that is, in a transfer of data through a signal line connecting any two of a ROM, a PROM, an EPROM, an EEPROM, a RAM and an FRAM, on the data transmission side, an encryption device encrypts the data in accordance with a predetermined encryption technique and then transmits the encrypted data. On the data reception side, on the other hand, a decryption device for decrypting encrypted data decrypts the encrypted data received from the data transmission side. In this processing, since a signal line is electrically charged and discharged with data different from the original data, the degree of relationship between the internally processed data and the power consumption can be lowered. An effect of this method can be expected without regard to whether the signal line static technique or the precharge static line technique is adopted.

3. Encryption of Stored Information

With this third method, data is encrypted and encrypted data is stored in a memory device. To put it in detail, in an operation to store data into a ROM (read-only memory), the data is encrypted in accordance with a predetermined encoding technique. Before the encrypted data can be used in a data processing apparatus or the like, a decryption device decrypts the data in accordance with a decryption technique determined in advance before supplying the data to an information processing device.

In accordance with this method, data asserted on a signal line is encrypted data which is different from the original data. Thus, since a signal line is electrically charged and discharged with encrypted data different from the original data, the degree of relationship between the internally processed data and the power consumption can be lowered. An effect of this method can be expected without regard to whether the signal line static technique or the precharge static line technique is adopted.

4. Changing Data Transfer Order

With the fourth method, the transmission order of data asserted on a signal line is made different from the original order. Assume for example that data is transmitted in the A, B, C, D and E order for every other block an that the transmission order is changed to E, A, B, D and C. Of course, the way in which the transmission order is changed is typical. This method changes an electrical charging and discharging pattern of a signal line to another pattern different from the original sequence. Thus, since a signal line is electrically charged and discharged with data different from the original data, the degree of relationship between the internally processed data and the power consumption can be lowered. An effect of this method can be expected without regard to whether the signal line static technique or the precharge static line technique is adopted.

Preferred embodiments of the present invention are explained as follows.

In accordance with to a first aspect of the present invention, there is provided a data processing apparatus comprising at least a first information processing device and a second information processing device connected to said first information processing device by a signal line, said data processing apparatus characterized by having a means for changing power consumption on said signal line during transmission of a signal through said signal line in accordance with an actual state of said power consumption that would be observed when said means were not used.

In accordance with a second aspect of the present invention, there is provided a data processing apparatus comprising at least a first information processing device and a second information processing device connected to said first information processing device by a signal line, said data processing apparatus characterized by determining a state of second power consumption for a state of first power consumption on said signal line during transmission of a signal through said signal line from at least one of said first information processing device and said second information processing device in such a way that said second power consumption is distributed over a period to complement said first power consumption.

In accordance with a third aspect of the present invention, there is provided an information processing device having at least a signal line connected to said information processing device, said information processing device characterized in that said device determines a state of second power consumption for a state of first power consumption on said signal line during transmission of a signal of said information processing device through said signal line in such a way that a sum of said second power consumption and said first power consumption is equal to a desired value.

In accordance with a fourth aspect of the present invention, there is provided an information processing device having at least a signal line connected to said information processing device, said information processing device characterized in that said device determines a state of second power consumption for a state of first power consumption on said signal line during transmission of a signal of said information processing device through said signal line in such a way that, in a period said first power consumption exists, said second power consumption is not generated but, in a period said first power consumption does not exist, said second power consumption is generated.

In accordance with a fifth aspect of the present invention, there is provided an information processing device having at least a signal line connected to said information processing device, said information processing device characterized in that power consumption is generated for an inverted value of a digital signal of said information processing device transmitted through said signal line.

In accordance with a sixth aspect of the present invention, there is provided a data processing apparatus comprising at least a first information processing device and a second information processing device connected to said first information processing device by a signal line, said data processing apparatus characterized by having a means for determining a state of second power consumption for a state of first power consumption on said signal line during transmission of a digital signal through said signal line from at least one of said first information processing device and said second information processing device in such a way that said second power consumption is power consumption generated for an inverted value of a digital signal of said information processing device transmitted through said signal line.

In accordance with a seventh aspect of the present invention, there is provided an information processing device having at least a signal line connected to said information processing device, said information processing device characterized in that, between said information processing device and said signal line, a signal from said information processing device can be encrypted and an encrypted signal transmitted from said signal line can be decrypted.

In accordance with an eighth aspect of the present invention, there is provided a data processing apparatus comprising at least a first information processing device and a second information processing device connected to said first information processing device by a signal line, said information processing device characterized in that, between at least either said first information processing device or said second information processing device and said signal line, a signal from said first information processing device or said second information processing device can be encrypted and a signal transmitted from said signal line can be decrypted.

In accordance with a ninth aspect of the present invention, there is provided a data processing apparatus comprising at least a first information processing device and a second information processing device connected to said first information processing device by a signal line, said data processing apparatus characterized in that, a signal from said first information processing device is encrypted and said encrypted signal from said first information processing device is decrypted before being supplied to said second information processing device; and a signal from said second information processing device is encrypted and said encrypted signal from said second information processing device is decrypted before being supplied to said first information processing device.

In accordance with a tenth aspect of the present invention, there is provided a data processing apparatus comprising at least an information processing device, an information memory device and a signal line connected at least to said information processing device, said data processing apparatus characterized in that:

at least in an operation to store information into said information memory device, said information is encrypted; and information stored in said information memory device can be decrypted.

In accordance with an eleventh aspect of the present invention, there is provided a data processing apparatus comprising at least an information processing device, an information memory device and a signal line connected at least to said information processing device, said data processing apparatus characterized in that:

at least in an operation to store information into said information memory device, said information is encrypted; and information stored in said information memory device and transferred to said information processing device through said signal line can be decrypted before supplying said information to said information processing device.

In accordance with a twelfth aspect of the present invention, there is provided an information processing device having at least a signal line connected to said information processing device, said information processing device characterized in that an original order of a signal series output by said information processing device can be changed to another order prior to transmission through said signal line and said other order can be restored back to said original order.

In accordance with a thirteenth aspect of the present invention, there is provided a card comprising at least a first information processing device and a second information processing device connected to said first information processing device by a signal line, said data processing apparatus characterized by having a means for changing power consumption on said signal line during transmission of a signal through said signal line in accordance with an actual state of said power consumption that would be observed when said means were not used.

This specification avoids a long list of such devices, apparatuses and cards. It should be noted that the present invention also provides data processing apparatuses, information processing devices and cards each having an information memory device not included on the list. The present invention provides even cards each including an information processing device or an information memory device to be described later.

In accordance with a fourteenth aspect of the present invention, there is provided a card system comprising at least a terminal and a card connectable to said terminal, said card system characterized in that said card comprises at least a first information processing device and a second information processing device connected to said first information processing device by a signal line, and there is provided a means for changing power consumption on said signal line during transmission of a signal through said signal line in accordance with an actual state of said power consumption that would be observed when said means were not used.

This specification avoids a long list of such devices, apparatuses and cards. It should be noted that the present invention also provides data processing apparatuses, information processing devices and cards each having an information memory device not included on the list. The present invention provides even card systems each including an information processing device or an information memory device to be described later.

Additional aspects of the present invention are listed below to help the reader understand the present invention through concrete embodiments.

In accordance with a fifteenth aspect of the present invention, there is provided a microcomputer (or a data processing apparatus) comprising an A information processing device, a B information processing device, a signal line static connecting said A information processing device to said B information processing device, a control-signal generation means and a C power consumption device for consuming a second power different from a first power consumed by said signal line static where a signal line static is defined as a signal line controlled by a control technique not to clear a signal asserted on said signal line, said microcomputer characterized in that:

said A information processing device is connected to said C power consumption device so that a present signal DATA output by said A information processing device can be supplied to said C power consumption device; and in a transfer of said present signal DATA between said A and B information processing devices through said signal line static, an exclusive logical OR of said present signal DATA, a previous signal PBD asserted on said signal line static immediately before and a signal CDD supplied to a electrical charging & discharging device employed in said C power consumption device immediately before is computed in accordance with Table 1 shown below and said sum is supplied to said electrical charging & discharging device in accordance with another control signal generated by said control-signal generation means so that a sum of said first power and said second power is equal to a predetermined value.

The technical term 'power consumption device' is used in this specification. It should be noted that the power consumption device is a means for consuming power corresponding to power consumption by a current flowing through the signal line in a transfer of data through the signal line. Power is consumed by the power consumption device besides the power consumption itself. The power consumed by the power consumption device is intended to make the sum of the power consumption of the power consumption device and the power consumption by a current flowing through the signal line uniform without regard to variations in data being transferred. That is, the total amount of consumed power basically remains the same regardless of how the data being transferred varies. It is worth noting that the power consumption does not imply a mean for generating power.

In accordance with a sixteenth aspect of the present invention, there is provided a microcomputer (or a data processing apparatus) comprising an A information processing device, a B information processing device, a signal line static connecting said A information processing device to said B information processing device, a control-signal generation means, a C power consumption device for consuming a second power different from a first power consumed by said signal line static and a D power consumption device for consuming a second power different from a first power consumed by said signal line static wherein said C and D power consumption devices may be implemented by a single power consumption device where a signal line static is defined as a signal line controlled by a control technique not to clear a signal asserted on said signal line, said microcomputer characterized in that:

said A information processing device is connected to said C power consumption device so that a present signal DATA output by said A information processing device can be supplied to said C power consumption device whereas said B information processing device is connected to said D power consumption device so that a present signal DATA output by said B information processing device can be supplied to said D power consumption device; and in a transfer of said present signal DATA between said A and B information processing devices through said signal line static, an exclusive logical OR of said present signal DATA, a previous signal PBD asserted on said signal line static immediately before and a signal CDD supplied to a electrical charging & discharging device employed in said C power consumption device immediately before is computed in accordance with Table 1 shown below and said sum is supplied to said electrical charging & discharging device in accordance with another control signal generated by said control-signal generation means so that a sum of said first power and said second power is equal to a predetermined value.

In accordance with a seventeenth aspect of the present invention, there is provided a data processing apparatus comprising a first information processing device, a second information processing device, a signal line connecting said first information processing device to said second information processing device, a precharge-signal control means and a means for consuming a second power different from a first power consumed by said signal line, said data processing apparatus characterized in that:

said first or second information processing device is connected to said means for consuming said second power;

said second or first information processing device is connected to said precharge-signal control means; and in a transfer of a signal between said first and second information processing devices through said signal line, a sum of a consumption amount of said first power and a consumption amount of said second power is controlled to become equal to a predetermined value.

In accordance with an eighteenth aspect of the present invention, there is provided a data processing apparatus comprising a first information processing device, a second information processing device, a signal line connecting said first information processing device to said second information processing device and a signal line precharge control device for precharging said signal line, said data processing apparatus characterized in that:

said first information processing device is connected to said signal line precharge control device and a compensatory precharge bus control device;

said compensatory precharge bus control device is connected to said signal line;

said compensatory precharge bus control device is connected to a means for consuming a second power different from a first power consumed by said signal line; and bits of data flowing through a bus is inverted immediately after precharging said signal line before being supplied to said means for consuming said second power so that a sum of a consumption amount of said first power on said data signal line and a consumption amount of said second power becomes equal to a predetermined value.

In accordance with a nineteenth aspect of the present invention, there is provided a data processing apparatus comprising a first information processing device, a second information processing device, a signal line connecting said first information processing device to said second information processing device and a signal line precharge control device for precharging said signal line, said data processing apparatus characterized in that:

said signal line has an inversion device in the middle of said signal line; and said signal line on one side of said inversion device is a signal line of positive logic while said signal line on the other side of said inversion device is a signal line of negative logic.

In accordance with a twentieth aspect of the present invention, there is provided a data processing apparatus comprising an A information processing device, a B information processing device and a signal line connecting said A information processing device to said B information processing device, said data processing apparatus characterized in that:
- an encryption device for encrypting data is provided between said B information processing device and said signal line; and
- an decryption device for decrypting data is provided between said A information processing device and said signal line.

In accordance with a twenty-first aspect of the present invention, there is provided a data processing apparatus comprising an A information processing device, a B information processing device and a signal line connecting said information processing device to said information memory device, said data processing apparatus characterized in that:
- a first encryption & decryption device is provided between said A information processing device and said signal line and used for encrypting data of said A information processing device and decrypting data of said B information processing device; and
- a second encryption & decryption device is provided between said B information processing device and said signal line and used for encrypting data of said B information processing device and decrypting data of said A information processing device.

Embodiments of the present invention described below each have something to do with an information memory device.

In accordance with a twenty-second aspect of the present invention, there is provided a data processing apparatus comprising an information processing device, an information memory device and a signal line connecting said information processing device to said information memory device, said data processing apparatus characterized in that:
- an encryption device for encrypting data is provided between said information processing device and said signal line; and
- an decryption device for decrypting data is provided between said information memory device and said signal line.

In accordance with a twenty-third aspect of the present invention, there is provided an information memory device for storing a plurality of pieces of information at the same plurality of storage locations, said information memory device characterized in that:
- said information memory device is divided by address into said plurality of said storage locations;
- information can be written into and read out from each of said storage locations;
- an encryption device is provided for encrypting information to be recorded into any of said storage locations; and
- an encryption device is provided for decrypting information read out from any of said storage locations.

In accordance with a twenty-fourth aspect of the present invention, there is provided a data processing apparatus characterized in that said apparatus comprises an information processing device, an information memory device for storing information encrypted in advance, a signal line for connecting said information processing device to said information memory device and a decryption device for decrypting encrypted information.

In accordance with a twenty-fifth aspect of the present invention, there is provided a data processing apparatus comprising an external information memory device, an information processing device including an internal information memory device, a signal line connecting said external information memory device to said information processing device and an information-transfer control device for controlling a transfer of information between said external information memory device and said information processing device, said data processing apparatus characterized in that said information-transfer control device comprises:
- a source address register for storing an address in a transfer source at which information to be transferred is stored;
- a destination address register for storing an address in a transfer destination at which said information to be transferred will be stored;
- a counter for storing a value for counting the number of pieces of information to be transferred;
- a counter processing circuit for decrementing said value stored in said counter;
- a data buffer for temporarily storing information being transferred between said external information memory device and said internal information memory device;
- a register processing circuit for updating said address stored in said source address register and said address stored in said destination address register;
- a randomization circuit for randomizing a transfer order of said address stored in said source address register and said address stored in said destination address register;
- an address buffer for temporarily storing an address obtained as a result of randomization carried out by said randomization circuit; and
- a control circuit for controlling said source address register, said destination address register, said counter, said counter processing circuit, said register processing circuit, said randomization circuit, said data buffer and said address buffer.

In addition to the principal embodiments according to several aspects of the present invention as described above, there is also an embodiment which employs an electrical charging & discharging device including a dummy signal line having a wiring capacitance equivalent to a signal line for transmitting data. In addition, the electrical charging & discharging device may include a precharge dummy signal line equivalent to a signal line for transmitting data.

Furthermore, an embodiment using a key for encryption may have an encryption-key automatic reconfiguration device for automatically reconfiguring a key to be used in encryption at an activation time. As an alternative, an embodiment using a key for encryption may have an encryption-key automatic reconfiguration device for automatically reconfiguring a key to be used in encryption periodically. As another alternative, it is possible to employ an encryption & decryption device using an address in a memory device as a portion of a key for encryption. Moreover, the encryption & decryption device may employ a means for setting and changing a key for encryption.

In addition, the data processing apparatus provided by the present invention may have a configuration comprising:
- a B information processing device including a memory area for storing encryption information for encryption and decryption according to an encryption system; and
- a decryption device for carrying out decryption based on encryption information stored in the B information processing device.

The data processing apparatus can have a configuration including:
- a memory device divided into a plurality of storage areas;
- an encryption-area specifying device for specifying whether or not encryption is required for each of the storage areas of the memory device; and
- an encryption & decryption device capable of determining whether or not encryption is required for the present transfer of data.

Moreover, the encryption & decryption device may determine not to encrypt a specific data pattern.

In addition, the data processing apparatus provided by the present invention may have a configuration including an encryption-key automatic reconfiguration device for automatically reconfiguring a key to be used in encryption at an activation time. As an alternative, the encryption-key automatic reconfiguration device automatically reconfigures a key to be used in encryption periodically.

In addition, the present invention also provides an information memory device for storing a plurality of pieces of information at the same plurality of storage locations wherein:
- the information memory device is divided by address into the plurality of the storage locations;
- information can be written into and read out from each of the storage locations;
- an encryption device encrypts information to be recorded into any of the storage locations; and
- a decryption device decrypts information read out from any of the storage locations.

Furthermore, it is possible to employ an encryption-key automatic reconfiguration device for automatically reconfiguring a key to be used in the encryption and decryption devices.

Moreover, the data processing apparatus provided by the present invention may employ:
- an encryption-area specifying register for specifying a memory area for which encryption is required; and
- an encryption decision device for determining whether encryption is required for the present transfer of data by referring to the contents of the encryption-area specifying register and an address specified in the present transfer of data.

BRIEF DESCRIPTION OF THE DRAWINGS

FIG. 7 is diagrams each showing a state of a signal line and a state of a capacitor for power consumption, in which FIG. 7A is a diagram showing the states for a signal line precharge technique and FIG. 7B is a diagram showing the states for a signal line static technique;

DESCRIPTION OF THE PREFERRED EMBODIMENTS

Figure 5:
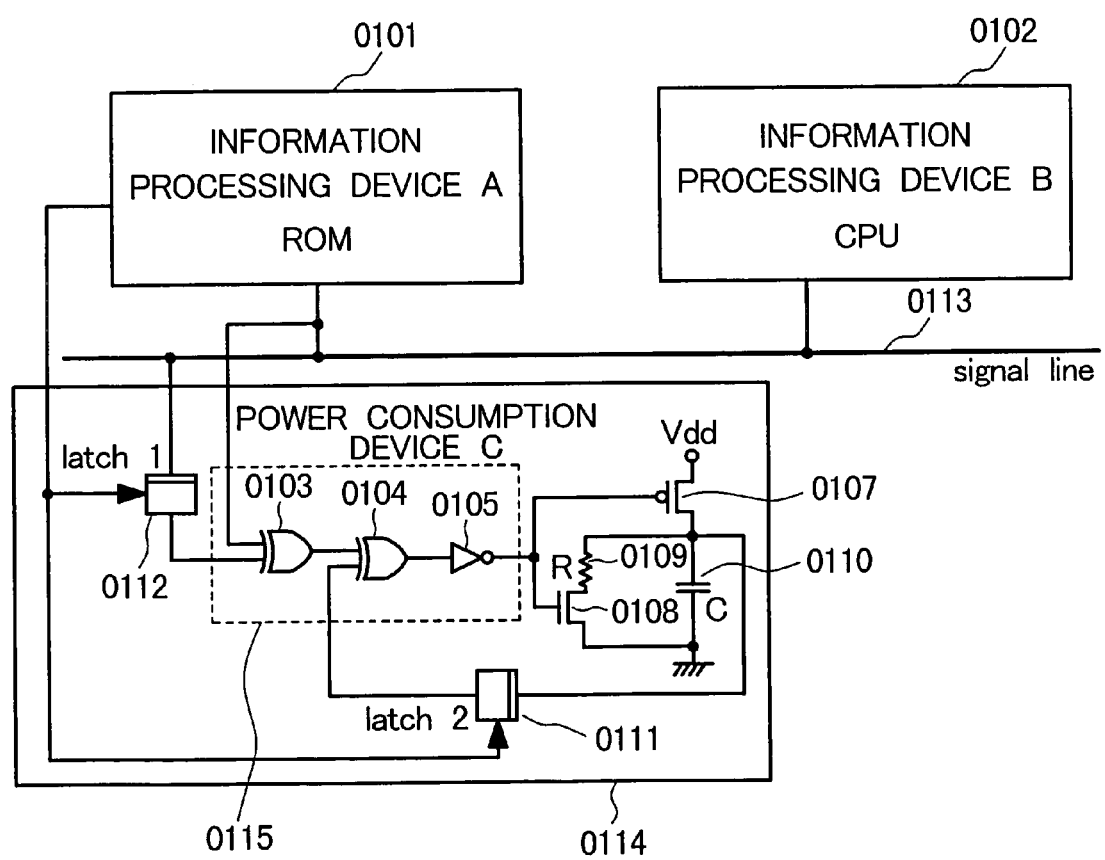
FIG. 5 is a diagram showing the basic configuration of a first embodiment of a data processing apparatus specified in the present application for a patent.

FIG. 5 is a diagram showing the basic configuration of a first embodiment of a data processing apparatus of the present invention. Of course, FIG. 5 shows only main components of the data processing apparatus which are related to the present invention. The other components can each have the ordinary configuration to assure sufficient performance.

As shown in the figure, the data processing apparatus implemented by the embodiment comprises an A information processing device implemented by a ROM (Read-Only Memory) 0101 and a B information processing device implemented by a CPU (Central Processing Unit) 0102. The A information processing device (or the ROM) 0101 and the B information processing device (or the CPU) 0102 are connected to each other by a signal line (or a signal bus) 0113. A C power consumption device 0114 is connected to the A information processing unit (ROM) 0101.

The C power consumption device 0114 typically includes exclusively logical sum (EXOR) gates 0103 and 0104, an inverter 0105, a PMOS circuit 0107, an NMOS circuit 0108, a resistor R 0109, a capacitor C 0110 and latch circuits 0111 and 0112 each implemented by a flip-flop for temporarily storing data. It should be noted that the A information processing unit (ROM or read-only memory) 0101 is a memory which data can be read out from but can not be written into. As described above, the configuration of the C power consumption device 0114 includes the latch circuits 0111 and 0112 each used for temporarily storing data.

It should be noted that the A information processing device (or the ROM) 0101 is an information processing device having a configuration with the ROM serving as a main component. By the same token, a data processing unit can be implemented by a RAM. Such a data processing device is an information processing device having a configuration with the RAM serving as a main component.

In this embodiment, the resistance of the resistor R 0109 is equal to the resistance of the signal line 0113 and the capacitance of the capacitor C 0110 is equal to the signal capacitance of the signal line 0113. In order to make the explanation simple, it is assumed that the signal line 0113 has a size of 1 bit and the B information processing device (or the CPU) 0102 is an 8-bit processor. It should be noted that the sizes of the signal line 0113 and the processing unit of the B information processing device (or the CPU) 0102 assumed in this embodiment are not essential. A typical size of the signal line 0113 and a typical processing unit of the B information processing device (or the CPU) 0102 are used in the description merely to make the reader sufficiently comprehend the generality of the present invention.

The description begins with an explanation of how internal information of an ordinary semiconductor device not applying the present invention can be inferred from a standpoint of power consumption for a signal line. The user is expected to sufficiently understand the effectiveness of the present invention from this explanation.

In order to transfer data stored in the A information processing device (or the ROM) 0101 from the A information processing device (or the ROM) 0101 to the B information processing device (or the CPU) 0102, the data must be asserted on the signal line (signal bus) 0113. An observer observing power consumption required for transferring the data through the signal line (signal bus) 0113 will be capable of observing the following fact if the C power consumption device 0114 provided by the present invention does not exist. Assume that the bits of data of '01000101001' are inverted from 0 to 1 and from 1 to 0. At that time, observation of the power consumption will indicate phenomena of an inversion, an inversion, a non-inversion, a non-inversion, an inversion, an inversion, an inversion, an inversion, a non-inversion and an inversion. The data series consisting of inversions and non-inversions obtained as a result of observation of the power consumption indicates the following two states in dependence on the value of a data bit immediately preceding the data series. To be more specific, if the value of a data bit immediately preceding the data is not obvious, the two states are described as follows.

(1) If the immediately preceding data is assumed to be 0, the data series is 01000101001.

(2) If the immediately preceding data is assumed to be 1, the data series is 10111010110.

As described above, n data series that would be naturally subjected to an analysis based on observation of power consumption is reduced to two data series where n is the 12th power of 2 or 4,096. That is to say, a very large number of possibilities of information's existence is reduced to only two possibilities. Since internal information is inferred from only the two existing possibilities, it is quite within the bounds of possibility that the internal information can be correctly identified.

The present invention provides a technique for nullifying the effect of an analysis based on the observation of the power consumption described above to detect transferred data.

It should be noted that the C power consumption device 0114 provided by the present is explained prior to a description of the operation of the data processing apparatus provided by the present invention. Of course, an actual configuration other than the C power consumption device 0114 shown as an example can be thought of. The feasibility of such another configuration holds true of other examples described below.

A portion 0115 enclosed in a dotted line in FIG. 5 is a circuit area for carrying out logic processing of the C power consumption device 0114. Reference numerals 0103 and 0104 each denote an exclusive logical OR computation (EOR) gate. Reference numeral 0105 denotes an inverter circuit for inverting an input of '0' into an output of '1' or vice versa.

The logic equation of this logic circuit 0115 is described as follows:

$$R = \text{not } (CDD \text{ exor } (PBD \text{ exor } DATA))$$

The values of the logic expression in the above equation is shown in Table 1. By using the truth table of the exclusive logical OR (exor) shown in Table 2, a value of the logic expression can be found with ease.

Table 1

It should be noted that the symbol CDD represents data supplied to an electrical charging & discharging device employed in the C power consumption device 0114 immediately before a data signal being considered and the symbol PBD represents data asserted on the signal line immediately before the data signal DATA being considered. The symbol DATA represents data output currently from the A information processing device (or the ROM) 0101.

Table 2

Figure 6:
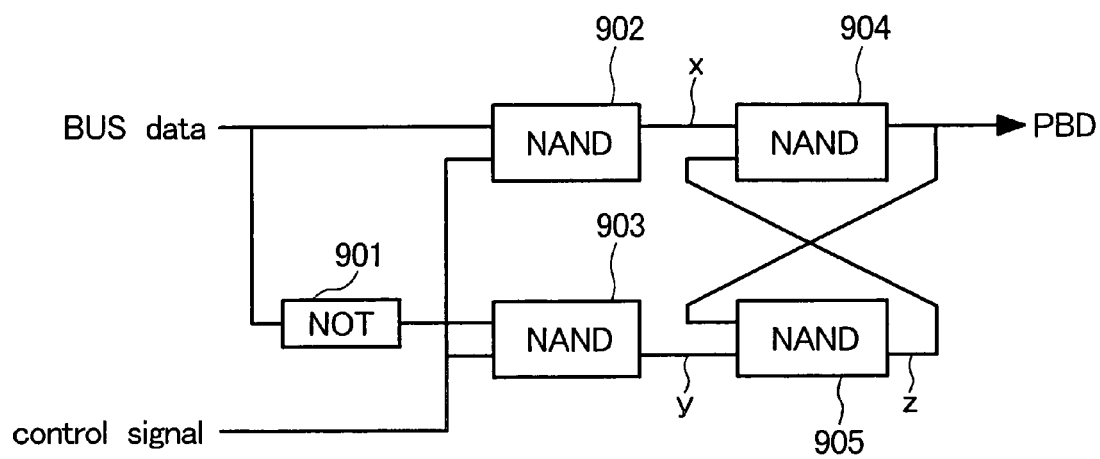
FIG. 6 is a diagram showing a typical flip-flop for temporarily storing data.

The flip-flop shown in FIG. 6 can be used as the latch 0112 or 0111 employed in the C power consumption device 0114 shown in FIG. 5 for temporarily storing the data PBD or CDD respectively. The symbol NAND represents a processing gate 902, 903, 904 or 905 having a truth table shown in Table 3. The symbol NOT represents an inversion gate 901 which is the same as the bit inversion circuit 0105 employed in the C power consumption device 0114 shown in FIG. 5.

Table 3

Bus data is output at a terminal PBD of the flip-flop circuit of FIG. 6 for temporarily storing data when a control signal thereof is set at 1. When the control signal is reset to 0, on the other hand, the previous data is held at the terminal PBD. An embodiment implementing this flip-flop circuit more concretely will be described later.

Let the symbol CS denote the control signal and the symbol BUS denote data on the signal bus. In this case, the operation of the flip-flop circuit can be expressed by the following 4 logic equations:

$$x = BUS \text{ nand } Cs$$
$$y = (\text{not } BUS) \text{ nand } CS$$
$$PBD = x \text{ nand } PBD$$
$$z = y \text{ nand } PBD$$

With the control signal CS set at 1 at one of the input terminals of a nand gate, the nand gate inverts a signal supplied to the other input terminal thereof. Thus, the above logic equations can be rewritten as follows:

$$x = \text{not } BUS$$
$$y = BUS$$
$$z = y \text{ nand } PBD$$
$$PBD = x \text{ nand } z$$

Thus, for BUS=1, 0 nand z=1 so that PBD=1. For BUS=0, on the other hand, z=0 nand PBD=1, and PBD=(not BUS) nand 1=BUS=0. Thus, PBD is equal to BUS.

With the control signal CS reset to 0, on the other hand, both x and y are 1. Thus, PBD has the previous value.

Operation of the First Embodiment of the Invention

Processing to transfer data in the data processing apparatus implemented by the embodiment is explained by referring to FIG. 5 in concrete terms. Consider a case in which an instruction 'EXOR R2, R4' of a program stored in the A information processing device (or the ROM) 0101 is transferred to the B information processing device (or the CPU) 0102 through the signal line 0113. A machine-language code of the instruction expressed in the hexadecimal format is 'CA 24'. This machine-language code is asserted on the signal line 0113 as a bit pattern of 11001010001000100.

First of all, consider the case by assuming the following initial conditions. In the first place, assume that data of 0 was asserted on the signal line 0113 immediately before this code. In the second place, assume that a capacitor 0110 employed in the C power consumption device 0114 is in an electrically charged state. That is to say, this state corresponds to a state of asserted data of 1. In the third place, a control signal informing that the data has been asserted by the B information processing device (or the CPU) 0102 on the signal line 0113 is supplied to the latch circuits 0111 and 0112.

[(1) Transfer of the First Bit of 1 in the Signal Series is an Operation to Change the Data from '0' to '1']

First of all, when the first bit of '1' is asserted, the signal line 0113 is electrically charged, entering a state of asserted data of 1. At that time, the same data is supplied to the C power consumption device 0114. The following description explains how the C power consumption device 0114 operates at that time in detail.

To begin with, the data of 1 is supplied by the B information processing device (or the CPU) 0102 to the exclusive logical OR computation (EOR) gate 0103. At the same time, receiving an output signal representing the data from the B information processing device (or the CPU) 0102, the latch circuit 0112 supplies a value of 0 to the exclusive logical OR computation (EOR) gate 0103. The value of 0 was asserted on the signal line 0113 immediately before and is stored in the latch circuit 0112. At that time, the exclusive logical OR computation (EOR) gate 0103 calculates an exclusive logical OR of 0 and 1 to give a result of 1. The processing to calculate an exclusive logical OR is based on truth table 2 described earlier. The exclusive logical OR is supplied to the exclusive logical OR computation (EOR) gate 0104.

Receiving the output signal representing the data from the B information processing device (or the CPU) 0102, the latch circuit 0111 supplies the data (the electrical charge) of 1 accumulated in the capacitor 0110 to the exclusive logical OR computation (EOR) gate 0104 which then outputs data of 0 in accordance with truth table 2 described earlier. The data of 0 is supplied to the inverter 0105 which then outputs a value of 1 in accordance with truth table 3 described earlier.

The value of 1 is supplied to the gate of the PMOS circuit 0107. Since the PMOS circuit 0107 is conductive only when the voltage of the gate thereof is low, the PMOS circuit 0107 is turned off in this case. At the same time, the value of 1 generated by the inverter 0105 is also supplied to the gate of the NMOS circuit 0108. However, the NMOS circuit 0108 is turned on thereby to electrically discharge the capacitor 0110. In this way, the sum of the amount of power consumed as a current flowing through the signal line 0113 and the amount of power consumed as a current flowing through the capacitor 0110 is made equal to the power consumption for electrically charging the signal line 0113 by 1 bit.

[(2) Operation to Change the Data from '1' to '1']

This operation is carried out when the next data is 1 and the data asserted immediately before on the signal line 0113 is also 1. In this case, the C power consumption device 0114 carries out the operation as follows.

First of all, when the B information processing device (or the CPU) asserts data of 1 on the signal line 0113, the signal line 0113 has already been put in an electrically charged state. Thus, the assertion of the data does not electrically charge the signal line 0113. At that time, the data of 1 generated by the B information processing device (or the CPU) 0102 is merely supplied to the C power consumption device 0114. In the C power consumption device 0114, the data of 1 is supplied to the exclusive logical OR computation (EOR) gate 0104.

At the same time, receiving the output signal representing the data generated by the B information processing device (or the CPU) 0102, the latch circuit 0112 supplies a value of 1 to the exclusive logical OR computation (EOR) gate 0103. The value of 1 was asserted on the signal line 0113 immediately before and is stored in the latch circuit 0112. At that time, the exclusive logical OR computation (EOR) gate 0103 calculates an exclusive logical OR of 1 and 1 to give a result of 0. The exclusive logical OR is supplied to the exclusive logical OR computation (EOR) gate 0104.

Receiving the output signal representing the data from the B information processing device (or the CPU) 0102, the latch circuit 0111 supplies the data (the electrical charge) of 1 accumulated in the capacitor 0110 to the exclusive logical OR computation (EOR) gate 0104 which then outputs a value of 1 in accordance with truth table 2. The value of 1 is supplied to the inverter 0105 which then outputs a value of 0 in accordance with truth table 3.

The value of 0 is supplied to the gate of the PMOS circuit 0107. Since the PMOS circuit 0107 is conductive only when the voltage of the gate thereof is low, the PMOS circuit 0107 is turned on in this case to electrically charge the capacitor 0110 by a power supply Vdd. At the same time, the value of 0 generated by the inverter 0105 is also supplied to the gate of the NMOS circuit 0108. However, the NMOS circuit 0108 is turned off thereby. In this case, the capacitor 0110 consumes a power for 1 bit. In this way, the sum of the amount of power consumed as a current flowing through the signal line 0113 and the amount of power consumed as a current flowing through the capacitor 0110 is made equal to the power consumption for electrically charging the signal line 0113 by 1 bit.

[(3) Operation to Change the Data from '1' to '0']

This operation is carried out when the next data is 0 and the data asserted immediately before on the signal line 0113 is 1 so that the capacitor 0110 is put in an electrically discharged state. In this case, the C power consumption device 0114 carries out the operation as follows.

First of all, when the B information processing device (or the CPU) 0102 asserts data of 0 on the signal line 0113, the signal line 0113 has already been put in an electrically charged state. Thus, the assertion of the data electrically charges the signal line 0113. At that time, the data of 0 generated by the B information processing device (or the CPU) 0102 is supplied to the C power consumption device 0114. In the C power consumption device 0114, the data of 0 is supplied to the exclusive logical OR computation (EOR) gate 0103. At the same time, receiving the output signal representing the data generated by the B information processing device (or the CPU) 0102, the latch circuit 0112 supplies a value of 1 to the exclusive logical OR computation (EOR) gate 0103. The value of 1 was asserted on the signal line 0113 immediately before and is stored in the latch circuit 0112. At that time, the exclusive logical OR computation (EOR) gate 0103 calculates an exclusive logical OR of 0 and 1 in accordance with Table 2 to give a result of 1. The exclusive logical OR is supplied to the exclusive logical OR computation (EOR) gate 0104.

Receiving the output signal representing the data from the B information processing device (or the CPU) 0102, the latch circuit 0111 supplies the data (the electrical charge) of 0 accumulated in the capacitor 0110 to the exclusive logical OR computation (EOR) gate 0104 which then outputs a value of 1 in accordance with truth table 2. The value of 1 is supplied to the inverter 0105 which then outputs a value of 0 in accordance with truth table 3.

The value of 0 is supplied to the gate of the PMOS circuit 0107. Since the PMOS circuit 0107 is conductive only when the voltage of the gate thereof is low, the PMOS circuit 0107 is turned on in this case to electrically charge the capacitor 0110 by the power supply Vdd. At the same time, the value of 0 generated by the inverter 0105 is also supplied to the gate of the NMOS circuit 0108. However, the NMOS circuit 0108 is turned off thereby. In this way, the sum of the amount of power consumed as a current flowing through the signal line 0113 and the amount of power consumed as a current flowing through the capacitor 0110 is made equal to the power consumption for electrically charging the signal line 0113 by 1 bit.

For the remaining bits, all cases of truth table 1 can be derived by using exactly the same flow as what is described above. FIG. 7B is a diagram showing the states of a data flow through the signal line 0113 and the capacitor 0110 for the instruction code of 111001010001001000' described earlier.

As described above, the sum of the amount of power consumed as a current flowing through the signal line 0113 and the amount of power consumed as a current flowing through the capacitor 0110 is made equal to the power consumption for electrically charging and discharging the signal line 0113 by 1 bit. It is thus difficult to infer data asserted on the signal line 0113 by merely examining the power consumption of the information processing apparatus.

Figure 1:
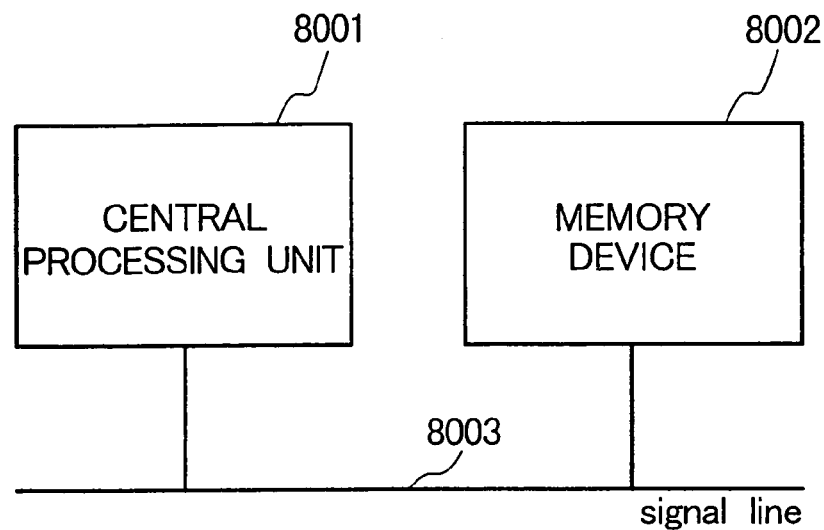
FIG. 1 is a diagram showing the basic configuration of a microcomputer.
Figure 2:
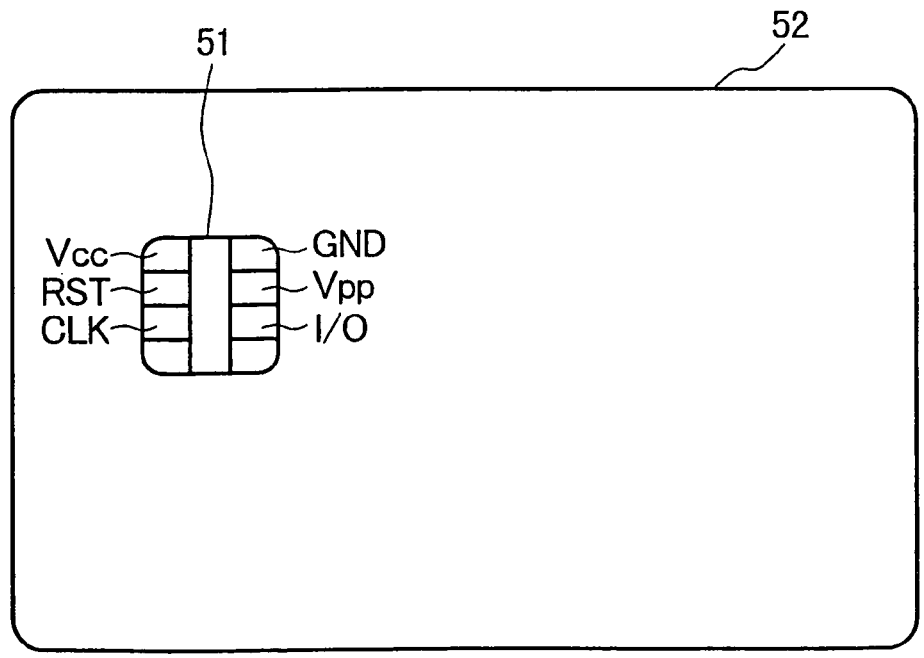
FIG. 2 is a diagram showing the location of a semiconductor integrated circuit on an IC card.

By applying a semiconductor integrated circuit device including an embedded information processing device manufactured in this way to a card, the card can be presented as a card with a high level of security. The location of the semiconductor integrated circuit device on the card is basically the same as that shown in FIG. 2. Such a card can be of a contact or non-contact type. The present invention can naturally be applied to a contact or non-contact card.

Figure 3:
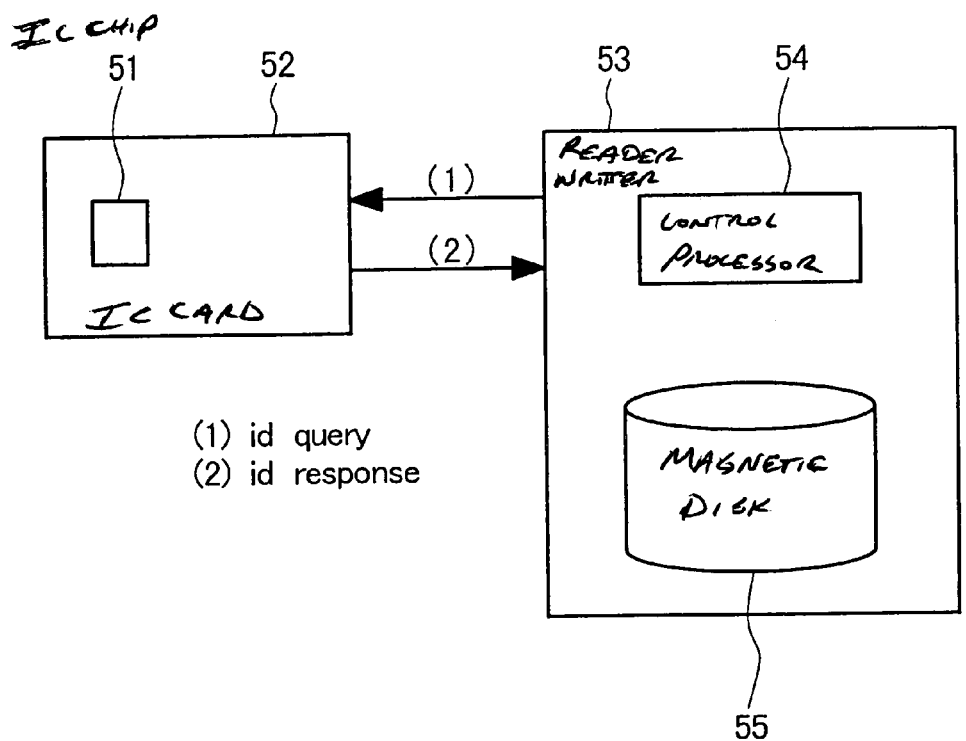
FIG. 3 is a diagram showing the configuration of a card system in a plain and simple manner.
Figure 4:
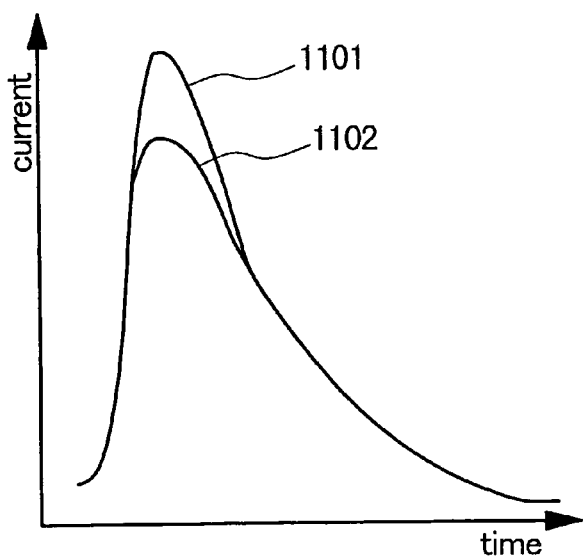
FIG. 4 is a diagram showing current waveforms each representing power consumption in 1 cycle in a semiconductor chip for an ordinary IC card.

The chip is driven to operate by supplying the signals from an external source such as a terminal. It should be noted that the terminal itself can basically be a terminal for an ordinary card system in order to sufficient performance. FIG. 3 is a diagram depicting the concept of a card system.

As shown in the figure, the IC card 52 includes an IC chip 51 and exchanges data with typically a reader & writer 53 which has a control processor 54 and a magnetic disc 55 serving as a data base. First of all, the reader & writer 53 issues an inquiry about an ID (identification) to the IC card 52. To be more specific, the inquiry issued by the reader & writer 53 to the IC card 52 is an inquiry typically about a recognition code or a name code for identifying the holder of the IC card 52. The operation to issue an inquiry about an ID is denoted by reference numeral (1) in FIG. 3.

The name code or the recognition code is stored in a predetermined area in the IC chip 51. In response to the inquiry, the card 52 transmits the name code to the reader & writer 53. The operation to transmit the name code is denoted by reference numeral (2) in FIG. 3. The reader & writer 53 searches the data base 55 for the name code and acquires a key code corresponding to the name code from the data base 55. Then, the reader & writer 53 transmits a random number to the IC card 52. The random number is typically generated internally by the MPU (or the processor) 54 employed in the reader & writer 53. It should be noted that the random number can also be acquired from a server through a LAN. The random number is interpreted by the IC card 52 as a command issued by the reader & writer 53. In accordance with this command, the IC card 52 encrypts the random number received from the reader & writer 53 by using a key code generated by a key-code generation device and transmits the encrypted random number to the reader & writer 53.

Much like the IC card 52, the reader & writer 53 encrypts the random number transmitted to the IC card 52 by using the key code acquired from the data base 55. The locally encrypted random number is compared with the encrypted random number received from the IC card 52. If the former matches the latter, mutual authentication between the IC card 52 and the reader & writer 53 is completed. In this case, the IC card 52 is judged to be valid.

In this card system, a key code provided to the reader & writer 53 is stored in the magnetic disc 55 as an ID code. As described above, the magnetic disc 55 is searched for the key code. A key code correctly stored in the magnetic disc 55 is a valid ID code. A key code (or an ID code) created for a magnetic card 52 is stored in the data base 55 by being associated with a name code or a recognition code of the holder of the magnetic card 52.

A key code created for an IC card 52 can be used in mutual authentication between the IC card 52 and the reader & writer 53 when the IC card 52 is used as electronic money to determine whether the payer is a legitimate or unauthorized user.

The card system described above can be applied to a number of fields such as a payment at a general store, a purchase of a ticket, checking a pass at an entry or an exit of a train station, checking a license and a telephone call using a telephone card. It is needless to say that the card and the card system described above can be implemented by embodiments of the present invention described below.

Next, some embodiments each implementing a data processing apparatus provided by the present invention are described as follows.

Figure 8:
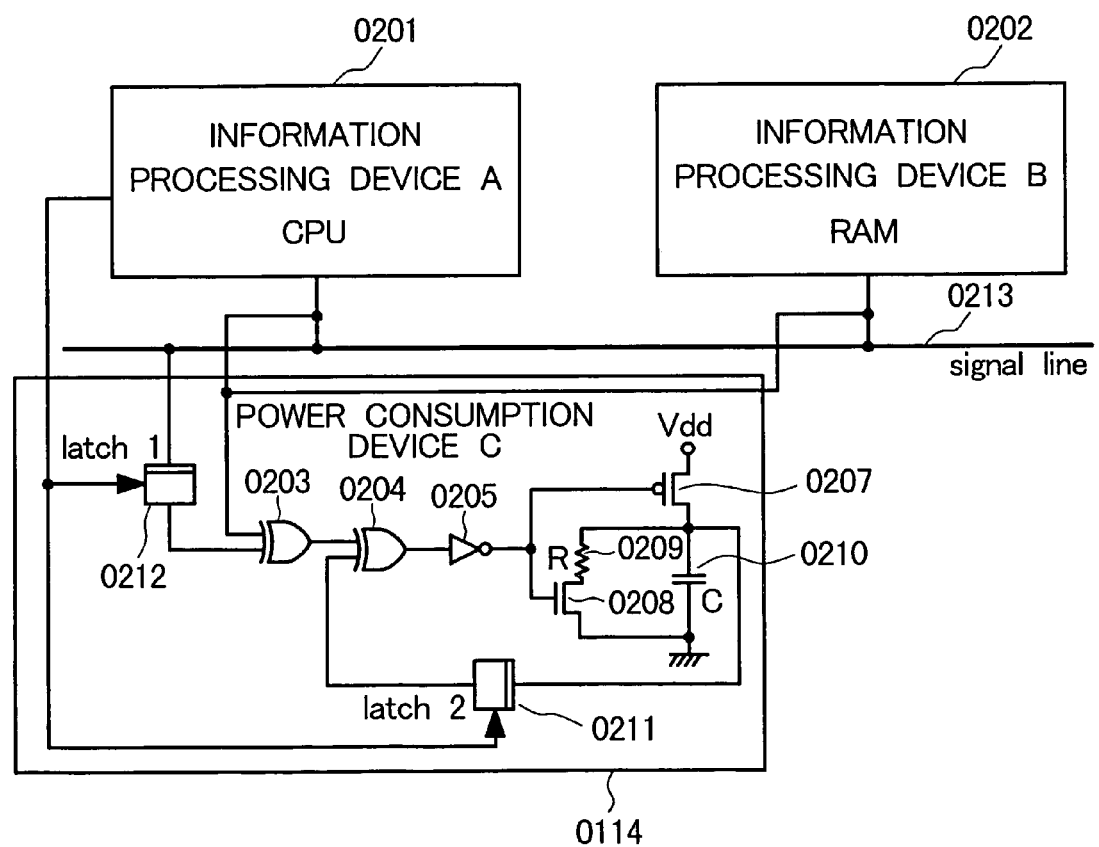
FIG. 8 is a diagram showing the basic configuration of a second embodiment of the data processing apparatus specified in the present application for a patent.

FIG. 8 is a plain and simple diagram showing a second embodiment implementing a data processing apparatus provided by the present invention. In this embodiment, signals are transmitted between information processing devices in two directions. In addition, a power consumption device is shared by both the information processing devices.

The information processing devices employed in this embodiment are an A information processing device implemented by a CPU 0201 and a B information processing device implemented by a RAM (Random Access Memory) 0202 which are connected to each other by a signal line (or a signal bus) 0213. In addition, a C power consumption device 0114 is provided as a device common to the A information processing device (or the CPU) 0201 and the B information processing device (or the RAM) 0202.

The C power consumption device 0114 comprises exclusive logical OR (EOR) gates 0203 and 0204, an inverter 0205, an NMOS circuit 0207, a PMOS circuit 0208, a resistor R 0209, a capacitor C 0210 and flip-flops 0211 and 0212 each used as a latch circuit for temporarily storing data. In this embodiment, the resistance of the resistor R 0109 is equal to the resistance of the signal line and the capacitance of the capacitor C 0110 is equal to the signal capacitance of the signal line 0113. In order to make the explanation simple, it is assumed that the signal line 0113 has a size of 1 bit and the B information processing device (or the CPU) 0102 is an 8-bit processor. It should be noted that the sizes of the signal line 0113 and the processing unit of the B information processing device (or the CPU) 0102 assumed in this embodiment are not essential.

That is to say, a typical size of the signal line 0113 and a typical processing unit of the B information processing device (or the CPU) 0102 are used in the description merely to make the reader sufficiently comprehend the generality of the present invention.

The second embodiment uses portions of the configuration of the first embodiment as they are. In particular, when data is transmitted from the A information processing device (or the CPU) 0201 to the B information processing device (or the RAM) 0202 through the signal line 0213 in the second embodiment, the C power consumption device 0114 carries out the same operations as those performed by the C power consumption device 0114 in the first embodiment when data is transferred to the B information processing device (or the CPU) 0102 from the A information processing device (or the ROM) 0101.

This second embodiment is characterized in that signals are transferred between the A information processing device (or the CPU) and the B information processing device (or the RAM) in both directions. To be more specific, data is transferred not only from the A information processing device (or the CPU) 0201 to the B information processing device (or the RAM) 0202 but also to the A information processing device (or the CPU) 0201 from the B information processing device (or the RAM) 0202 unlike the first embodiment in which data is transferred only in one direction from the B information processing device (or the CPU) 0102 to the A processing device (or the RAM) 0101.

Thus, the C power consumption device 0114 is connected in a way so as to execute a function of transferring data in the both directions.

In this embodiment, the A information processing device (or the CPU) 0201 transmits a data read signal to the B information processing device (or the RAM) 0202. In response to this data read signal, the B information processing device (or the RAM) 0202 asserts data on the signal line 0213 and, at the same time, supplies the data to the exclusive logical OR gate 0203. Thereafter, the C power consumption device 0114 in the second embodiment carries out exactly the same operations as those performed by the C power consumption device 0114 in the first embodiment when data is transferred to the B information processing device (or the CPU) 0102 from the A information processing device (or the ROM) 0101. For this reason, the detailed explanation of the operation is omitted.

In the data processing apparatus implemented by the second embodiment shown in FIG. 8, the distance between the C power consumption device 0114 and the A information processing device (or the CPU) 0201 looks shorter than the distance between the C power consumption device 0114 and the B information processing device (or the RAM) 0202. In actuality, however, the distances are about equal to each other. In addition, the length of a signal line for exchanging data between the C power consumption device 0114 and the A information processing device (or the CPU) 0201 or the B information processing device (or the RAM) 0202 is shorter than the distance between the signal line 0213 and the A information processing device (or the CPU) 0201 or the B information processing device (or the RAM) 0202. Thus, it is difficult to infer data asserted on the signal line 0213 by examining the power consumption.

Figure 9:
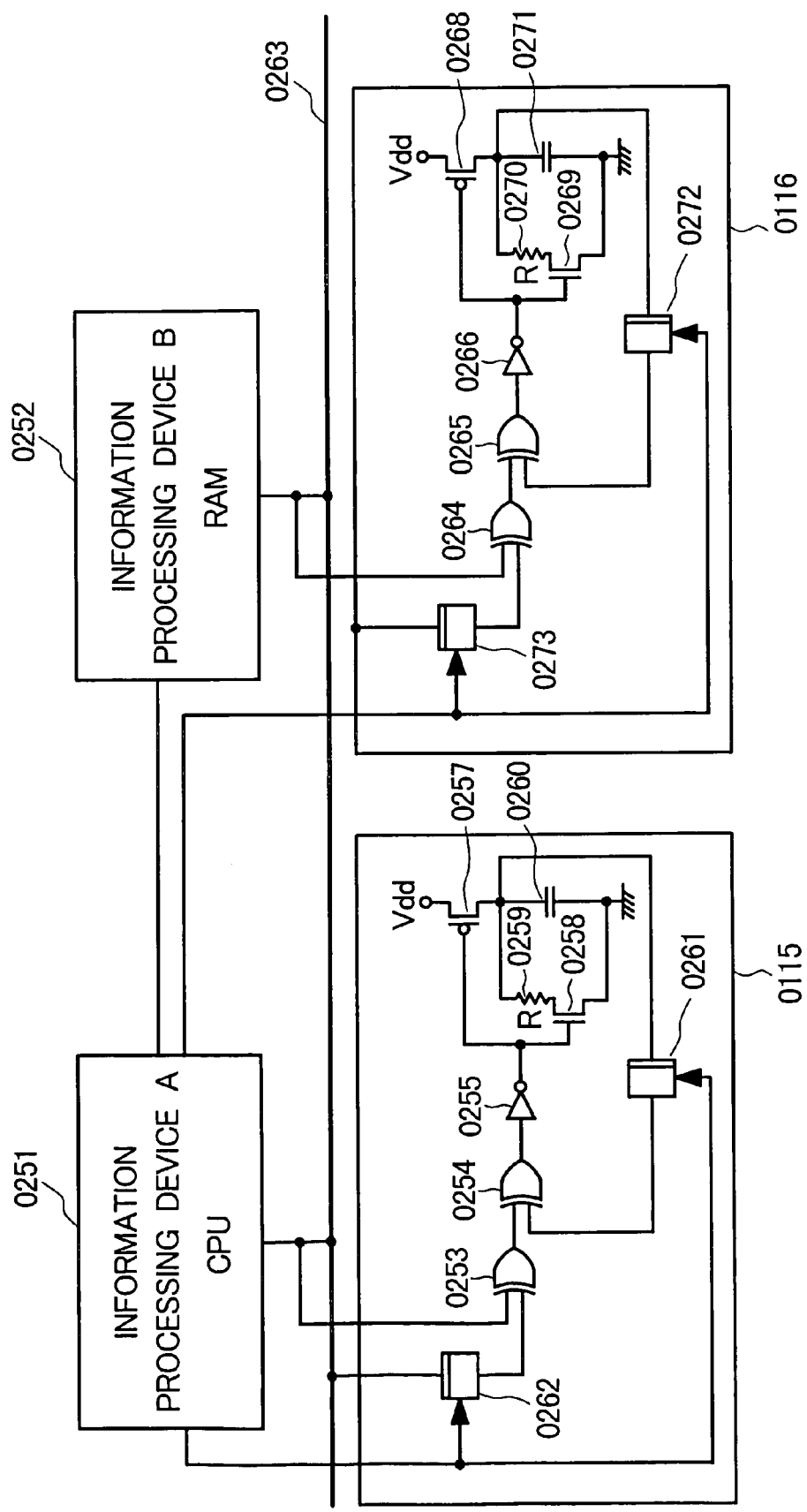
FIG. 9 is a diagram showing the basic configuration of a typical version of the second embodiment of the data processing apparatus specified in the present application for a patent.

FIG. 9 is a diagram showing the basic configuration of the data processing apparatus implemented by the second embodiment of the present invention wherein another implementation of the power consumption device is employed. As described above, signals are transferred between the A information processing device (or the CPU) 0251 and the B information apparatus (or the RAM) 0252 in two directions in this embodiment. Unlike the second embodiment shown in FIG. 8 wherein only the power consumption device 0114 is employed, a power consumption device 0115 is provided for the A information processing device (or the CPU) 0251 whereas a power consumption device 0116 is provided for the B information processing device (or the RAM) 0252. In the data processing apparatus implemented by this embodiment, the A information processing device (or the CPU) 0251 is connected to the B information processing device (or the RAM) 0252 by a signal line (or a signal bus) 0263. In addition, the power consumption device 0115 connected to the A information processing device (or the CPU) 0251 is referred to as a C power consumption device and the power consumption device 0116 connected to the B information processing device (or the RAM) 0252 is referred to as a D power consumption device.

The C power consumption device 0115 comprises exclusive logical OR (EOR) gates 0253 and 0254, an inverter 0255, a PMOS circuit 0257, an NMOS circuit 0258, a resistor R 0259, a capacitor C 0260 and flip-flops 0261 and 0262 each used as a latch circuit for temporarily storing data. By the same token, the D power consumption device 0116 comprises exclusive logical OR (EOR) gates 0264 and 0265, an inverter 0266, a PMOS circuit 0268, an NMOS circuit 0269, a resistor R 0270, a capacitor C 0271 and flip-flops 0272 and 0273 each used as a latch circuit for temporarily storing data.

Next, the operations of the data processing apparatus are explained by assuming the following conditions. The resistance of the resistor R 0259 is equal to the resistance of the signal line 0263 and the capacitance of the capacitor C 0260 is equal to the signal capacitance of the signal line 0263. In order to make the explanation simple, it is assumed that the signal line 0263 has a size of 1 bit and the A information processing device (or the CPU) 0251 is an 8-bit processor. It should be noted that the sizes of the signal line 0263 and the processing unit of the A information processing device (or the CPU) 0251 assumed in this embodiment are not essential. Thus, a typical size of the signal line 0263 and a typical processing unit of the A information processing device (or the CPU) 0251 are used in the description merely to make the reader sufficiently comprehend the generality of the present invention.

This embodiment uses portions of the configuration of the first embodiment as they are. In particular, when data is transmitted from the A information processing device (or the CPU) 0251 to the B information processing device (or the RAM) 0252 in the second embodiment, the C power consumption device 0115 carries out exactly the same operations as those performed by the C power consumption device 0114 in the first embodiment when data is transferred to the B information processing device (or the CPU) 0102 from the A information processing device (or the ROM) 0101 in the first embodiment. For this reason, the detailed explanation of the operations is omitted.

This second embodiment is characterized in that signals are transferred between the A information device (or the CPU) 0251 and the B information processing device (or the RAM) 0252 in both directions instead of one direction. To be more specific, in this embodiment, data is transferred not only from the A information processing device (or the CPU) 0251 to the B information processing device (or the RAM) 0252 but also to the A information processing device (or the CPU) 0251 from the B information processing device (or the RAM) 0252. In this embodiment, the A information processing device (or the CPU) 0251 transmits a data read signal to the B information processing device (or the RAM) 0252. In response to this data read signal, the B information processing device (or the RAM) 0252 asserts data on the signal line 0263 and, at the same time, supplies the data to an exclusive logical OR gate 0264 employed in the D power consumption device 0116.

The D power consumption device 0116 D has the same configuration as the C power consumption device 0115. To put it in detail, the D power consumption device 0116 in this embodiment carries out exactly the same operations as those which are carried out the C power consumption device 0114 in the first embodiment when data is transferred to the B information processing device (or the CPU) 0102 from the A information processing device (or the ROM) 0101 in the first embodiment. Thus, it is difficult to infer data asserted on the signal line 0263 by examining the power consumption.

Figure 10:
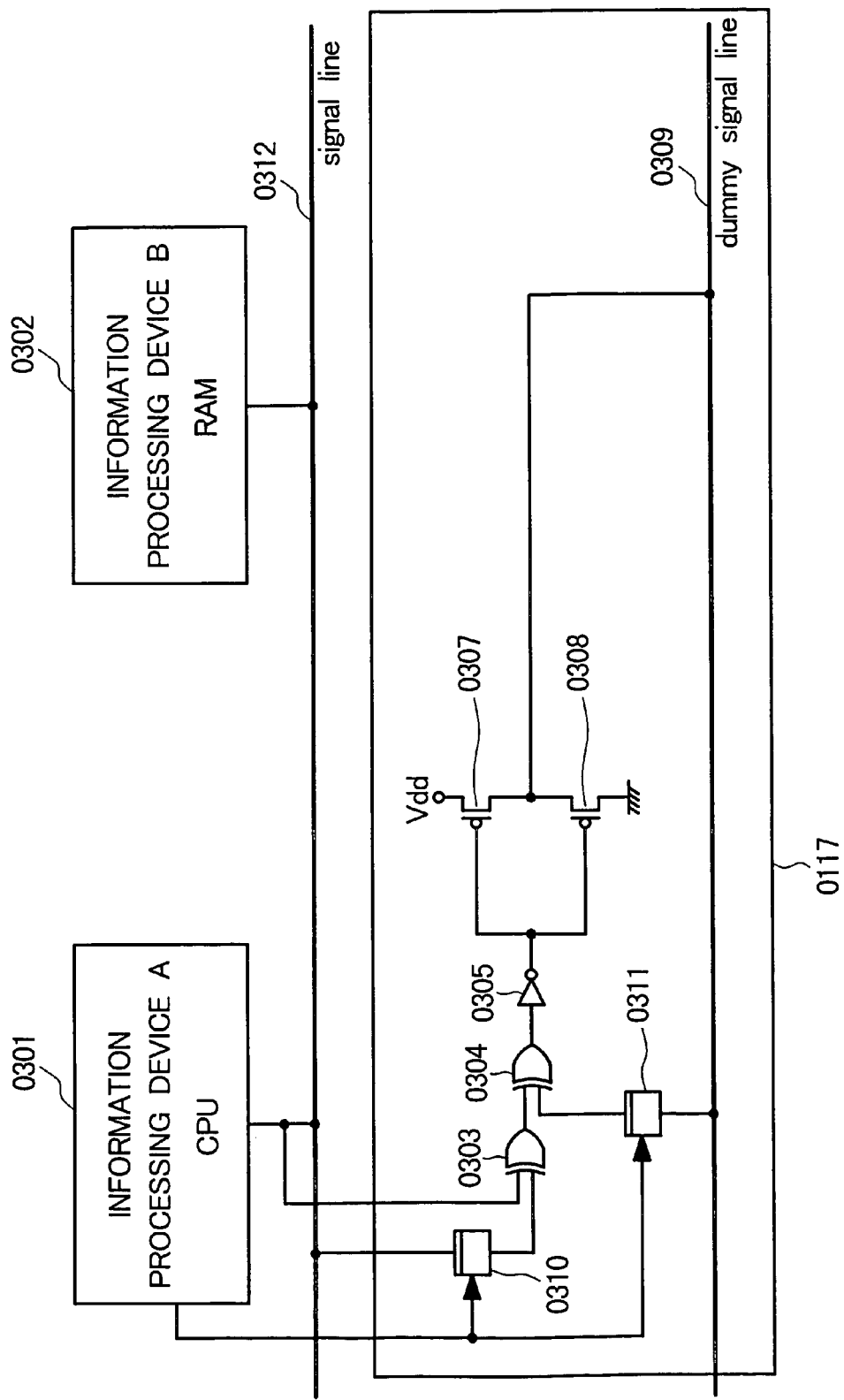
FIG. 10 is a diagram showing the basic configuration of a third embodiment of the data processing apparatus specified in the present application for a patent.

FIG. 10 is a diagram showing the basic configuration implementing a third embodiment of the data processing apparatus provided by the present invention. The third embodiment has the same basic configuration as the first embodiment. In this embodiment, a dummy signal line 0309 is employed. To be more specific, the resistor R 0109 and the and the capacitor C 0110 are replaced by a dummy signal line 0309. As shown in the figure, the information processing devices employed in this embodiment are an A information processing device implemented by a ROM 0301 and a B information processing device implemented by a CPU 0302 which are connected to each other by a signal line (or a signal bus) 0312. In addition, a C power consumption device 0117 is provided for the A information processing device (or the ROM) 0301. The C power consumption device 0117 comprises exclusive logical OR (EOR) gates 0303 and 0304, an inverter 0305, a PMOS circuit 0307, an NMOS circuit 0308, the dummy signal line 0309 and flip-flops 0310 and 0311 each used as a latch circuit for temporarily storing data.

The capacitance of the dummy signal line 0309 is equal to that of the signal line 0312 and the resistance of the dummy signal line 0309 is virtually equal to that of the signal line 0312. That is to say, the dummy signal line 0309 can be considered to transmit exactly the same signal as the signal line 0312. In order to make the explanation simple, it is assumed that the signal line 0312 has a size of 1 bit and the B information processing device (or the CPU) 0302 is an 8-bit processor. It should be noted that the sizes of the signal line 0312 and the processing unit of the B information processing device (or the CPU) 0302 assumed in this embodiment are not essential. That is to say, a typical size of the signal line 0312 and a typical processing unit of the B information processing device (or the CPU) 0302 are used in the description merely to make the reader sufficiently comprehend the generality of the present invention.

The capacitance of the dummy signal line 0309 employed in the third embodiment plays the same role as the resistor R 0109 and the capacitor C 0110 employed in the first embodiment. Thus, the operation of the third embodiment is basically the same as the data processing apparatus implemented by the first embodiment, making it unnecessary to repeat the explanation.

Figure 11:
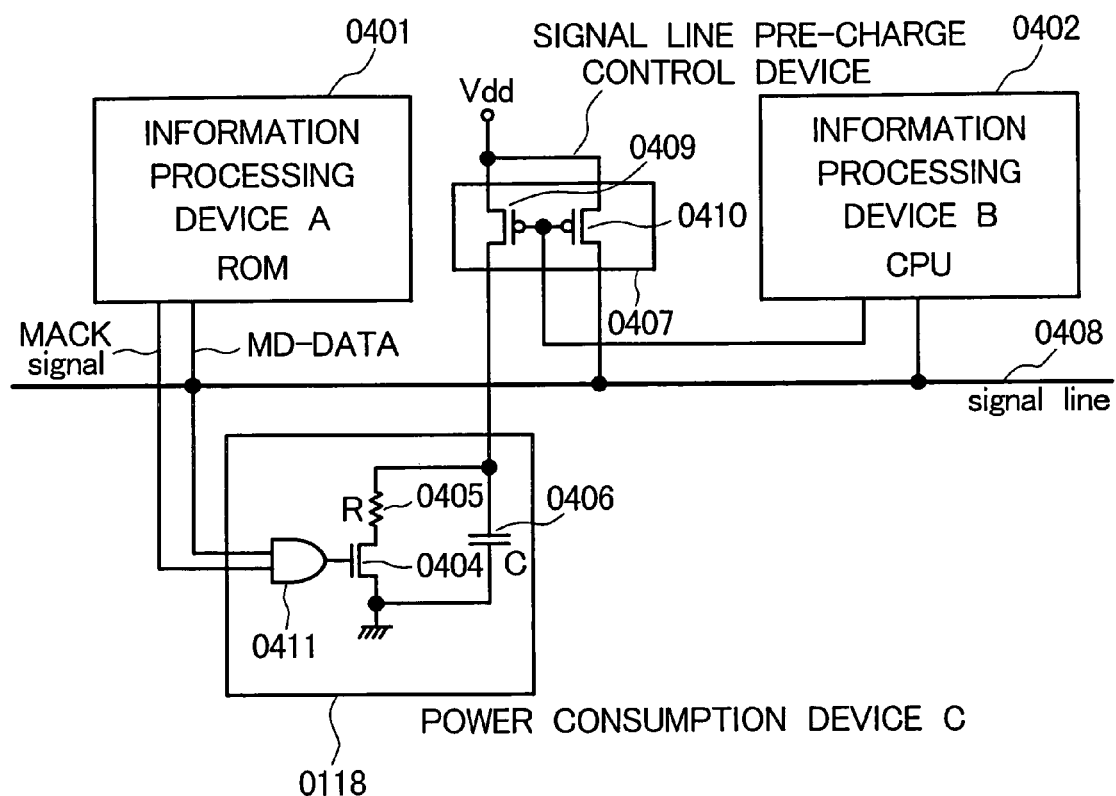
FIG. 11 is a diagram showing the basic configuration of a fourth embodiment of the data processing apparatus specified in the present application for a patent.

FIG. 11 is a diagram showing the basic configuration implementing a fourth embodiment of the data processing apparatus provided by the present invention. The fourth embodiment adopts the signal line precharge control method and has a power consumption device.

As shown in the figure, the information processing devices employed in this embodiment are an A information processing device implemented by a ROM 0401 and a B information processing device implemented by a CPU 0402 which are connected to each other by a signal line (or a signal bus) 0408. Furthermore, the embodiment has a C power consumption device 0118 provided on the A information processing device (ROM) 0401. In addition, the embodiment also has a signal line precharge control device 0407 for executing control based on the signal line precharge method.

The signal line precharge control device 0407 comprises two PMOS circuits 0409 and 0410. The B information processing device (or the CPU) 0402 supplies a data control signal to each of the gates of the PMOS circuits 0409 and 0410. The sources of the PMOS circuits 0409 and 0410 are connected to a power supply Vdd. Power of the power supply Vdd is supplied to the signal line 0408 and the C power consumption device 0118 through the PMOS circuits 0409 and 0410 respectively which are controlled by the control signal generated by the B information processing device (or the CPU) 0402. The C power consumption device 0118 comprises an NMOS circuit 0404, a resistor R 0405, a capacitor C 0406 and a logical-product computation gate 0411. The resistance of the resistor R 0405 is equal to the resistance of the signal line 0408 and the capacitance of the capacitor C 0406 is equal to the signal capacitance of the signal line 0408. In order to make the explanation simple, it is assumed that the signal line 0408 has a size of 1 bit and B information processing device (or the CPU) 0402 is an 8-bit processor. It should be noted that the sizes of the signal line 0408 and the processing unit of B information processing device (or the CPU) 0402 assumed in this embodiment are not essential. That is to say, a typical size of the signal line 0408 and a typical processing unit of B information processing device (or the CPU) 0402 are used in the description merely to make the reader sufficiently comprehend the generality of the present invention.

In order to transfer data stored in the A information processing device (or the ROM) 0401 from the A information processing device (or the ROM) 0401 to the B information processing device (or the CPU) 0402, the data must be asserted on the signal line (signal bus) 0408.

Assume that the transferred data is '01000101001' and the positive logic is adopted. An observer observing power consumption required for transferring the data through the signal line (signal bus) 0408 will be capable of directly knowing that the bits of the data are '01000101001' by observing power consumption accompanying changes of the data value from 0 to 1 due to the operation of the signal line precharge control device 0407 if the C power consumption device 0118 provided by the present invention does not exist. With the positive logic adopted, a low electric potential of the signal line 0408 represents a data value of 0 and a high electric potential of the signal line 0408 represents a data value of 1. Of course, in the case of the negative logic, a data series can also be inferred by observing power consumption accompanying changes of the data value from 1 to 0.

The present invention provides a technique for nullifying the effect of an analysis based on the observation of the power consumption described above to detect transferred data. In this embodiment, data is transferred by carrying out the following processing.

Consider a case in which an instruction 'EXOR R2, R4' of a program stored in the A information processing device (or the ROM) 0401 is transferred to the B information processing device (or the CPU) 0402 through the signal line 0408. A machine-language code of the instruction expressed in the hexadecimal format is 'CA 24'. This machine-language code is asserted on the signal line 0408 as a bit pattern of 1100101000100100.

When the B information processing device (or the CPU) 0402 issues the control signal to the gates of the two PMOS circuits PMOS 0409 and 0410 employed in the signal line precharge control device 0407, power is supplied to the signal line 0408 from the power supply Vdd through the PMOS circuit 0410, setting the signal line 0408 to 1 (HIGH). Power from the power supply Vdd is also electrically accumulated in the capacitor C 0406 employed in the C power consumption device 0118 through the PMOS circuit 0410. First of all, when data (MD-DATA) of 1 is asserted, the signal line 0408 is electrically discharged and power is consumed. At that time, the data (MD-DATA) of 1 and a MACK signal are supplied to the C power consumption device 0118.

The following description explains how the C power consumption device 0118 operates at that time in detail.

Assume that the first value of the data series is '1'. In this case, data (MD-DATA) of 1 is prepared by the A information processing device (or the ROM) 0401. After this first value of 1 has been prepared, the A information processing device (or the ROM) 0401 outputs the MACK signal. The MACK signal has a value of 1 to indicate a confirmed output or a value of 0 to indicate that the output has not been established yet.

The MACK signal is supplied to the logical-product computation gate 0411 and, at the same time, the data (MD-DATA) of 1 is asserted on the signal line 0408. Then, the data (MD-DATA) of 1 is also supplied to the logical-product computation gate 0411.

Since the MD-DATA and the MACK signal are both 1, the logical-product computation gate 0411 outputs a value of 1 to the NMOS circuit 0404. The NMOS circuit 0404 is put in a conductive state by the input value of 1 (HIGH), electrically discharging the capacitor C 0406. Since there is no change in data on the signal line 0408, on the other hand, the signal line 0408 is not electrically discharged.

Since the signal line 0408 is not electrically discharged, there is no power consumption. On the other hand, power consumption accompanies the electrical discharging phenomenon of the capacitor C 0406. Thus, the sum of an amount of power consumed as a current flowing through the signal line 0408 and an amount of power consumed as a current flowing through the capacitor C 406 is equal to the power consumption of an operation to electrically charge the signal line 0408 with 1 bit.

Next, data of 1 is asserted on the signal line 0408 as the second value of 1 in the data series. At that time, since the signal line 0408 has been precharged and cleared to 1, the same operations as those described above are carried out again. As a result, the sum of an amount of power consumed as a current flowing through the signal line 0408 and an amount of power consumed as a current flowing through the capacitor C 406 is equal to the power consumption of an operation to electrically charge the signal line 0408 with 1 bit.

Since the third value in the data series is '0', data (MD-DATA) of 0 is asserted on the signal line 0408. At that time, since the signal line 0408 has been precharged and cleared to 1, power is consumed, accompanying a change from the value of '1' to the value of '0'. The MD-DATA of 0 and the MACK signal of 1 are supplied to the logical-product computation gate 0411, driving the logical-product computation gate 0411 to output a value of 0 to the NMOS circuit 0404. Since the NMOS circuit 0404 is put in an off state by the input value of 0 (LOW), power is not consumed as a current flowing through the capacitor C 0406.

Power is consumed as a current flowing through the signal line 0408 when the data value changes from '1' to '0' but power is not consumed as a current flowing through the capacitor C 0406. As a result, the sum of an amount of power consumed as a current flowing through the signal line 0408 and an amount of power consumed as a current flowing through the capacitor C 406 is equal to the power consumption of an operation to electrically charge the signal line 0408 with 1 bit.

Since similar operations are carried out thereafter, the sum of an amount of power consumed as a current flowing through the signal line 0408 and an amount of power consumed as a current flowing through the capacitor C 406 is equal to the power consumption of an operation to electrically charge the signal line 0408 with 1 bit.

The state of the capacitor C 0406 and the data of '1100101000100100' asserted on the signal line 0408 are shown in FIG. 7A for a bit-to-bit comparison purpose.

Figure 12:
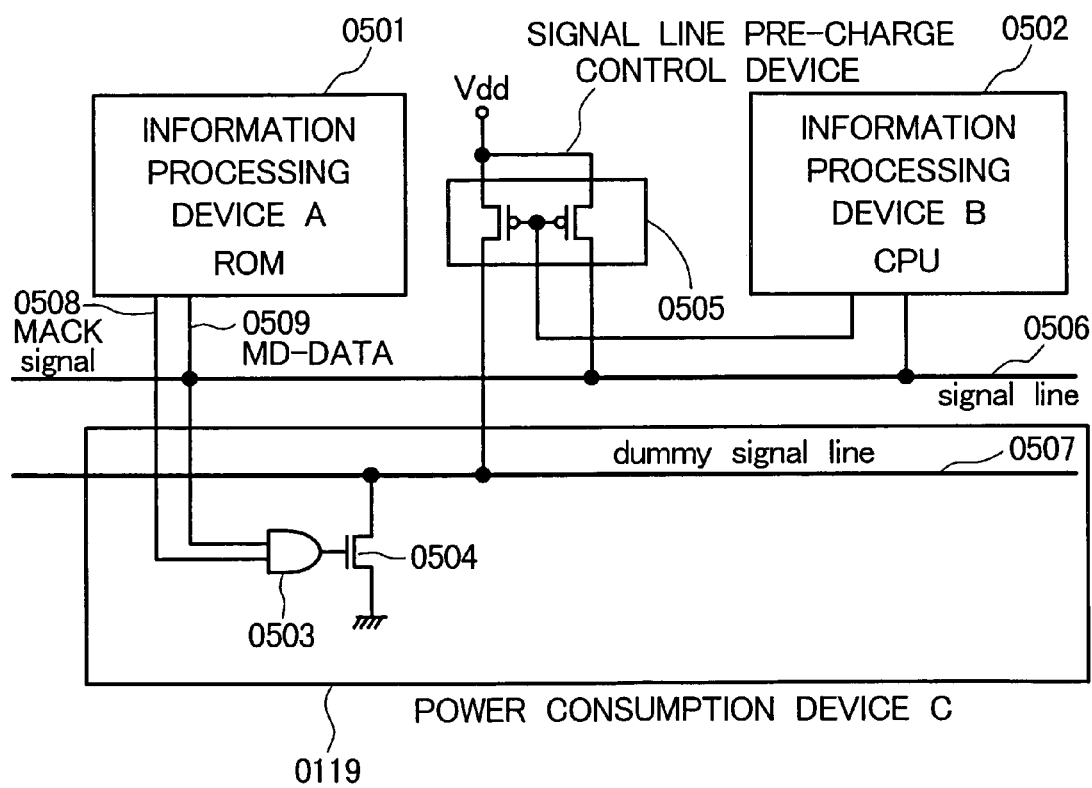
FIG. 12 is a diagram showing the basic configuration of a fifth embodiment of the data processing apparatus specified in the present application for a patent.

FIG. 12 is a diagram showing the basic configuration implementing a fifth embodiment of the data processing apparatus provided by the present invention. The fifth embodiment adopts the signal line precharge control method and employs a dummy signal line 0507 as a power consumption device.

Much like the fourth embodiment, the dummy signal line 0507 is employed to replace a resistor and a capacitor. As shown in the figure, the information processing devices employed in this embodiment are an A information processing device implemented by a ROM 0501 and a B information processing device implemented by a CPU 0502 which are connected to each other by a signal line (or a signal bus) 0506. In addition, the embodiment also includes a signal line precharge control device 0505 and a C power consumption device 0119. The capacitance of the dummy signal line 0507 is equal to that of the signal line 0506 and the resistance of the dummy signal line 0507 is virtually equal to that of the signal line 0506. That is to say, the dummy signal line 0507 can be considered to transmit exactly the same signal as the signal line 0506. It should be noted that the C power consumption device 0119 comprises an NMOS circuit 0504, the dummy signal line 0507 and a logical-product computation gate 0503.

In order to make the explanation simple, it is assumed that the signal line 0506 has a size of 1 bit and the B information processing device (or the CPU) 0502 is an 8-bit processor. However, the size of the signal line 0506 and the processing unit of the B information processing device (or the CPU) 0502 assumed in this embodiment are not essential. That is to say, a typical size of the signal line 0506 and a typical processing unit of the B information processing device (or the CPU) 0502 are used in the description merely to make the reader sufficiently comprehend the generality of the present invention.

The operation of this embodiment is substantially the same as that of the data processing apparatus implemented by the first embodiment, making it unnecessary to repeat the detailed explanation thereof.

Figure 13:
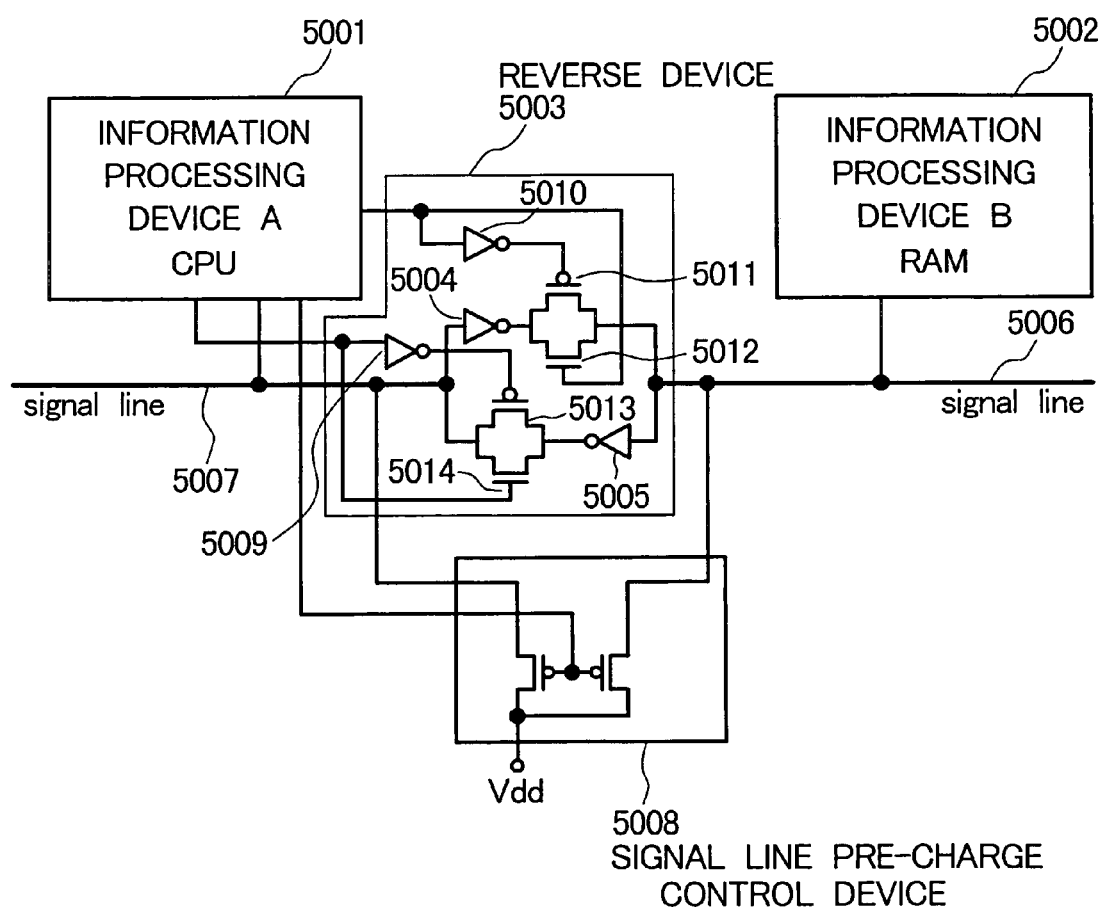
FIG. 13 is a diagram showing the basic configuration of a sixth embodiment of the data processing apparatus specified in the present application for a patent.

FIG. 13 is a diagram showing the basic configuration implementing a sixth embodiment of the data processing apparatus provided by the present invention. As shown in the figure, the information processing devices employed in this embodiment are an A information processing device implemented by a CPU 5001 and a B information processing device implemented by a RAM 5002 which are connected to an inversion device 5003 by signal lines 5007 and 5006 respectively. In addition, the embodiment also includes a signal line precharge control device 5008.

The inversion device 5003 comprises four CMOS inverters 5004, 5005, 5009 and 5010, PMOS circuits 5011 and 5013 as well as NMOS circuits 5014 and 5012. It should be noted that the resistance and the capacitance of the signal line 5006 are substantially the same as those of the signal line 5007.

When the CPU 5001 serving as the A information processing device transmits data to the RAM 5002 used as the B information processing device, the CPU 5001 outputs a control signal to the device 5008. The control signal turns on a PMOS circuit and an NMOS circuit employed in the device 5008.

Then, the signal lines 5007 and 5006 are electrically charged with power generated by the power supply Vdd through the PMOS circuit and the NMOS circuit employed in the device 5008, being set to a HIGH level. The control signal output by the A information processing device (or the CPU) 5001 is also supplied to the inversion device 5003 to turn on the PMOS circuit 5011 and the NMOS circuit 5012. Later on, the A information processing device (or the CPU) 5001 transmits data.

When the A information processing device (or the CPU) 5001 outputs data of 0, the signal line 5007 is electrically discharged. This data of 0 is inverted by the inverter 5004 into 1 which is transmitted as a signal to the signal line 5006. As described earlier, however, the signal line 5006 has already been charged. Thus, neither electrical charging phenomenon nor electrical discharging phenomenon occurs. Therefore, the data of 1 is supplied to the B information processing device (or the RAM) 5002. The data of 1 is the inverted value of the data of 0 output by the A information processing device (or the CPU) 5001.

When the A information processing device (or the CPU) 5001 outputs data of 1, on the other hand, the signal line 5007 is not electrically charged or discharged but the signal line 5006 is. The same operations are carried out when data is transferred from the B information processing device (or the RAM) 5002 to the A information processing device (or the CPU) 5001. Since the capacitance and the resistance of the signal line 5006 are virtually the same as the capacitance and the resistance of the signal line 5007 respectively, power is consumed as a current flowing through the signal line 5006 or 5007 and the power consumption is determined by the sum of the magnitudes of currents charged to and discharged from the signal lines 5006 and 5007. Thus, the sum of the amount of power consumed as a currents flowing through the signal line 5006 and the amount of power consumed as a currents flowing through the signal line 5007 is fixed.

The following seventh to twenty-second embodiments each encrypt data to be asserted on the signal line.

Figure 14:
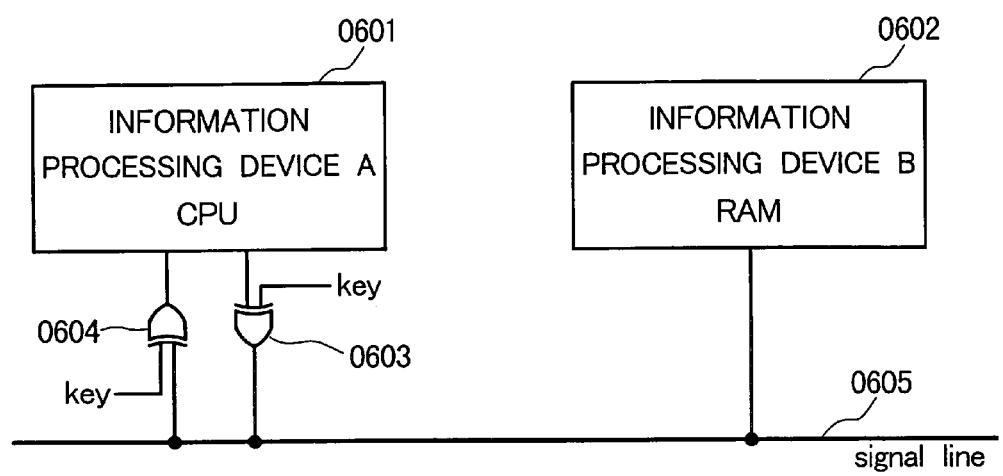
FIG. 14 is a diagram showing the basic configuration of a seventh embodiment of the data processing apparatus specified in the present application for a patent.

FIG. 14 is a diagram showing the basic configuration implementing a seventh embodiment of the data processing apparatus provided by the present invention. The embodiment is a basic implementation that employs an encryption device for encrypting data to be asserted on a signal line.

As shown in the figure, the data processing apparatus implemented by the seventh embodiment of the present invention comprises a CPU 0601 serving as an A information processing device and a RAM 0602 used as a B information processing device. The A information processing device (or the CPU) 0601 and the B information processing device (or the RAM) 0602 are connected to each other by signal lines (signal bus) 0605. The data processing apparatus implemented by the seventh embodiment of the present invention also includes an encryption device and a decryption device between the A information processing device (or the CPU) 0601 and the B information processing device (or the RAM) 0602. As the encryption device, an exclusive logical OR computation (EOR) gate 0603 is employed in the embodiment. As the decryption device, an exclusive logical OR computation (EOR) gate 0604 is employed in the embodiment. It should be noted, that devices of other types can also be used as the encryption and decryption devices.

In order to make the explanation simple, it is assumed that the signal line 0605 has a size of 8 bits and the A information processing device (or the CPU) 0601 is an 8-bit processor. However, the size of the signal line 0605 and the processing unit of the A information processing device (or the CPU) 0601 assumed in this embodiment are not essential. That is to say, a typical size of the signal line 0605 and a typical processing unit of the A information processing device (or the CPU) 0601 are used in the description merely to make the reader sufficiently comprehend the generality of the present invention. In addition, the following description assumes that the signal line static control method is adopted as a control technique of the signal line 0605. It should be noted that the same effect of the concept adopted by this embodiment can be realized even if the signal line precharge control method is adopted.

The encryption device 0603 employed in this embodiment computes the exclusive logical OR of each bit of a fixed 8-bit key and the corresponding bit of the 8-bit data output by the A information processing device (or the CPU) 0601. By the same token, the decryption device 0604 employed in this embodiment also computes the exclusive logical OR of each bit of the same key and the corresponding bit of the data. It should be noted that a key provided by the contemporary technology can be used to assure sufficient performance.

As is described in the explanation of the first embodiment of the present invention, according to the signal line static control method, the amount of consumed power is proportional to the number of inverted bits of immediately preceding values asserted on the signal line. Let the symbol P denote power consumption for 1 bit.

Assume for example that data of '01101001' is transmitted by the A information processing device (or the CPU) 0601 and that data of '11010101' was asserted on the signal line 0605 immediately before. In this case, the number of bits in the present data of '01101001' which are inverted bits of the immediately preceding data of '11010101' is 5 and the power consumption of the signal line 0605 is thus 5 P.

Now assume a case in which the A information processing device (or the CPU) 0601 transmits data of '10110111' to the B information processing device (or the RAM) 0602 through the signal line 0605 and the data is returned by the B information processing device (or the RAM) 0602 back to the A information processing device (or the CPU) 0601. Let data asserted on the signal line 0605 immediately before be '00010101' and the key be '10101110'.

If the encryption device 0603 and the decryption device 0604 are not provided, the data asserted on the signal line 0605 is changed from '00010101' to '10110111'. Thus, in this case, the number of inverted bits is 3, resulting in a power consumption of 3 P.

In this embodiment, however, the exclusive logical OR computation (EOR) gate 0603 serves as an encryption device generating data to be asserted on the signal line 0605 as a result of bit-to-bit computation of an exclusive logical OR of the key of '10101110' and the data of '10110111' output by the A information processing device (or the CPU) 0601. Thus, the data asserted on the signal line 0605 is '00011001'.

At that time, the data of '00010101' asserted on the signal line 0605 immediately before is changed to the data of '00011001' obtained as a result of the bit-to-bit computation of an exclusive logical OR. Thus, the number of inverted bits is 2, resulting in a power consumption of 2 P. This power consumption of 2 P is different from the power consumption of 3 P which would naturally be obtained without the encryption device 0603 and the decryption device 0604.

The encrypted data of '00011001' is stored in the B information processing device (or the RAM) 0602. Then, the encrypted data of '00011001' is again returned from the B information processing device (or the RAM) 0602 to the A information processing device (or the CPU) 0601 through the signal line 0605.

The data asserted on the signal line 0605 is changed from the previous data of '00011001' to the data '00011001' currently output by the B information processing device (or the RAM) 0602, that is, the data asserted on the signal line 0605 is not changed. Thus, the signal line 0605 is not electrically charged or discharged, resulting in no power consumption.

However, the exclusive logical OR computation (EOR) gate 0604 serving as a decryption device computes a bit-to-bit exclusive logical OR of the data of '00011001' asserted on the signal line 0605 and the key of '10101110' to give a result of '10110111' which is then supplied to the A information processing device (or the CPU) 0601 in place of the data of '00011001' asserted on the signal line 0605. Produced by a decryption process to generate a 0 exclusive logical OR of the bits having the same value and a 1 exclusive logical OR of bits having different values, the exclusive logical OR is processed by the A information processing device (or the CPU) 0601 as correct data. In addition, the power consumption of the signal line is different from that for the original data. Thus, it is difficult to infer the original data from information on the power consumption.

Figure 15:
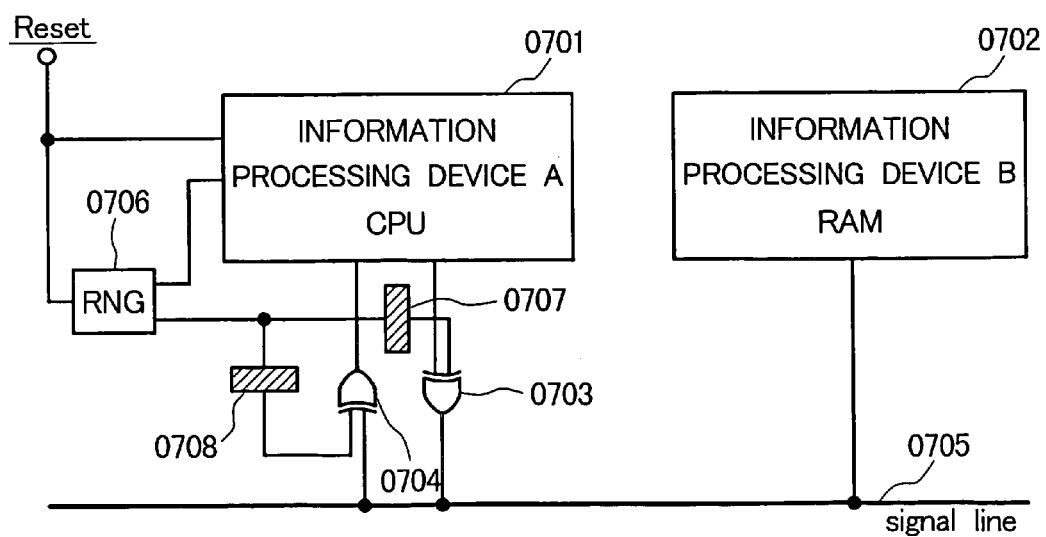
FIG. 15 is a diagram showing the basic configuration of an eighth embodiment of the data processing apparatus specified in the present application for a patent.

FIG. 15 is a diagram showing the basic configuration implementing an eighth embodiment of the data processing apparatus provided by the present invention. The embodiment is an typical implementation that encrypts data to be asserted on a signal line. In addition, a random number is used as a key for encryption or decryption. To be more specific, in this embodiment, data transmitted by an information processing device is encrypted by using a random number. On the other hand, data received by another information processing device is decrypted by using the same random number.

As shown in the figure, the data processing apparatus implemented by the eighth embodiment of the present invention comprises a CPU 0701 serving as an A information processing device and a RAM 0702 used as a B information processing device. The CPU 0701 serving as the A information processing device and the RAM 0702 used as the B information processing device are connected to each other by signal lines (a signal bus) 0705. An encryption device and a decryption device are provided between the A information processing device (or the CPU) 0701 and the signal line 0705. An exclusive logical OR computation (EOR) gate 0703 serves as the encryption device while an exclusive logical OR computation (EOR) gate 0704 serves as the decryption device. A random number is used in the encryption device 0703 and the decryption device 0704 as a key. For this reason, the embodiment also has a RNG random-number generation device 0706, a key buffer 0707 for the encryption device 0703 and a key buffer 0708 for the decryption device 0704. An ordinary random-number generator can be used as the RNG random-number generation device 0706 to assure sufficient performance.

The random-number generation device 0706 operates when receiving a reset signal at the activation of the data processing apparatus. The random-number generation device 0706 generates an 8-bit random number and then stops the operation. The random-number generation device 0706 remains in a halted state till the next reset signal is received. Composed of 8 flip-flops, each of the key buffers 0707 and 0708 is used for storing the 8-bit random number.

In order to make the explanation simple, it is assumed that the signal line 0705 has a size of 8 bits and the A information processing device (or the CPU) 0701 is an 8-bit processor. It should be noted that the sizes of the signal line 0705 and the processing unit of the A information processing device (or the CPU) 0701 assumed in this embodiment are not essential. That is to say, a typical size of the signal line 0705 and a typical processing unit of the A information processing device (or the CPU) 0701 are used in the description merely to make the reader sufficiently comprehend the generality of the present invention. In addition, the following description assumes that the signal line static control method is adopted as a control technique of the signal line 0705. It should be noted that the same effect of the concept adopted by this embodiment can be realized even if the signal line precharge control method is adopted.

The encryption device 0703 employed in this embodiment computes the exclusive logical OR of each bit of a fixed 8-bit key and the corresponding bit of the 8-bit data output by the A information processing device (or the CPU) 0701. By the same token, the decryption device 0704 employed in this embodiment also computes the exclusive logical OR of each bit of the same key and the corresponding bit of transferred data.

The present invention can be designed into the same configuration as the sixth embodiment of the present invention except that, at the reset time, the random-number generation device 0706 is activated to generate a random number as an 8-bit key. Thus, after the 8-bit key is stored in the key buffers 0707 and 0708, basically the same operations as those of the sixth embodiment are carried out. As a result, the power consumption of an operation to electrically charge the signal line 0705 is different from that of the conventional data processing apparatus. In addition, since the key for encryption varies each time the reset signal is received, it is difficult to infer original data from power consumption.

Figure 16:
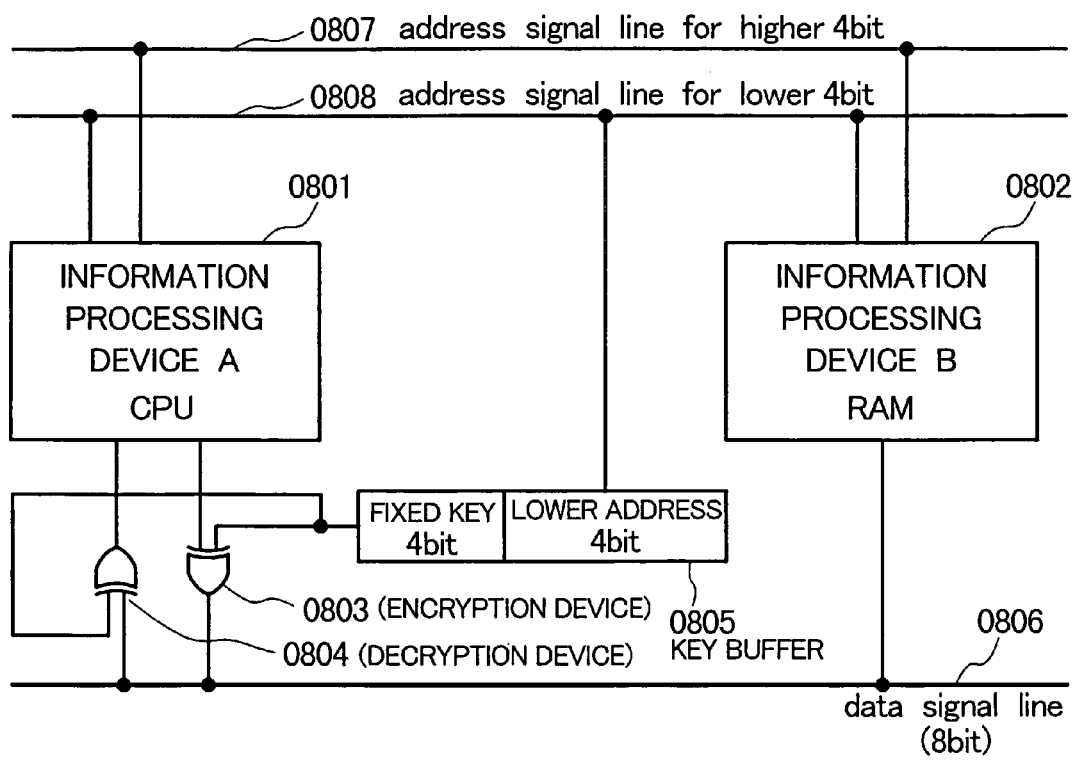
FIG. 16 is a diagram showing the basic configuration of a ninth embodiment of the data processing apparatus specified in the present application for a patent.

FIG. 16 is a diagram showing the basic configuration implementing a ninth embodiment of the data processing apparatus provided by the present invention. The embodiment is another typical implementation that encrypts data to be asserted on a signal line by using an encryption device. In addition, the encryption device includes an encryption-key automatic reconfiguration device. In particular, this embodiment is characterized in that a source for providing information on a key for encryption is provided.

As shown in the figure, the data processing apparatus implemented by the ninth embodiment of the present invention comprises a CPU 0801 serving as an A information processing device and a RAM 0802 used as a B information processing device. The CPU 0801 serving as the A information processing device and the RAM 0802 used as the B information processing device are connected to each other by a data signal line 0806. An exclusive logical OR computation (EOR) gate 0803 serves as the encryption device while an exclusive logical OR computation (EOR) gate 0804 serves as the decryption device. The embodiment also includes a key buffer 0805. In addition, the CPU 0801 serving as the A information processing device and the RAM 0802 used as the B information processing device are connected to each other by a 4-upper-order-bit address signal line 0807 and a 4-lower-order-bit address signal line 0808.

In order to make the explanation simple, it is assumed that the data signal line 0806 has a size of 8 bits, the address signal lines 0807 and 0808 have a total size of 8 bits and the CPU 0801 is an 8-bit processor. It should be noted that the sizes of the data signal line 0806, the address signal lines 0807 and 0808 and the processing unit of the CPU 0801 assumed in this embodiment are not essential. That is to say, the typical sizes of the data signal line 0806 and the address signal lines 0807 and 0808 as well as a typical processing unit of the CPU 0801 are used in the description merely to make the reader sufficiently comprehend the generality of the present invention. In addition, the following description assumes that the signal line static control method is adopted as a control technique of the data signal line 0806 and the address signal lines 0807 and 0808. It should be noted that the same effect of the concept adopted by this embodiment can be realized even if the signal line precharge control method is adopted.

The unit 0803 computes the exclusive logical OR of each bit of a fixed 8-bit key and the corresponding bit of the 8-bit data output by the A information processing device (or the CPU) 0801. By the same token, the decryption device 0804 employed in this embodiment also computes the exclusive logical OR of each bit of the same key and the corresponding bit of transferred data. The 4 higher-order bits of the key buffer 0805 are used for storing fixed bits of the key and the 4 lower-order bits of the key buffer 0805 are used for storing the 4 lower-order bits of an address asserted on the lower-order address signal line 0808.

The key buffer 0805 employed in the embodiment shown in FIG. 16 is explained by referring to a diagram. The fixed bits of the key are referred to as a 4-bit fixed portion which is assumed to be typically a hexadecimal-format value of D.

Consider a case in which data is transferred from the A information processing device (or the CPU) 0801 to an address in the B information processing device (or the RAM) 0802. Assume that the B information processing device (or the RAM) 0802 has addresses of F0 to FF. It should be noted that these addresses are no more than an example.

The A information processing device (or the CPU) 0801 transfers pieces of data sequentially to be stored in at addresses starting from F4 as shown in Table 4.

Table 4

Assume that, immediately before the A information processing device (or the CPU) 0801 transfers data of 5D, data of CF was asserted on the data signal line 0806. In order to transfer the data of 5D, the address of F4 is asserted on the address signal lines 0807 and 0808 to specify a storage location in the B information processing device (or the RAM) 0802.

The data of 5D is supplied to the exclusive logical OR computation (EOR) gate 0803 for computing an exclusive logical OR of 5D and D4 where the first digit D of D4 is the 4-bit fixed portion of the key cited above and the second digit 4 of D4 is the 4 lower-order bits of the address F4 as follows:

5D exor D4=01011101 exor 11010100=10001001=89 where 01011101, 11010100 and 10001001 are values each expressed in the binary format whereas 5D, D4 and 89 are values each expressed in the hexadecimal format. That is to say, the exclusive logical OR computation (EOR) gate 0803 computes a bit-to-bit exclusive logical OR of 5D and D4 where 5D is the 4 higher-order bits and the 4 lower-order bits of the data being transferred whereas D4 is the 4-bit fixed portion of the key and the 4 lower-order bits of the address F4 in order to encrypt the transferred data of 5D.

The amount of power which is consumed when the hexadecimal-format data of 89 is asserted on the data signal line 0806 is 3 P. This is because, when the data asserted on the data signal line 0806 is changed from CF (or 11001111) to 89 (or 10001001), 3 bits are inverted. It should be noted that the symbol P is the amount of power consumption defined in the seventh embodiment of the present invention. To be more specific, 1 P is the amount of power consumption for inversion of 1 bit.

The same operations as the change of the data asserted on the data signal line 0806 from CF (or 11001111) to 89 (or 10001001) take place when the data is changed to 75 (01110101) and finally to 28 (00101000). When the data is changed to 75, the amount of power consumed as a current flowing through the data signal line 0806 is changed from 3 P to 6 P and, when the data is changed to 28, the amount of power consumed as a current flowing through the data signal line 0806 is changed to 2 P.

Without the encryption described above, the data asserted on the data signal line 0806 would naturally change from CF (or 11001111) to 5D (or 01011101), and then to A0 (10100000) and finally to FE (11111110). In this case, the power consumption changes from 3 P to 7 P and then to 5 P. As a result, it is difficult to infer internal data from results of measurements of power consumption of the semiconductor devices.

Figure 17:
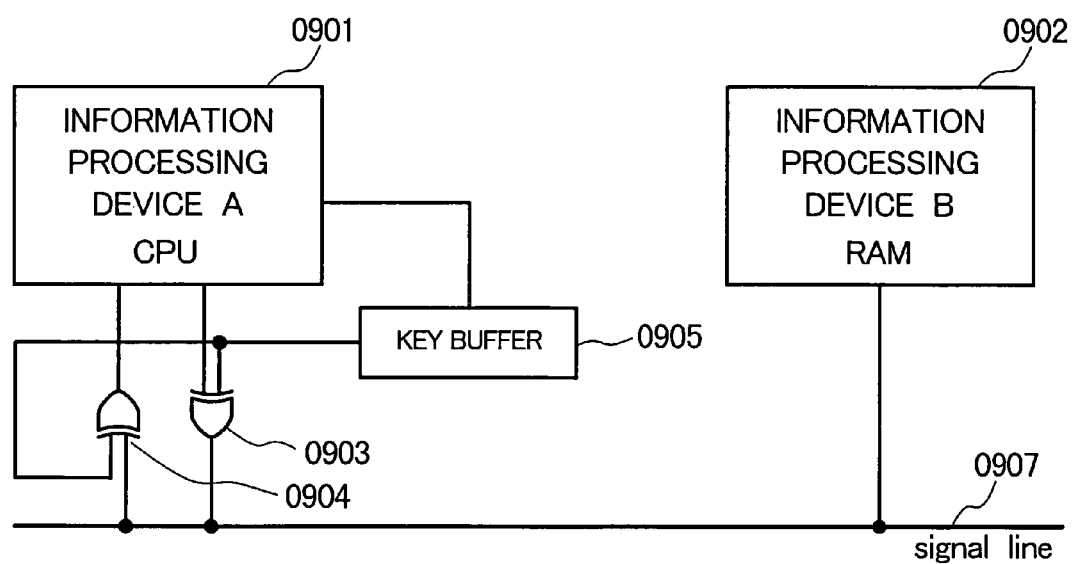
FIG. 17 is a diagram showing the basic configuration of a tenth embodiment of the data processing apparatus specified in the present application for a patent.

FIG. 17 is a diagram showing the basic configuration implementing a tenth embodiment of the data processing apparatus provided by the present invention. The embodiment is another typical implementation that encrypts data to be asserted on a signal line. In addition, an encryption or decryption device of the embodiment includes a configuration means.

As shown in the figure, the data processing apparatus implemented by the tenth embodiment of the present invention comprises a CPU 0901 serving as an A information processing device and a RAM 0902 used as a B information processing device. The CPU 0901 serving as the A information processing device and the RAM 0902 used as the B information processing device are connected to each other by a signal line 0907. An exclusive logical OR computation (EOR) gate 0903 serves as the encryption device while an exclusive logical OR computation (EOR) gate 0904 serves as the decryption device. The embodiment also includes an 8-bit key buffer 0905.

In order to make the explanation simple, it is assumed that the signal line 0907 has a size of 8 bits and the A information processing device (or the CPU) 0901 is an 8-bit processor. It should be noted that the sizes of the signal line 0907 and the processing unit of the A information processing device (or the CPU) 0901 assumed in this embodiment are not essential. That is to say, the typical size of the signal line 0907 and the typical size of the processing unit of the A information processing device (or the CPU) 0901 are used in the description merely to make the reader sufficiently comprehend the generality of the present invention.

Connected to the A information processing device (or the CPU) 0901, the key buffer 0905 is used for storing data output by the A information processing device (or the CPU) 0901. The key buffer 0905 is also used for decrypting data output from the B information processing device (or the RAM) 0902 and encrypting data to be supplied to the B information processing device (or the RAM) 0902. The configuration of the tenth embodiment is the same as that of the sixth embodiment except that the A information processing device (or the CPU) 0901 is capable of updating a key. It is thus unnecessary to repeat the detailed explanation.

Figure 40:
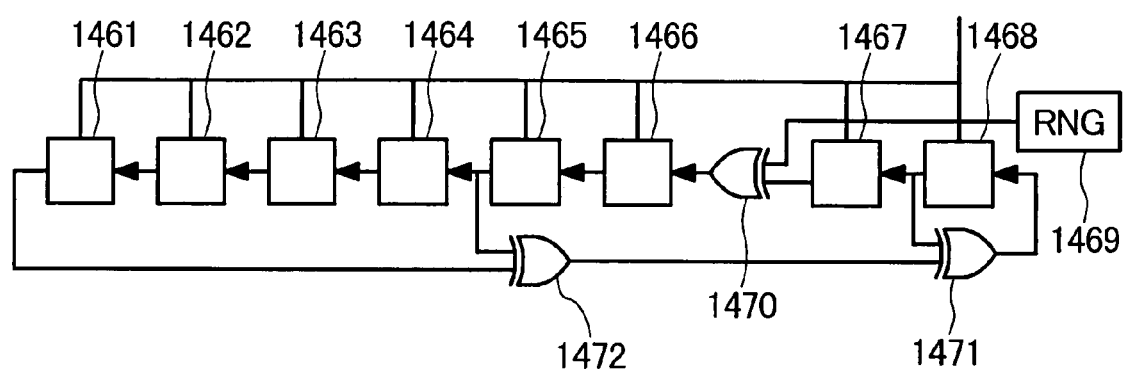
FIG. 40 is a diagram showing an embodiment implementing a key buffer.

An actual typical implementation of the key buffer 0905 is shown in FIG. 40. It should be noted that key buffers 1607, 1406, 1407 and 1607 employed in embodiments shown in FIGS. 25, 28 and 29 can of course be used in the tenth embodiment.

The key buffer 0905 is explained by referring to FIG. 40. As shown in the figure, the key buffer 0905 comprises 1-bit shift registers 1461, 1462, 1463, 1464, 1465, 1466 and 1467 and 1468, 1-bit exclusive logical OR computation (EOR) gates 1470, 1471 and 1472 and a random-number generation device RNG 1469. The 1-bit shift registers 1461, 1462, 1463, 1464, 1465, 1466 and 1467 and 1468 are each used for storing an initial bit. In order to make the explanation simple, it is assumed that the initial bits are 10101110. Each time bits are shifted through the 1-bit shift registers 1461, 1462, 1463, 1464, 1465, 1466 and 1467 and 1468, the unit random-number generation device RNG 1469 generates 1 bit of a random number. In this way, the random number is generated sequentially one bit after another. For example, a sequence of bits of 011 are generated.

At that time, a series of 8 bits stored in the key buffer 0905 changes as follows:

10101110-->01011100-->10111101-->01111111

The changing behavior of the 8 bits is known to be very similar to that of a random number. In many cases, it generally takes time to generate a correct random number. In this embodiment, by merely using a 1-bit random number, a train of 8-bit pseudo random numbers can be generated. Thus, the random-number generation means employed in this embodiment allows processing to be carried out at a very high speed. Thus, an extremely practical information processing device can be provided by the high speed random-number generation means employed in this embodiment.

Figure 18:
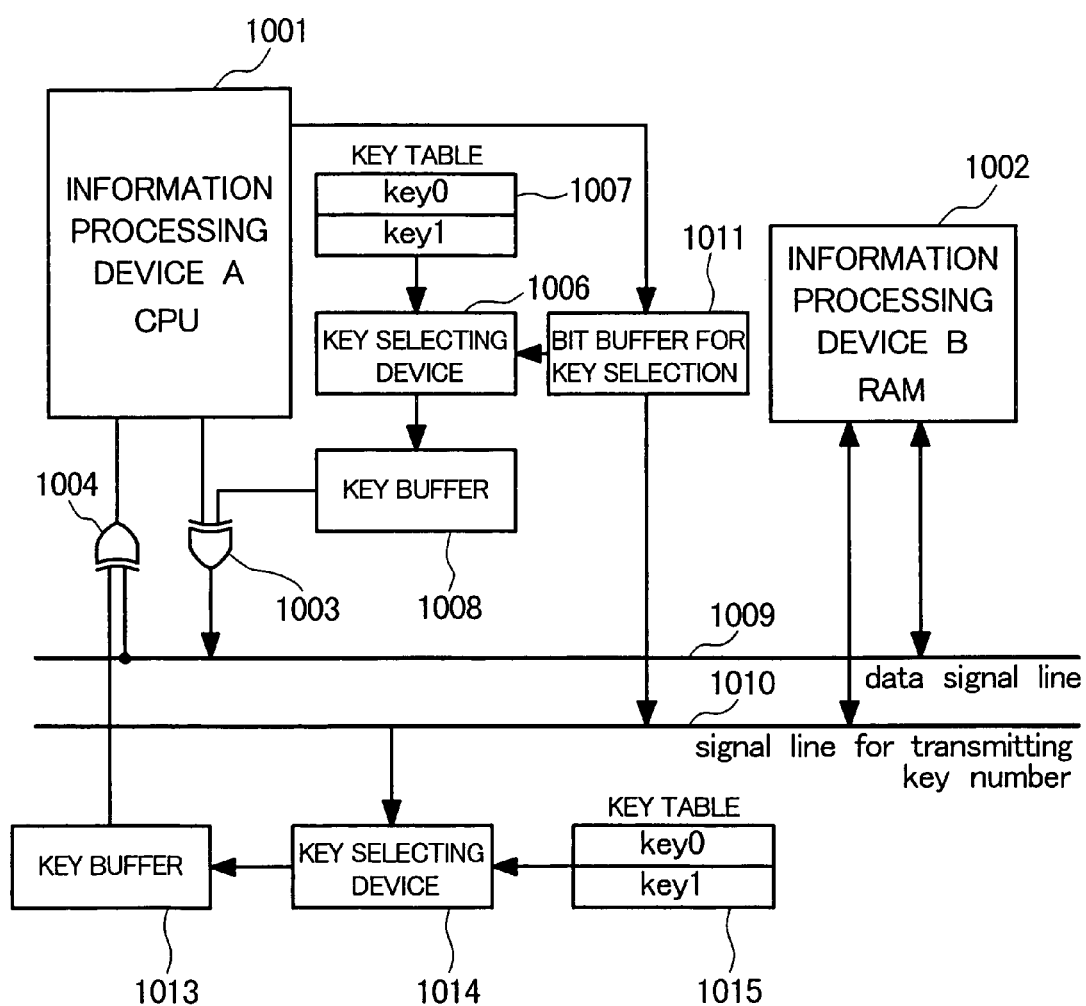
FIG. 18 is a diagram showing the basic configuration of an eleventh embodiment of the data processing apparatus specified in the present application for a patent.

FIG. 18 is a diagram showing the basic configuration of an eleventh embodiment of the data processing apparatus provided by the present invention. The embodiment is another typical implementation that encrypts data to be asserted on a signal line. In addition, in this embodiment, a key is selected by using a multiplexer serving as key selecting device.

As shown in the figure, the data processing apparatus implemented by the eleventh embodiment of the present invention comprises a CPU 1001 serving as an A information processing device and a RAM 1002 used as a B information processing device. The CPU 1001 serving as the A information processing device and the RAM 1002 used as the B information processing device are connected to each other by a data signal line 1009. An exclusive logical OR computation (EOR) gate 1003 serves as an encryption device while an exclusive logical OR computation (EOR) gate 1004 serves as a decryption device.

In addition, the embodiment also includes multiplexers 1006 and 1014 each serving as a key selecting device, key tables 1007 and 1015, key buffers 1008 and 1013 and a signal line 1010 for transmitting a key number. It should be noted that the key tables 1007 and 1015 are each used for storing Key 0 and Key 1. Of course, a rewritable table can be used as a key table in this embodiment. Connected to the key buffer 1008, the key selecting device 1006 is used in conjunction with the encryption device 1003. Connected to the key buffer 1013, on the other hand, the key selecting device 1014 is used in conjunction with the decryption device 1004. The signal line 1010 used for transferring a key number is also referred to as a key-number transfer signal line.

In order to make the explanation simple, it is assumed that the data signal line 1009 has a size of 8 bits and the A information processing device (or the CPU) 1001 is an 8-bit processor. It should be noted that the sizes of the data signal line 1009 and the processing unit of the A information processing device (or the CPU) 1001 assumed in this embodiment are not essential. That is to say, the typical size of the data signal line 1009 and the typical size of the processing unit of the A information processing device (or the CPU) 1001 are used in the description merely to make the reader sufficiently comprehend the generality of the present invention.

In the case of this embodiment, the user is capable of selecting a key stored in the key table 1007 to be used for encryption by specifying the desired key to a key select bit buffer 1011. An example of the user is an enterprise producing an application of the IC card. A value stored in the key select bit buffer 1011 is referred to hereafter as SKEYBIT.

The multiplexer serving as the key selecting device 1006 fetches a desired key from the key table 1007 by referring to SKEYBIT stored in the key select bit buffer 1011 and stores the fetched key in the key buffer 1008. To be more specific, for SKEYBIT of 0, the multiplexer serving as the key selecting device 1006 fetches Key 0 from the key table 1007 and stores Key 0 in the key buffer 1008. For SKEYBIT of 1, on the other hand, the multiplexer serving as the key selecting device 1006 fetches Key 1 from the key table 1007 and stores Key 1 in the key buffer 1008.

When the A information processing device (or the CPU) 1001 transfers data to the B information processing device (or the RAM) 1002, the exclusive logical OR computation (EOR) gate 1003 computes the exclusive logical OR of the 8-bit key stored in the key buffer 1008 and the 8-bit data output by the A information processing device (or the CPU) 1001. The sum is then transferred to the B information processing device (or the RAM) 1002 through the data signal line 1009. At the same time, SKEYBIT stored in the key select bit buffer 1011 is transferred to the B information processing device (or the RAM) 1002 through the key-number transfer signal line 1010. Information stored in the B information processing device (or the RAM) 1002 at that time is shown in Table 5.

Table 5

The information indicates that the data has been encrypted by using a key indicated by SKEYBIT. SKEYBIT stored in the key select bit buffer 1011 can be updated by a program to give another key for encryption. Examples of information stored in the B information processing device (or the RAM) 1002 are listed as follows:

| SKEYBIT | Data |
|---|---|
| 1 | EF |
| 0 | A3 |
| 1 | 3E |
| 1 | 54 |
| 0 | 3D |

When any of the data is returned to the A information processing device (or the CPU) 1001, the following operation is carried out. Before transferring the encrypted data, a key select bit is transferred from the B information processing device (or the RAM) 1002 to the key selecting device 1014 through the key-number transfer signal line 1010. The key selecting device 1014 selects a key from the key table 1015 in accordance with the key select bit and transfers the selected key to the key buffer 1013. Then, the A information processing device (or the CPU) 1001 requests the B information processing device (or the RAM) 1002 to transmit the data. In response to this request, the B information processing device (or the RAM) 1002 asserts the data on the data signal line 1009. Then, the exclusive logical OR computation (EOR) gate 1004 computes an exclusive logical OR of the data and the key stored in the key buffer 1013, supplying the sum to the A information processing device (or the CPU) 1001. The sum is obtained as a result of a decoding process by using a key used in the encryption. The A information processing device (or the CPU) 1001 is thus capable of processing the sum as correct data.

Figure 19:
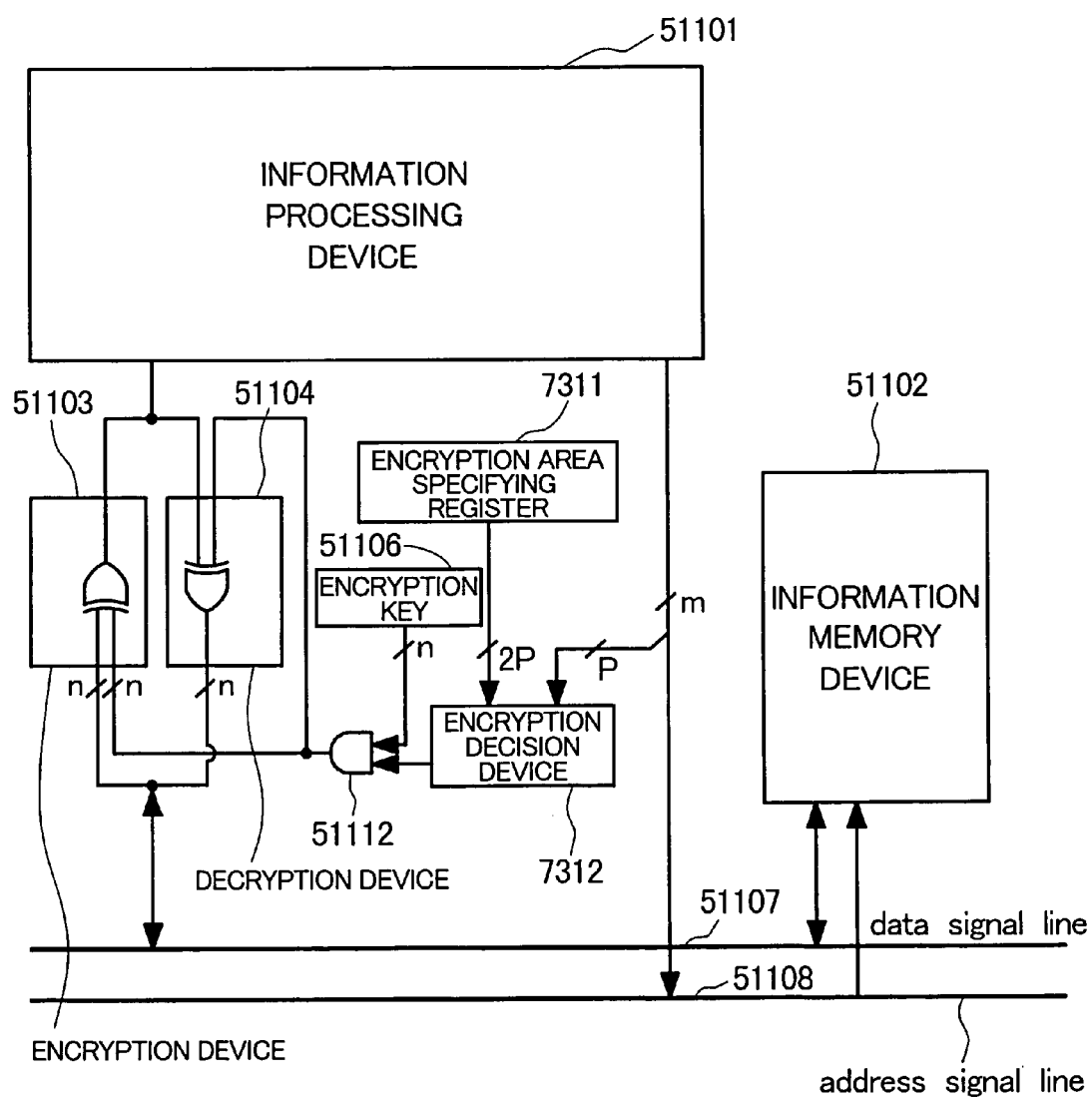
FIG. 19 is a diagram showing the basic configuration of a twelfth embodiment of the data processing apparatus specified in the present application for a patent.

FIG. 19 is a diagram showing the basic configuration of an twelfth embodiment of the data processing apparatus provided by the present invention. The embodiment is another typical implementation that encrypts data to be asserted on a signal line for transmission. In addition, in this embodiment, a memory device is divided into a plurality of storage areas. The embodiment adopts a method for specifying whether or not encryption is needed for each area and allowing encryption and decryption to be carried out for an area with encryption specified therefor.

As shown in the figure, the data processing apparatus implemented by this embodiment comprises an information processing device 51101 and an information memory device 51102 which are connected to each other by a data signal line 51107. Exclusive logical OR computation (EOR) gates serving as an encryption device 51103 and a decryption device 51104 are provided for the information processing device 51101. In this embodiment, an encryption decision device 7312 forms a judgment as to whether or not encryption is necessary for the current transfer of data and supplies the outcome of the judgment to the encryption device 51103 and the decryption device 51104 by way of a logical-product computation (AND) gate 51112. In order to carry out this operation, there are also provided an encryption-key memory device 51106 and an encryption-area specifying register 7311 besides the encryption decision device 7312 and the AND gate 51112. In addition, the information processing device 51101 and the information memory device 51102 are also connected to each other by an address signal line 51108.

The configuration of the information memory device 51102 itself can be made the same as an ordinary one to assure sufficient performance. The storage area of the information memory device 51102 is divided by address into a plurality of areas. The encryption-area specifying register 7311 is used for specifying whether or not encryption is necessary for each of the storage areas. The encryption decision device 7312 forms a judgment as to whether or not encryption is to be carried out for the current transfer of data by using an address appearing on the address signal line 51108 and a value stored in the encryption-area specifying register 7311.

Figure 20:
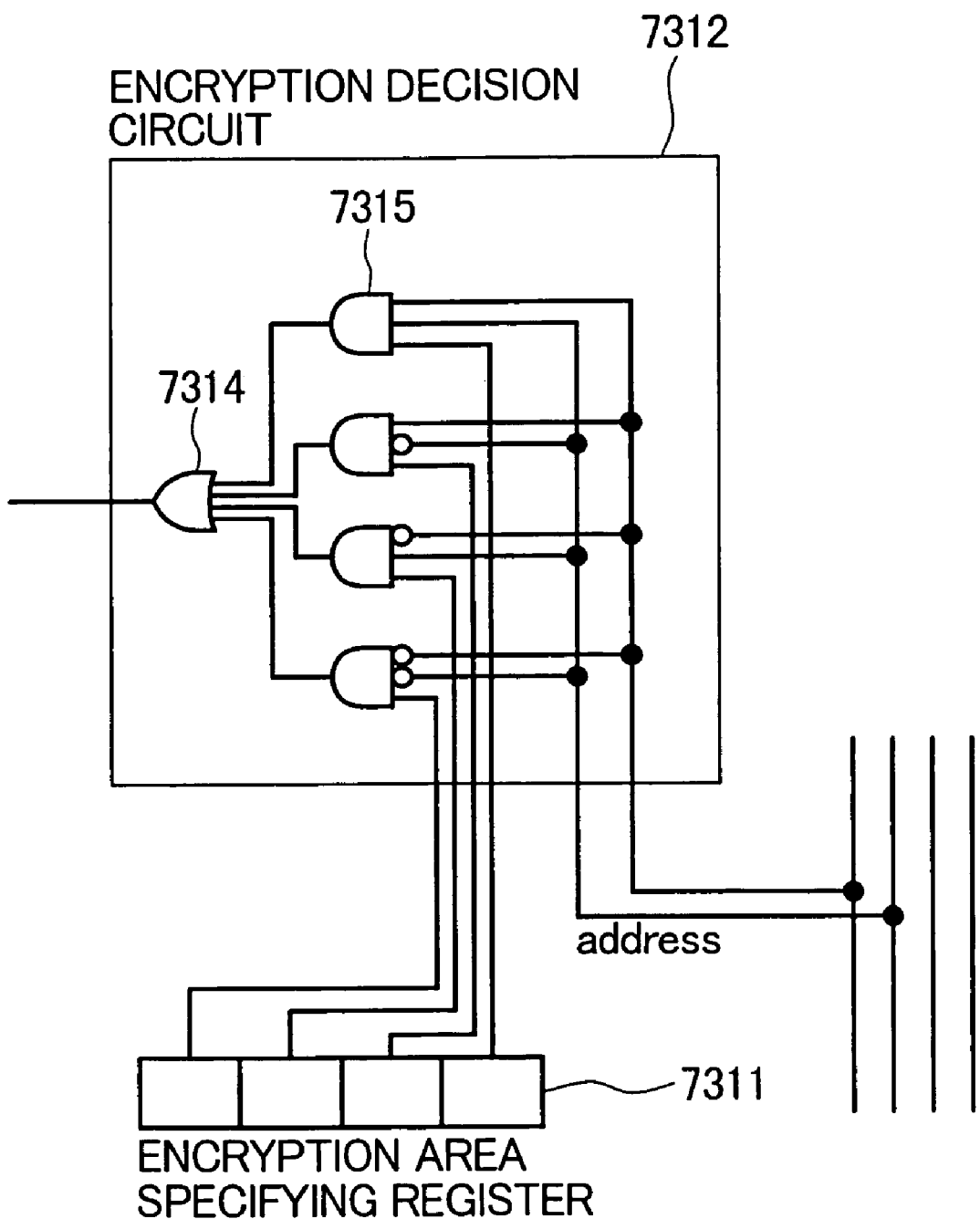
FIG. 20 is a diagram showing a typical encryption decision circuit.

FIG. 20 is a diagram showing an embodiment implementing the encryption decision device 7312. Assume that the information memory device 51102 is divided into $2^p$ storage areas. In this case, the encryption-area specifying register 7311 has a length of $2^p$ bits each for indicating whether or not encryption is necessary for one of the storage areas. As shown in the figure, the p high-order bits of the address signal line 51108 and data stored in the encryption-area specifying register 7311 are supplied to the encryption decision device 7312. The encryption decision device 7312 is thus capable of forming a judgment as to whether or not encryption is necessary for the current transfer of data.

To put it in detail, each of logical-product computation (AND) gates 7315 receives a decoded result of the p high-order bits of the address signal line 51108 and a bit of the encryption-area specifying register 7311. A 1 output of an AND gate 7315 indicates that a storage area represented by the p high-order bits of the address signal line 51108 requires encryption and the storage area is accessed in the current transfer of data. On the other hand, a 0 output of an AND gate 7315 indicates that a storage area represented by the p high-order bits of the address signal line 51108 does not require encryption and/or the storage area is not accessed in the current transfer of data. The outputs of the AND gates 7315 are supplied to a logical sum computation (OR) gate 7314 for computing a logical sum of the outputs. A 1 signal output by the OR gate 7314 thus indicates that encryption is necessary for the current transfer of data. On the other hand, a 0 signal output by the OR gate 7314 thus indicates that encryption is not necessary for the current transfer of data.

The signal output by the OR gate 7314 is the output of the encryption decision device 7312 supplied to the AND circuit 51112 which computes a logical product of the output and a key for encryption and supplies the logical product to the encryption device 51103 and the decryption device 51104. When encryption is necessary, the AND gate 51112 outputs the key for encryption. When encryption is not necessary, on the other hand, the AND gate 51112 outputs 0. When the 0 output is supplied to the encryption device 51103 or 51104, the data to be transferred is passed on by the encryption device 51103 or 51104 as it is without being encrypted or decrypted.

The decryption procedure for a read operation is the same as the write operation described above. To put it in detail, the read address and the contents of the encryption-area specifying register 7311 are used for determining whether the key for encryption or a value of 0 is to be used for decryption.

As described above, the information memory device 51102 is divided by address into a plurality of storage areas, and information is set in the encryption-area specifying register 7311 for each of the storage areas to indicate whether or not the storage area needs encryption. For a storage area requiring encryption, the bit pattern appearing on the data signal line 51107 is different from the bit pattern of data stored in the information memory device 51102. It is thus difficult to infer the actual data from the pattern of a current consumed during an operation to write or read out data into or from the information memory device 51102b or the pattern of a current consumed in the data signal line 51107.

Figure 21:
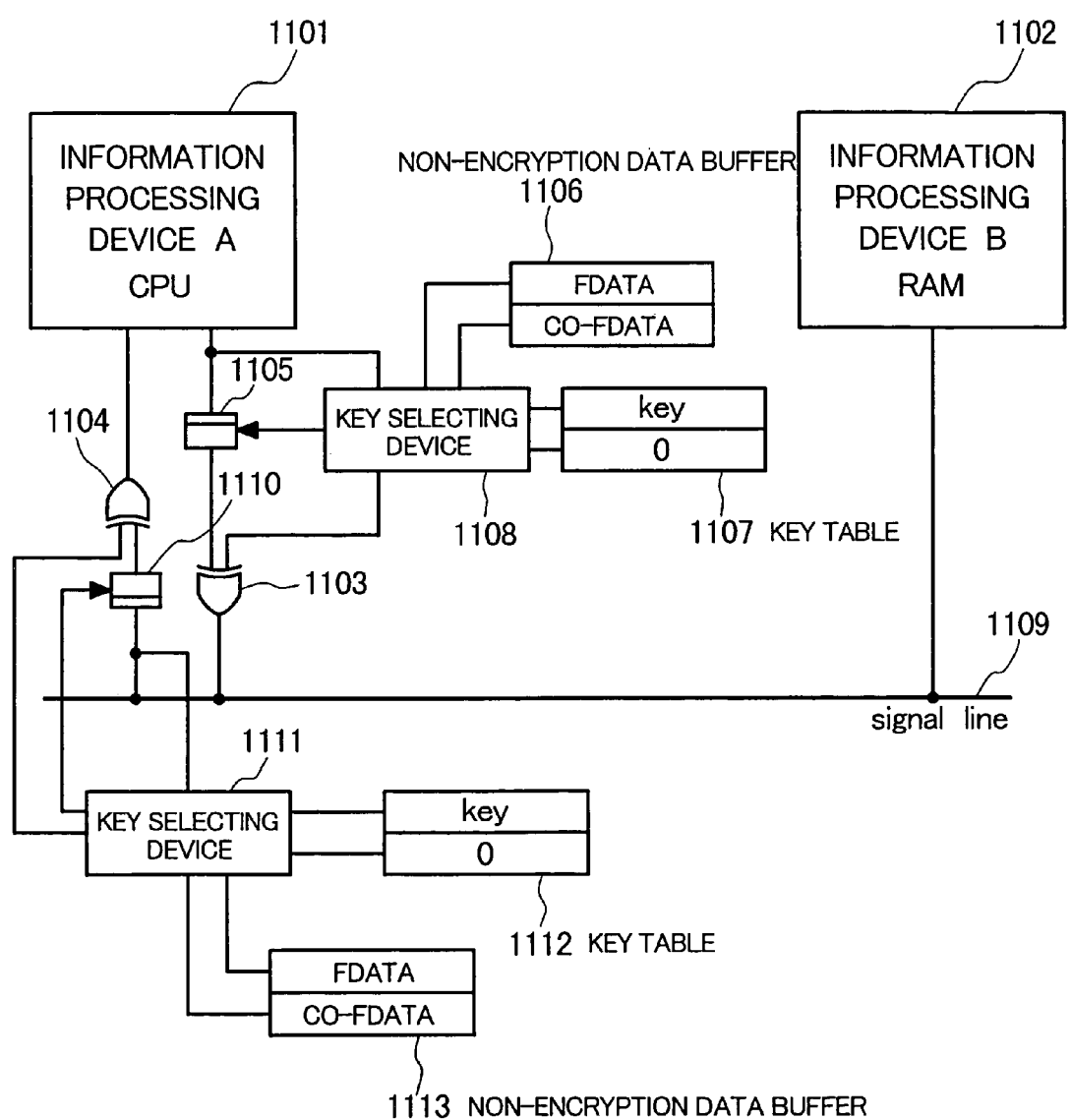
FIG. 21 is a diagram showing the basic configuration of a thirteenth embodiment of the data processing apparatus specified in the present application for a patent.

FIG. 21 is a diagram showing the basic configuration of a thirteenth embodiment of the data processing apparatus provided by the present invention. The embodiment is another typical implementation that encrypts data to be asserted on a signal line. In this embodiment, a specific data pattern is not encrypted.

As shown in the figure, the data processing apparatus implemented by the thirteenth embodiment of the present invention comprises a CPU 1101 serving as an A information processing device and a RAM 1102 used as a B information processing device. The CPU 1101 serving as the A information processing device and the RAM 1102 used as the B information processing device are connected to each other by a signal line 1109. An exclusive logical OR computation (EOR) gate 1103 serves as an encryption device while an exclusive logical OR computation (EOR) gate 1104 serves as a decryption device. In addition, the embodiment also includes a latch circuit 1105, an 8-bit non-encryption data buffer 1106, a non-decryption data buffer 1113, a key tables 1107 and 1112, key selecting devices 1108 and 1111. The latch circuit 1105 is used for selecting a key to be used by the encryption device 1103 and the decryption device 1104.

Data stored in the non-decryption data buffer 1113 is the same as data stored in the non-encryption data buffer 1106. In addition, data stored in the key table 1107 is exactly the same as data stored in the key table 1112.

In order to make the explanation simple, it is assumed that the signal line 1109 has a size of 8 bits and the A information processing device (CPU) 1101 is an 8-bit processor. It should be noted that the sizes of the signal line 1109 and the processing unit of the A information processing device (CPU) 1101 assumed in this embodiment are not essential. That is to say, the typical size of the signal line 1109 and the typical size of the processing unit of the A information processing device (CPU) 1101 are used in the description merely to make the reader sufficiently comprehend the generality of the present invention.

The key table 1107 is used for storing a key for encryption and a value of 0. The non-encryption data buffer 1106 and the non-decryption data buffer 1113 are used for storing non-encrypted data FDATA as well as an exclusive logical OR of the non-encryption data FDATA and the key for encryption. The exclusive logical OR of the non-encryption data FDATA and the key for encryption is referred to as CO-FDATA. A reason why CO-FDATA is required is explained as follows. If the exclusive logical OR of data and the key for encryption matches FDATA, when the encrypted data is returned from the B information processing device (RAM) 1102 to the A information processing device (CPU) 1101, the data is supplied to the A information processing device (CPU) 1101 with the data encrypted as it is. As a result, incorrect processing of the encrypted data will be carried out by the A information processing device (CPU) 1101.

Since only the exclusive logical OR of CO-FDATA and the key for encryption matches FDATA, data that must be stored in the non-encryption data buffer 1106 and the non-decryption data buffer 1113 is the non-encryption data FDATA and CO-FDATA only.

When the A information processing device (CPU) 1101 transfers data to the B information processing device (RAM) 1102 through the signal line 1109, the data is supplied to the key selecting device 1108 and the latch circuit 1105. The latch circuit 1105 holds the data till a data holding release signal OUTDATA-BIT output by the key selecting device 1108 is set at 1. As OUTDATA-BIT is set at 1, the data holding is terminated and the data is released to the exclusive logical OR computation (EOR) gate 1103. The data supplied to the key selecting device 1108 is compared with the 8-bit non-encryption data FDATA and CO-FDATA stored in the non-encryption data buffer 1106. If the data supplied to the key selecting device 1108 matches either the 8-bit non-encryption data FDATA or CO-FDATA stored in the non-encryption data buffer 1106, a value of 0 is selected by the key selecting device 1108 from the key table 1107 and stored therein. Then, OUTBIT-DATA of 1 is supplied to the latch circuit 1105 and, at the same time, a value of 0 is supplied to the exclusive logical OR computation (EOR) gate 1103. Since the exclusive logical OR of x and 0 is x, in this case, the data is asserted on the signal line 1109 without being encrypted and then supplied to the B information processing device (RAM) 1102.

If the data supplied to the key selecting device 1108 matches neither the non-encryption data FDATA nor CO-FDATA, on the other hand, a key is selected by the key selecting device 1108 from the key table 1107 and stored therein. Then, OUTBIT-DATA of 1 is supplied to the latch circuit 1105 and, at the same time, the selected key is supplied to the exclusive logical OR computation (EOR) gate 1103. Subsequently, the data is asserted on the signal line 1109 after being encrypted by using the key and then supplied to the B information processing device (RAM) 1102.

In an operation to transfer data from the B information processing device (RAM) 1102 to the A information processing device (CPU) 1101, on the other hand, the data is asserted on the signal line 1109 as it is. Also in this operation, the same process as that described above is carried out by a key selecting device 1111 to compare the data with 8-bit non-decryption data FDATA and CO-FDATA stored in the non-decryption data buffer 1113. If the data matches either the 8-bit non-encryption data FDATA or CO-FDATA, a value of 0 is selected from the key table 1112 and no decryption is carried out. If the data matches neither the 8-bit non-encryption data FDATA nor CO-FDATA, on the other hand, a key is selected from the key table 1112 and decryption is carried out. As a result, correct data is supplied to the A information processing device (CPU) 1101 to be processed properly.

Figure 22:
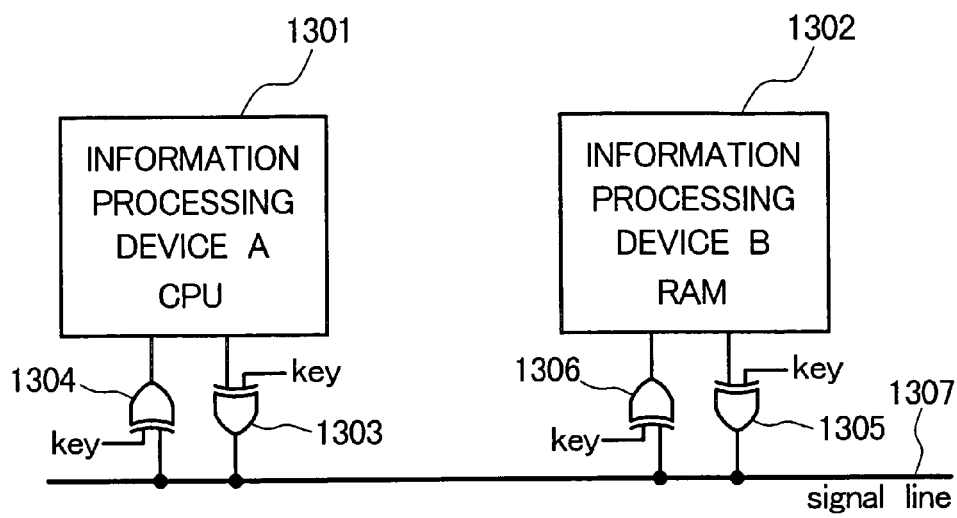
FIG. 22 is a diagram showing the basic configuration of a fourteenth embodiment of the data processing apparatus specified in the present application for a patent.

FIG. 22 is a diagram showing the basic configuration of a fourteenth embodiment of the data processing apparatus provided by the present invention. The embodiment is another typical implementation that encrypts data to be asserted on a signal line. In addition, the embodiment includes encryption and decryption devices between an A information processing device and a signal line as well as encryption and decryption devices between a B information processing device and the signal line.

As shown in the figure, the data processing apparatus implemented by the fourteenth embodiment of the present invention comprises a CPU 1301 serving as an A information processing device and a RAM 1302 used as a B information processing device. The CPU 1301 serving as the A information processing device and the RAM 1302 used as the B information processing device are connected to each other by a signal line 1307. An exclusive logical OR computation (EOR) gate 1303 serves as an encryption device between the CPU 1301 and the signal line 1307 while an exclusive logical OR computation (EOR) gate 1304 serves as a decryption device between the CPU 1301 and the signal line 1307. By the same token, an exclusive logical OR computation (EOR) gate 1305 serves as an encryption device between the RAM 1302 and the signal line 1307 while an exclusive logical OR computation (EOR) gate 1306 serves as a decryption device between the RAM 1302 and the signal line 1307. The exclusive logical OR computation (EOR) gates 1303, 1304, 1305 and 1306 each compute an exclusive logical OR of data being transferred and a key common to all the exclusive logical OR computation (EOR) gates 1303, 1304, 1305 and 1306. Data output by the A information processing device (or the CPU) 1301 is encrypted by the exclusive logical OR computation (EOR) gate 1303 before being transferred to the B information processing device (or the RAM) 1302 through the signal line 1307. Before being supplied to the B information processing device (or the RAM) 1302, however, the transferred data is decrypted by the exclusive logical OR computation (EOR) gate 1306.

Unlike the sixth embodiment of the present invention, data stored in the B information processing device (or the RAM) 1302 is not encrypted data. That is to say, data stored in the B information processing device (or the RAM) 1302 is thus the original data. In an operation to transfer data from the B information processing device (or the RAM) 1302 to the A information processing device (or the CPU) 1301, on the other hand, data output by the B information processing device (or the RAM) 1302 is encrypted by the exclusive logical OR computation (EOR) gate 1305 before being transferred to the A information processing device (or the CPU) 1301 through the signal line 1307. Before being supplied to the A information processing device (or the CPU) 1301, however, the transferred data is decrypted by the exclusive logical OR computation (EOR) gate 1304.

During the data transfer operations, electrical charging and discharging phenomena of the signal line 1307 occur in exactly the same way as the data processing apparatus implemented by the sixth embodiment.

Figure 23:
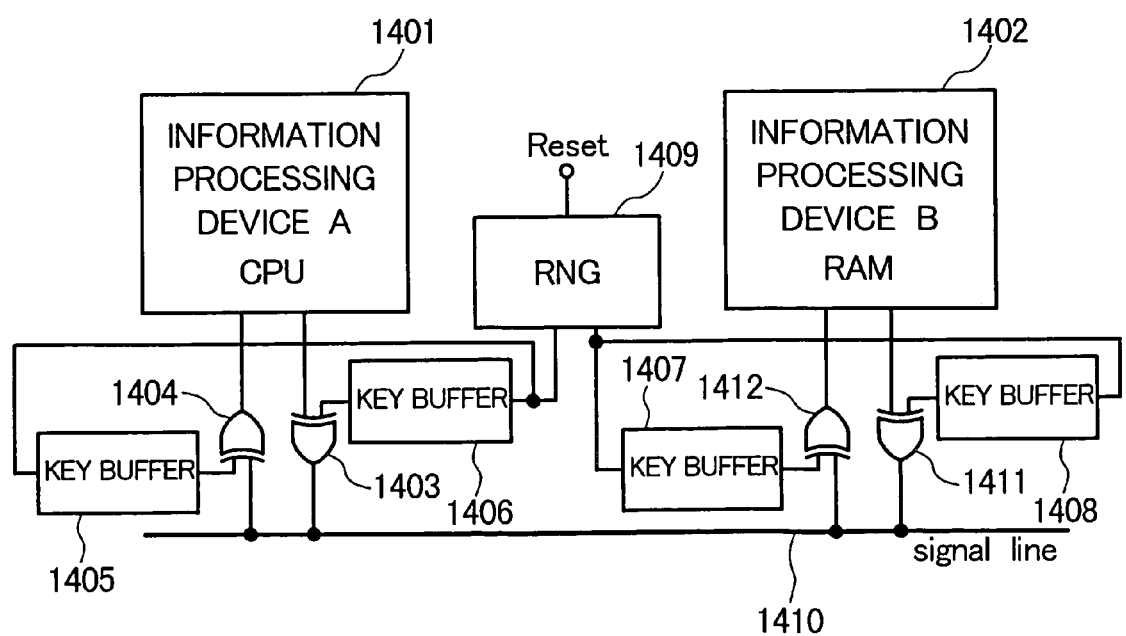
FIG. 23 is a diagram showing the basic configuration of a fifteenth embodiment of the data processing apparatus specified in the present application for a patent.

FIG. 23 is a diagram showing the basic configuration of a fifteenth embodiment of the data processing apparatus provided by the present invention. The embodiment is another typical implementation that encrypts data to be asserted on a signal line. The data processing apparatus implemented by this embodiment is the same as the data processing apparatus implemented by the sixth embodiment except that data is transferred in two directions. As shown in the figure, the data processing apparatus implemented by the fifteenth embodiment of the present invention comprises a CPU 1401 serving as an A information processing device and a RAM 1402 used as a B information processing device. The CPU 1401 serving as the A information processing device and the RAM 1402 used as the B information processing device are connected to each other by a signal line 1410. An exclusive logical OR computation (EOR) gate 1403 serves as an encryption device between the A information processing device (or the CPU) 1401 and the signal line 1410 while an exclusive logical OR computation (EOR) gate 1404 serves as a decryption device between the A information processing device (or the CPU) 1401 and the signal line 1410. By the same token, an exclusive logical OR computation (EOR) gate 1411 serves as an encryption device between the B information processing device (or the RAM) 1402 and the signal line 1410 while an exclusive logical OR computation (EOR) gate 1412 serves as a decryption device between the B information processing device (or the RAM) 1402 and the signal line 1410. In addition, the embodiment also includes a random-number generation device RNG 1409 and key buffers 1405, 1406, 1407 and 1408.

The random-number generation device RNG 1409 operates when receiving a reset signal at the activation of the data processing apparatus. The random-number generation device RNG 1409 generates an 8-bit random number and then stops the operation. The random-number generation device RNG 1409 remains in a halted state till the next reset signal is received. Composed of 8 flip-flops, each of the key buffers 1405, 1406, 1407 and 1408 is used for storing the 8-bit random number.

In order to make the explanation simple, it is assumed that the signal line 1410 has a size of 8 bits and the A information processing device (or the CPU) 1401 is an 8-bit processor. It should be noted that the sizes of the signal line 1410 and the processing unit of the A information processing device (or the CPU) 1401 assumed in this embodiment are not essential. That is to say, the typical size of the signal line 1410 and the typical size of the processing unit of the A information processing device (or the CPU) 1401 are used in the description merely to make the reader sufficiently comprehend the generality of the present invention. In addition, the following description assumes that the signal line static control method is adopted as a control technique of the signal line 1410. It should be noted that the same effect of the concept adopted by this embodiment can be realized even if the signal line precharge control method is adopted.

The present embodiment is the same as the data processing apparatus implemented by the thirteenth embodiment except for a portion for activating the random-number generation device RNG 1409 at the reset time and setting an 8-bit key. Thus, operations after setting a key in the key buffers are carried out in the same way as the thirteenth embodiment. It is therefore unnecessary to repeat the detailed explanation.

Also in the case of this embodiment, the power consumption accompanying electrical charging and discharging phenomena of the signal line 1410 is different from the amount of power that would be consumed if original data were transmitted through the signal line 1410. In addition, the key for encryption is changed at every reset time. As a result, it is difficult to infer the original data from power consumption.

Figure 24:
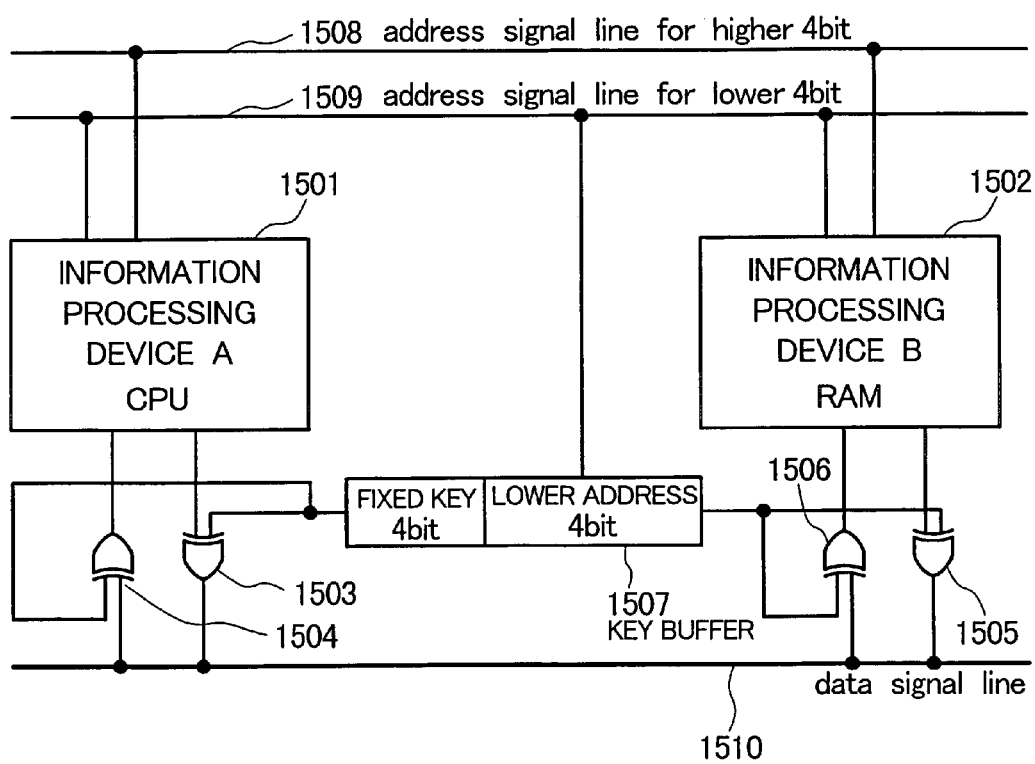
FIG. 24 is a diagram showing the basic configuration of a sixteenth embodiment of the data processing apparatus specified in the present application for a patent.

FIG. 24 is a diagram showing the basic configuration of a sixteenth embodiment of the data processing apparatus provided by the present invention. The embodiment is another typical implementation that encrypts data to be asserted on a signal line. In addition, in the case of this embodiment, information on an address in an information memory device is used as a portion of a key for encryption.

The data processing apparatus implemented by this embodiment is the same as the data processing apparatus implemented by the seventh embodiment except that data is transferred in two directions. As shown in the figure, the data processing apparatus implemented by the sixteenth embodiment of the present invention comprises a CPU 1501 serving as an A information processing device and a RAM 1502 used as a B information processing device. The CPU 1501 serving as the A information processing device and the RAM 1502 used as the B information processing device are connected to each other by a data signal line 1510. An exclusive logical OR computation (EOR) gate 1503 serves as an encryption device between the A information processing device (or the CPU) 1501 and the data signal line 1510 while an exclusive logical OR computation (EOR) gate 1504 serves as a decryption device between the A information processing device (or the CPU) 1501 and the data signal line 1510. By the same token, an exclusive logical OR computation (EOR) gate 1505 serves as an encryption device between the B information processing device (or the RAM) 1502 and the data signal line 1510 while an exclusive logical OR computation (EOR) gate 1506 serves as a decryption device between the B information processing device (or the RAM) 1502 and the data signal line 1510. The embodiment also includes a key buffer 1507. In addition, the A information processing device (or the CPU) 1501 and the B information processing device (or the RAM) 1502 are connected to each other by a 4-upper-order-bit address signal line 1508 and a 4-lower-order-bit address signal line 1509.

In order to make the explanation simple, it is assumed that the data signal line 1510 has a size of 8 bits, the address signal lines 1508 and 1509 have a total size of 8 bits and the A information processing device (or the CPU) 1501 is an 8-bit processor. It should be noted that the sizes of the data signal line 1510, the address signal lines 1508 and 1509 and the processing unit of the A information processing device (or the CPU) 1501 assumed in this embodiment are not essential. That is to say, the typical sizes of the data signal line 1510 and the address signal lines 1508 and 1509 as well as the typical size of the processing unit of the A information processing device (or the CPU) 1501 are used in the description merely to make the reader sufficiently comprehend the generality of the present invention. In addition, the following description assumes that the signal line static control method is adopted as a control technique of the data signal line 1510 and the address signal lines 1508 and 1509. It should be noted that the same effect of the concept adopted by this embodiment can be realized even if the signal line precharge control method is adopted.

The exclusive logical OR computation (EOR) gate 1503 serves as an encryption device for computing an exclusive logical OR of 8-bit data being transferred by the A information processing device (or the CPU) 1501 and a fixed 8-bit key. By the same token, the exclusive logical OR computation (EOR) gate 1505 serves as an encryption device for computing an exclusive logical OR of 8-bit data being transferred by the B information processing device (or the RAM) 1502 and a fixed 8-bit key. On the other hand, the exclusive logical OR computation (EOR) gate 1504 serves as a decryption device for computing an exclusive logical OR of 8-bit data being transferred from the B information processing device (or the RAM) 1502 and a fixed 8-bit key. By the same token, the exclusive logical OR computation (EOR) gate 1506 serves as a decryption device for computing an exclusive logical OR of 8-bit data being transferred by the A information processing device (or the CPU) 1501 and a fixed 8-bit key. The 4 higher-order bits of the key buffer 1507 are used for storing fixed bits of the key, and the 4 lower-order bits of the key buffer 1507 are used for storing the 4 lower-order bits of an address asserted on the address signal line 1509.

The operation to transfer data from the A information processing device (or the CPU) 1501 is the same as the data processing apparatus implemented by the seventh embodiment.

In such an operation, however, encrypted data is not transferred from the data signal line 1510 to the B information processing device (or the RAM) 1502 as it is. Instead, the encrypted data is decrypted by the decryption device 1506 before being supplied to the B information processing device (or the RAM) 1502.

In an operation to transfer data from the B information processing device (or the RAM) 1502 to the A information processing device (or the CPU) 1501, on the other hand, first of all, the A information processing device (or the CPU) 1501 outputs the address of the data to the B information processing device (or the RAM) 1502 through the address signal lines 1508 and 1509. A portion of the address asserted on the address signal line 1509 is also supplied to the key buffer 1507 to determine a value stored in the key buffer 1507. An exclusive logical OR of the value and the data output by the B information processing device (or the RAM) 1502 is computed by the encryption device 1505 to produce encrypted data which is then asserted on the data signal line 1510. The decryption device 1504 computes an exclusive logical OR of the data asserted on the data signal line 1510 and a key stored in the in the key buffer 1507 and used in the encryption by the encryption device 1505 to produce decrypted data which is then supplied to the A information processing device (or the CPU) 1501. At that time, electrical charging and discharging phenomena of the signal lines occur in exactly the same way as the data processing apparatus implemented by the seventh embodiment.

Figure 25:
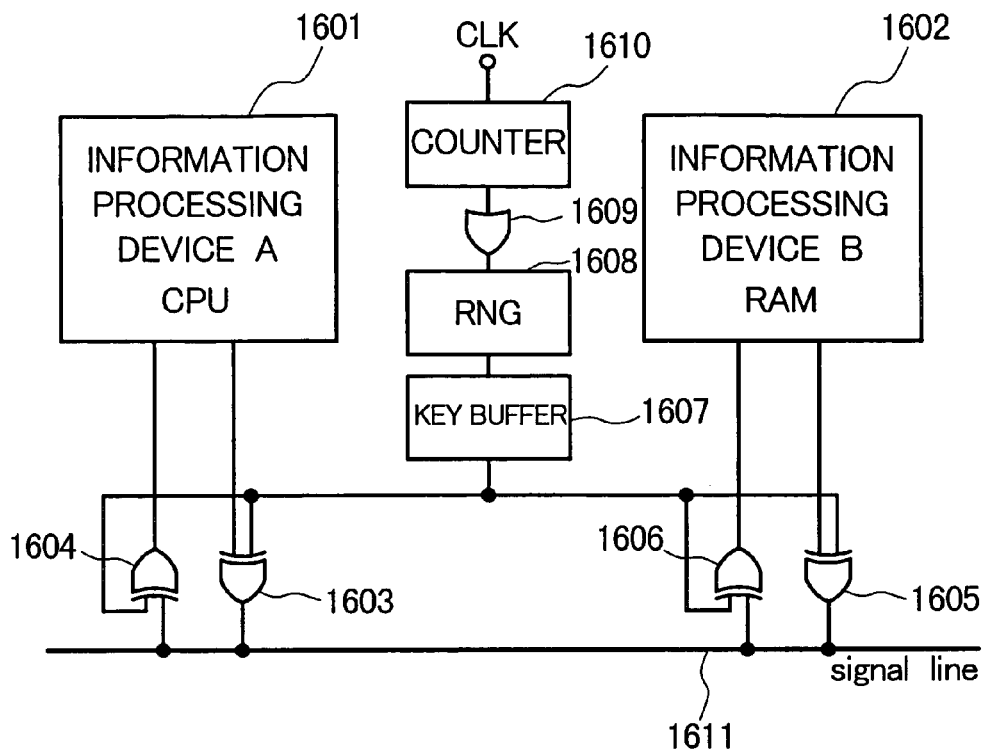
FIG. 25 is a diagram showing the basic configuration of a seventeenth embodiment of the data processing apparatus specified in the present application for a patent.

FIG. 25 is a diagram showing the basic configuration of a seventeenth embodiment of the data processing apparatus provided by the present invention. The embodiment is another typical implementation that encrypts data to be asserted on a signal line. In addition, encryption and decryption devices are employed between information processing devices and a signal line. Furthermore, a key for encryption is set anew automatically.

As shown in the figure, the data processing apparatus implemented by the seventeenth embodiment of the present invention comprises a CPU 1601 serving as an A information processing device and a RAM 1602 used as a B information processing device. The CPU 1601 serving as the A information processing device and the RAM 1602 used as the B information processing device are connected to each other by a signal line 1611. An exclusive logical OR computation (EOR) gate 1603 serves as an encryption device between the A information processing device (or the CPU) 1601 and the signal line 1611 while an exclusive logical OR computation (EOR) gate 1604 serves as a decryption device between the A information processing device (or the CPU) 1601 and the signal line 1611. By the same token, an exclusive logical OR computation (EOR) gate 1605 serves as an encryption device between the B information processing device (or the RAM) 1602 and the signal line 1611 while an exclusive logical OR computation (EOR) gate 1606 serves as a decryption device between the B information processing device (or the RAM) 1602 and the signal line 1611. The embodiment also includes a key buffer 1607 for storing an 8-bit key, a random-number generation device RNG 1608, a 5-input & 1-output logical-sum computation (OR) gate 1609 and a counter 1610 having a size of 5 bits. The counter 1610 counts the number of rising edges of a clock signal CLK. A portion of the count above the size of 5 bits is ignored.

In order to make the explanation simple, it is assumed that the signal line 1611 has a size of 8 bits and the A information processing device (or the CPU) 1601 is an 8-bit processor. It should be noted that the sizes of the signal line 1611 and the processing unit of the A information processing device (or the CPU) 1601 assumed in this embodiment are not essential. That is to say, the typical size of the signal line 1611 and the typical size of the processing unit of the A information processing device (or the CPU) 1601 are used in the description merely to make the reader sufficiently comprehend the generality of the present invention.

In an operation to transfer data from the A information processing device (or the CPU) 1601 to the B information processing device (or the RAM) 1602, the A information processing device (or the CPU) 1601 transmits the data synchronously with the clock signal CLK. When the clock signal CLK is generated, the counter 1610 starts counting the number of rising edges of the clock signal CLK. The logical-sum computation (OR) gate 1609 outputs the logical sum of all the 5 bits of a count generated by the counter 1610 to the random-number generation device RNG 1608. If the logical sum is 0, the random-number generation device RNG 1608 outputs an 8-bit random number to the key buffer 1607 and halts the generation of the random number. Only if the 5 bits of a count generated by the counter 1610 are all 0 does the random-number generation device RNG 1608 receive a 0 input. Thus, the key used for encryption and decryption is updated every 32 clock pulses. The key buffer 1607 is shared by all the exclusive logical OR computation (EOR) gates 1603, 1604, 1605 and 1606.

In an operation to transfer data from the A information processing device (or the CPU) 1601 to the B information processing device (or the RAM) 1602 through the signal line 1611, first of all, the exclusive logical OR computation (EOR) gate 1603 computes an exclusive logical OR of a key stored in the key buffer 1607 and the data being transferred, asserting the sum representing encrypted data on the signal line 1611. Before the encrypted data is supplied to the B information processing device (or the RAM) 1602, an exclusive logical OR of the same key stored in the key buffer 1607 and the encrypted data is computed by the exclusive logical OR computation (EOR) gate 1606. The sum representing the original data is then supplied to the B information processing device (or the RAM) 1602. When data is transferred from the B information processing device (or the RAM) 1602 to the A information processing device (or the CPU) 1601, the same operations are carried out.

Figure 26:
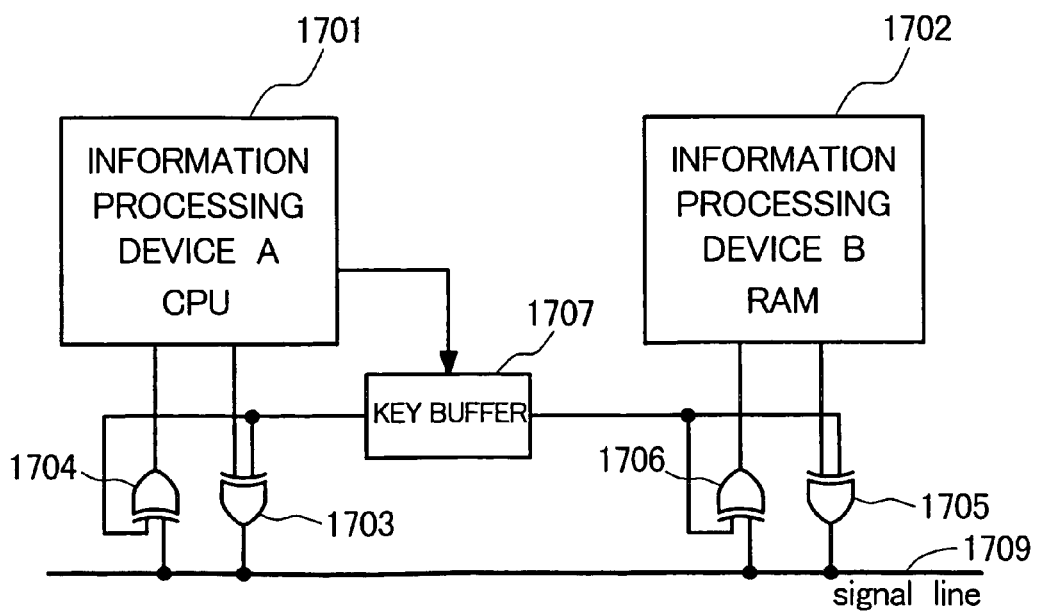
FIG. 26 is a diagram showing the basic configuration of a eighteenth embodiment of the data processing apparatus specified in the present application for a patent.

FIG. 26 is a diagram showing the basic configuration of an eighteenth embodiment of the data processing apparatus provided by the present invention. The embodiment is another typical implementation that encrypts data to be asserted on a signal line. In addition, a CPU 1701 serving as an A information processing device is capable of changing a key for encryption.

As shown in the figure, the data processing apparatus implemented by the eighteenth embodiment of the present invention comprises the CPU 1701 serving as the A information processing device and a RAM 1702 used as a B information processing device. The CPU 1701 serving as the A information processing device and the RAM 1702 used as the B information processing device are connected to each other by a signal line 1709. An exclusive logical OR computation (EOR) gate 1703 serves as an encryption device between the A information processing device (or the CPU) 1701 and the signal line 1709 while an exclusive logical OR computation (EOR) gate 1704 serves as a decryption device between the A information processing device (or the CPU) 1701 and the signal line 1709. By the same token, an exclusive logical OR computation (EOR) gate 1705 serves as an encryption device between the B information processing device (or the RAM) 1702 and the signal line 1709 while an exclusive logical OR computation (EOR) gate 1706 serves as a decryption device between the B information processing device (or the RAM) 1702 and the signal line 1709. The embodiment also includes a key buffer 1707 for storing an 8-bit key.

In order to make the explanation simple, it is assumed that the signal line 1709 has a size of 8 bits and the A information processing device (or the CPU) 1701 is an 8-bit processor. It should be noted that the sizes of the signal line 1709 and the processing unit of the A information processing device (or the CPU) 1701 assumed in this embodiment are not essential. That is to say, the typical size of the signal line 1709 and the typical size of the processing unit of the A information processing device (or the CPU) 1701 are used in the description merely to make the reader sufficiently comprehend the generality of the present invention.

The key buffer 1707 is connected to the A information processing device (or the CPU) 1701 so that the A information processing device (or the CPU) 1701 is capable of changing a key stored in the key buffer 1707. A key stored in the key buffer 1707 is used for encrypting data to be transferred from the A information processing device (or the CPU) 1701 to the B information processing device (or the RAM) 1702 through the signal line 1709 and decrypting encrypted data received from the signal line 1709 before supplying the data to the B information processing device (or the RAM) 1702. The configuration of this embodiment is the same as the fifteenth embodiment except for the ability of the A information processing device (or the CPU) 1701 to change a key.

Figure 27:
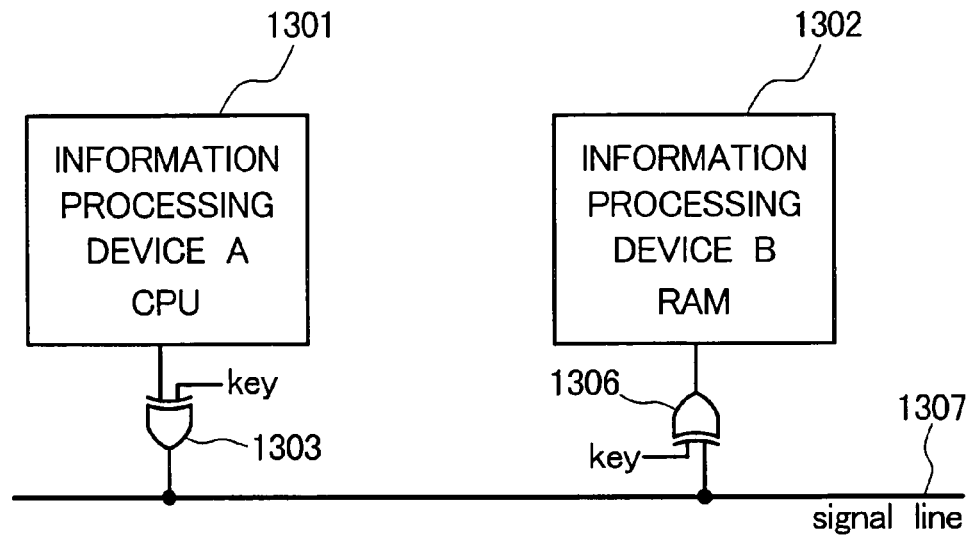
FIG. 27 is a diagram showing the basic configuration of a nineteenth embodiment of the data processing apparatus specified in the present application for a patent.

FIG. 27 is a diagram showing the basic configuration of a nineteenth embodiment of the data processing apparatus provided by the present invention. The embodiment is another typical implementation that encrypts data to be asserted on a signal line and to be stored in a memory device.

As shown in the figure, the data processing apparatus implemented by the nineteenth embodiment of the present invention comprises the A information processing device (or the CPU) 1301 and a RAM 1302 used as a B information processing device. The CPU 1301 serving as the A information processing device and the B information processing device (or the RAM) 1302 are connected to each other by a signal line 1307. An exclusive logical OR computation (EOR) gate 1303 serves as an encryption device between the A information processing device (or the CPU) 1301 and the signal line 1307 while an exclusive logical OR computation (EOR) gate 1306 serves as a decryption device between the B information processing device (or the RAM) 1302 and the signal line 1307. The exclusive logical OR computation (EOR) gate 1303 and the exclusive logical OR computation (EOR) gate 1306 each compute an exclusive logical OR of data transferred from the A information processing device (or the CPU) 1301 to the B information processing device (or the RAM) 1302 and a predetermined key.

Data output by the A information processing device (or the CPU) 1301 is encrypted by the exclusive logical OR computation (EOR) gate 1303 before being transferred to the B information processing device (or the RAM) 1302 through the signal line 1307. Before being supplied to the B information processing device (or the RAM) 1302, however, the data is decrypted by the exclusive logical OR computation (EOR) gate 1306 back into the original data.

Unlike the sixth embodiment of the present invention, data stored in the B information processing device (or the RAM) 1302 is the unencrypted original data. However, information on the signal line 1307 transferred by the A information processing device (or the CPU) 1301 to the B information processing device (or the RAM) 1302 is encrypted data. As a result, it is difficult to infer the transferred information from charging and discharging currents of the signal line 1307.

Figure 28:
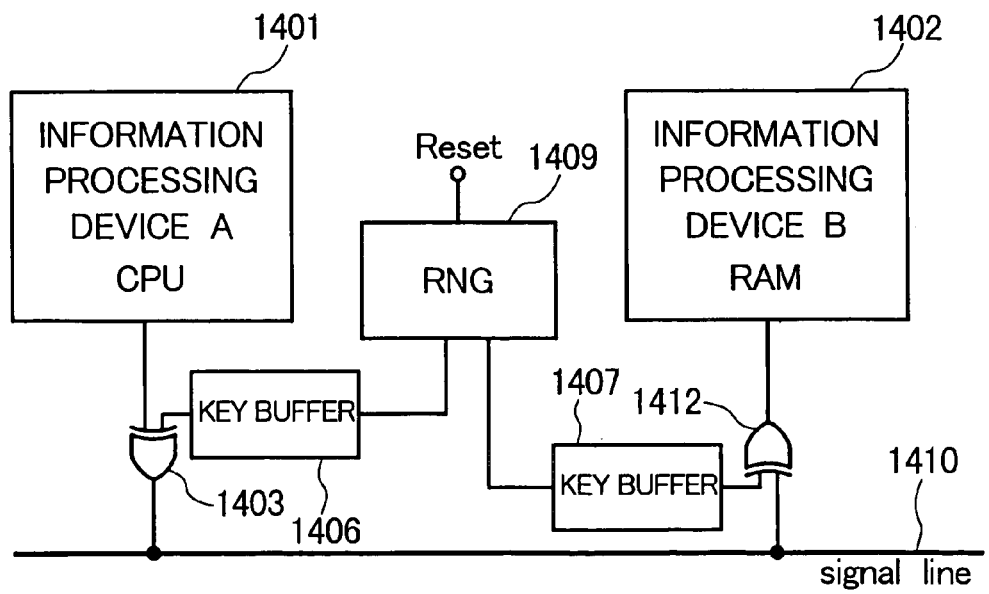
FIG. 28 is a diagram showing the basic configuration of a twentieth embodiment of the data processing apparatus specified in the present application for a patent.

FIG. 28 is a diagram showing the basic configuration of a twentieth embodiment of the data processing apparatus provided by the present invention. The embodiment is another typical implementation that encrypts data to be asserted on a signal line and stores the encrypted data in an information memory device. In addition, a random number is used in this embodiment as a key for encryption.

As shown in the figure, the data processing apparatus implemented by the twentieth embodiment of the present invention comprises a CPU 1401 serving as an A information processing device and a RAM 1402 used as a B information processing device. The CPU 1401 serving as the A information processing device and the RAM 1402 used as the B information processing device are connected to each other by a signal line 1410. An exclusive logical OR computation (EOR) gate 1403 serves as an encryption device between the A information processing device (or the CPU) 1401 and the signal line 1410 while an exclusive logical OR computation (EOR) gate 1412 serves as a decryption device between the B information processing device (or the RAM) 1402 and the signal line 1410. The embodiment also includes key buffers 1406 and 1407 and a random-number generation device RNG 1409.

The random-number generation device RNG 1409 operates when receiving a reset signal at the activation of the data processing apparatus. The random-number generation device RNG 1409 generates an 8-bit random number and then stops the operation. The random-number generation device RNG 1409 remains in a halted state till the next reset signal is received. Composed of 8 flip-flops, each of the key buffers 1406 and 1407 is used for storing the 8-bit random number.

In order to make the explanation simple, it is assumed that the signal line 1410 has a size of 8 bits and the A information processing device (or the CPU) 1401 is an 8-bit processor. It should be noted that the sizes of the signal line 1410 and the processing unit of the A information processing device (or the CPU) 1401 assumed in this embodiment are not essential. That is to say, the typical size of the signal line 1410 and the typical size of the processing unit of the A information processing device (or the CPU) 1401 are used in the description merely to make the reader sufficiently comprehend the generality of the present invention. In addition, the following description assumes that the signal line static control method is adopted as a control technique of the signal line 1410. It should be noted that the same effect of the concept adopted by this embodiment can be realized even if the signal line precharge control method is adopted.

The present embodiment is the same as the data processing apparatus implemented by the nineteenth embodiment except for a portion for activating the random-number generation device RNG 1409 at the reset time and configuring an 8-bit key. Thus, operations after configuring a key in the key buffers 1406 and 1407 are carried out in the same way as the thirteenth embodiment.

Also in the case of this embodiment, the power consumption accompanying electrical charging and discharging phenomena of the signal line 1410 is different from the amount of power that would be consumed if original data were transmitted through the signal line 1410. In addition, the key for encryption is changed at every reset time. As a result, it is difficult to infer the original data from power consumption.

Figure 29:
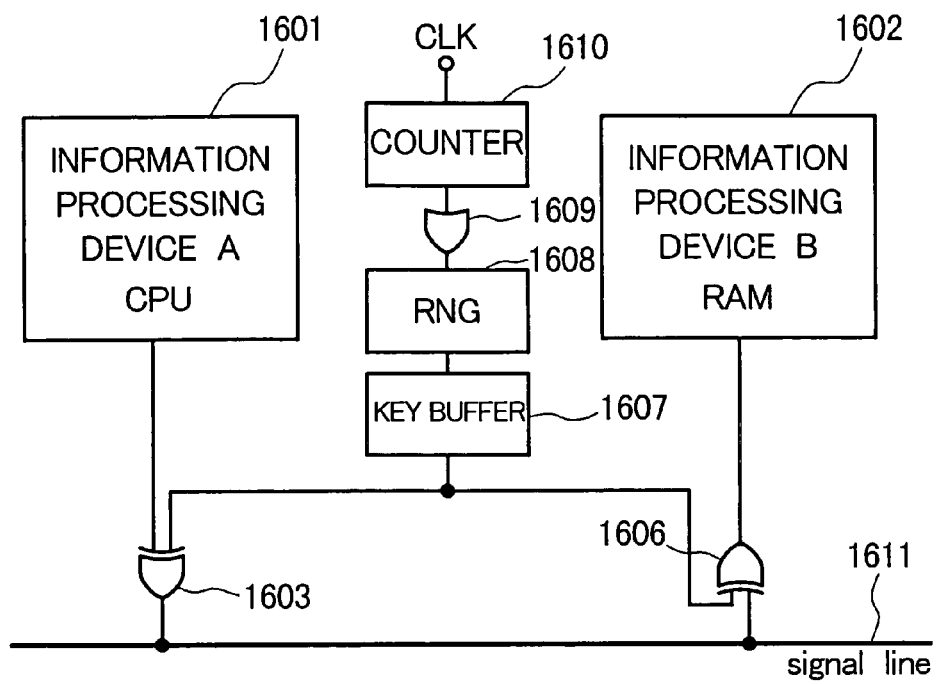
FIG. 29 is a diagram showing the basic configuration of a twenty-first embodiment of the data processing apparatus specified in the present application for a patent.

FIG. 29 is a diagram showing the basic configuration of a twenty-first embodiment of the data processing apparatus provided by the present invention. The embodiment is another typical implementation that encrypts data to be asserted on a signal line. In addition, a random number is used in this embodiment as a key for encryption.

As shown in the figure, the data processing apparatus implemented by the twenty-first embodiment of the present invention comprises a CPU 1601 serving as an A information processing device and a RAM 1602 used as a B information processing device. The A information processing device (or the CPU) 1601 and the B information processing device (or the RAM) 1602 are connected to each other by a signal line 1611. An exclusive logical OR computation (EOR) gate 1603 serves as an encryption device between the A information processing device (or the CPU) 1601 and the signal line 1611 while an exclusive logical OR computation (EOR) gate 1606 serves as a decryption device between the B information processing device (or the RAM) 1602 and the signal line 1611. The embodiment also includes a key buffer 1607 for storing an 8-bit key, a random-number generation device RNG 1608, a 5-input & 1-output logical sum computation (OR) gate 1609 and a counter 1610 having a size of 5 bits. The counter 1610 counts the number of rising edges of a clock signal CLK. A portion of the count above the size of 5 bits is ignored.

In order to make the explanation simple, it is assumed that the signal line 1611 has a size of 8 bits and the A information processing device (or the CPU) 1601 is an 8-bit processor. It should be noted that the sizes of the signal line 1611 and the processing unit of the A information processing device (or the CPU) 1601 assumed in this embodiment are not essential. That is to say, the typical size of the signal line 1611 and the typical size of the processing unit of the A information processing device (or the CPU) 1601 are used in the description merely to make the reader sufficiently comprehend the generality of the present invention.

In an operation to transfer data from the A information processing device (or the CPU) 1601 to the B information processing device (or the RAM) 1602, the A information processing device (or the CPU) 1601 transmits the data synchronously with the clock signal CLK. When the clock signal CLK is generated, the counter 1610 starts counting. The logical-sum computation (OR) gate 1609 outputs the logical sum of all the bits of a count generated by the counter 1610 to the random-number generation device RNG 1608. If the logical sum is 0, the random-number generation device RNG 1608 outputs an 8-bit random number to the key buffer 1607 and halts the random-number generation. Only if all the bits of a count generated by the counter 1610 are all 0 does the random-number generation device RNG 1608 receive a 0 input. Thus, the key used for encryption and decryption is updated every 32 clock pulses. The key buffer 1607 is shared by both the exclusive logical OR computation (EOR) gates 1603 and 1606.

In an operation to transfer data from the A information processing device (or the CPU) 1601 to the B information processing device (or the RAM) 1602 through the signal line 1611, first of all, the exclusive logical OR computation (EOR) gate 1603 computes an exclusive logical OR of a key stored in the key buffer 1607 and the data being transferred, asserting the sum representing encrypted data on the signal line 1611. Before the encrypted data is supplied to the B information processing device (or the RAM) 1602, an exclusive logical OR of the same key stored in the key buffer 1607 and the encrypted data is computed by the exclusive logical OR computation (EOR) gate 1606. The sum representing the original data is then supplied to the B information processing device (or the RAM) 1602. As a result, the data stored in the B information processing device (or the RAM) 1602 is a result of decryption of the encrypted data, that is, the original data. Also in the case of this embodiment, the power consumption accompanying electrical charging and discharging phenomena of the signal line 1611 is different from the amount of power that would be consumed if original data were transmitted through the signal line 1611. In addition, the key for encryption is changed periodically. As a result, it is difficult to infer the original data from power consumption of the signal line 1611.

Figure 30:
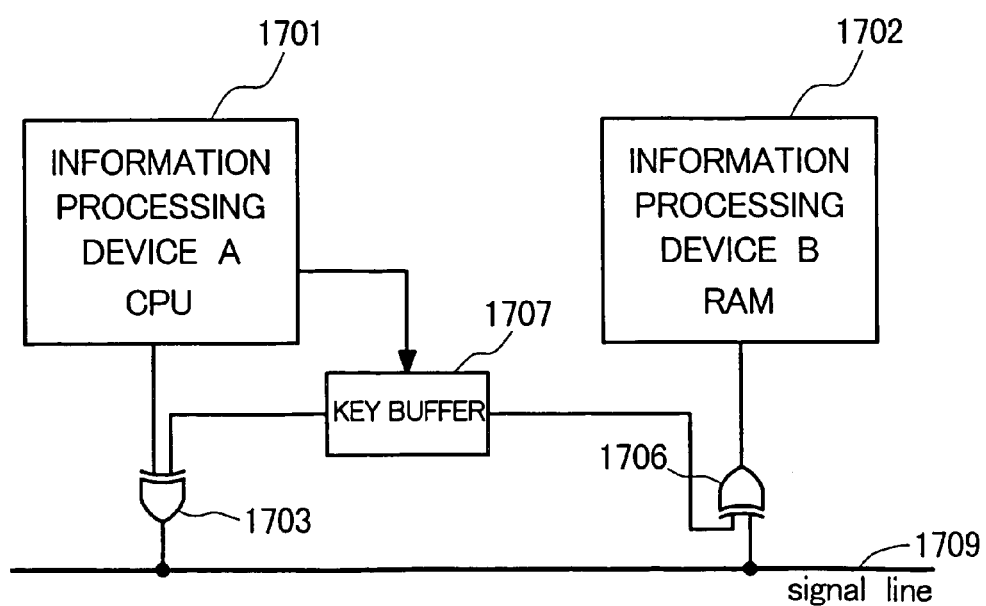
FIG. 30 is a diagram showing the basic configuration of a twenty-second embodiment of the data processing apparatus specified in the present application for a patent.

FIG. 30 is a diagram showing the basic configuration of a twenty-second embodiment of the data processing apparatus provided by the present invention. The embodiment is another typical implementation that encrypts data to be asserted on a signal line. In addition, the embodiment includes a device that is capable of setting and changing key information.

As shown in the figure, the data processing apparatus implemented by the twenty-second embodiment of the present invention comprises a CPU 1701 serving as an A information processing device and a RAM 1702 used as a B information processing device. The A information processing device (or the CPU) 1701 and the B information processing device (or the RAM) 1702 are connected to each other by a signal line 1709. An exclusive logical OR computation (EOR) gate 1703 serves as an encryption device between the A information processing device (or the CPU) 1701 and the signal line 1709 while an exclusive logical OR computation (EOR) gate 1706 serves as a decryption device between the B information processing device (or the RAM) 1702 and the signal line 1709. The embodiment also includes a key buffer 1707 for storing an 8-bit key.

In order to make the explanation simple, it is assumed that the signal line 1709 has a size of 8 bits and the A information processing device (or the CPU) 1701 is an 8-bit processor. It should be noted that the sizes of the signal line 1709 and the processing unit of the A information processing device (or the CPU) 1701 assumed in this embodiment are not essential. That is to say, the typical size of the signal line 1709 and the typical size of the processing unit of the A information processing device (or the CPU) 1701 are used in the description merely to make the reader sufficiently comprehend the generality of the present invention.

The key buffer 1707 is connected to the A information processing device (or the CPU) 1701 so that the A information processing device (or the CPU) 1701 is capable of changing a key stored in the key buffer 1707. A key stored in the key buffer 1707 is used for encrypting data to be transferred from the A information processing device (or the CPU) 1701 to the B information processing device (or the RAM) 1702 through the signal line 1709 and decrypting encrypted data received from the signal line 1709 before supplying the data to the B information processing device (or the RAM) 1702. The configuration of this embodiment is the same as the nineteenth embodiment except for the ability of the A information processing device (or the CPU) 1701 to change a key. It is thus unnecessary to repeat the detailed explanation.

Twenty-third to twenty-ninth embodiments described below are each a typical application of the basic concepts of the present invention to the so-called semiconductor memory device or a typical application to a semiconductor memory device included in a larger data processing apparatus besides an information processing device. Thus, any of the twenty-third to twenty-ninth embodiments can be applied typically to an information memory device included in the so-called microcomputer system. In addition, a technique adopted in any of the twenty-third to twenty-ninth embodiments can be applied an information memory device of a large semiconductor device system. Furthermore, in processing of information in a whole system, the present invention can of course be embraced.

Figure 31:
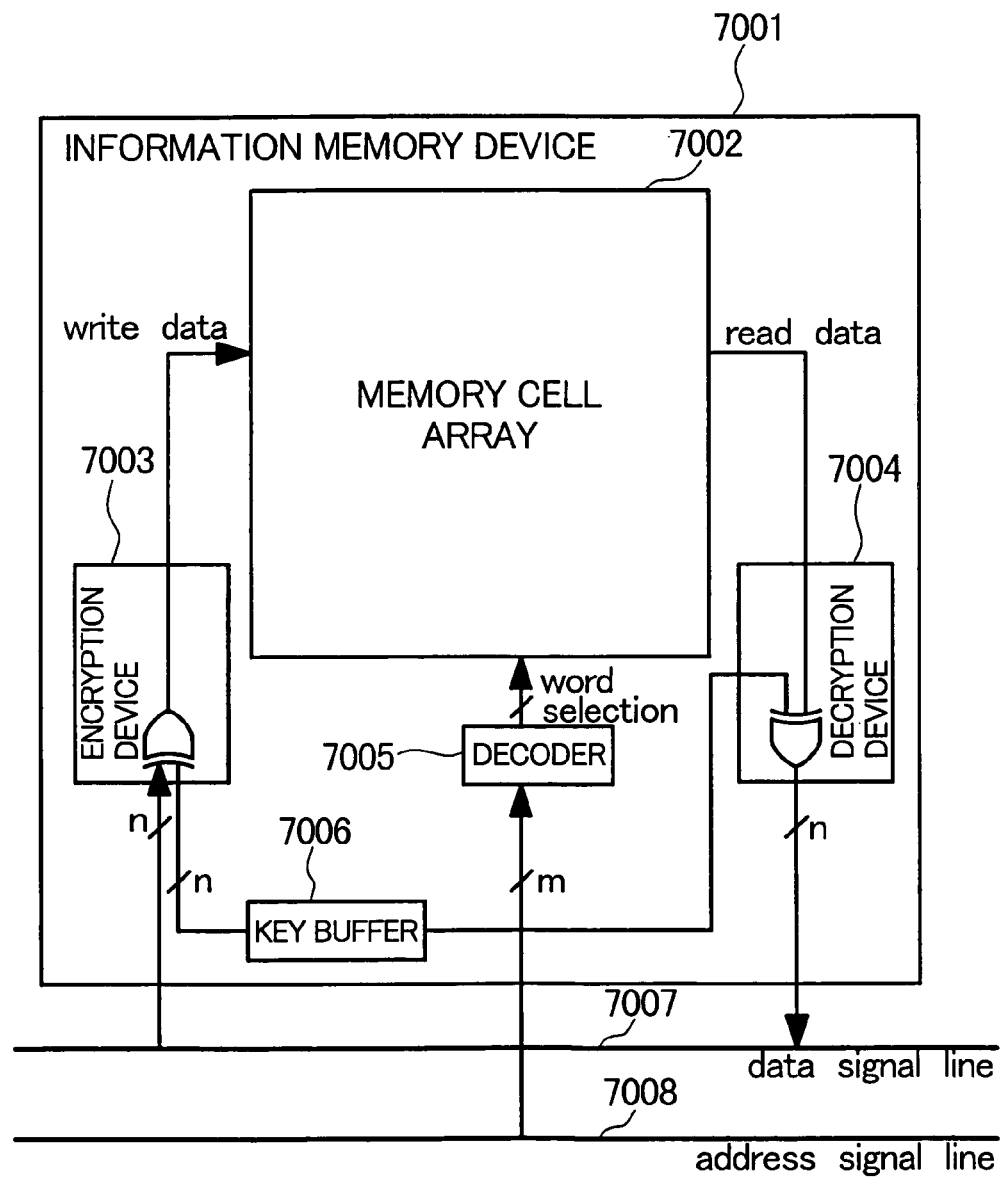
FIG. 31 is a diagram showing the basic configuration of a twenty-third embodiment of an information processing device specified in the present application for a patent.

FIG. 31 is a diagram showing the basic configuration of a twenty-third embodiment of an information processing device provided by the present invention.

An information memory device 7001 implemented by the twenty-third embodiment is an example of the so-called semiconductor memory device.

Much like the basic semiconductor memory device, the semiconductor memory device 7001 implemented by the twenty-third embodiment comprises a memory-cell array 7002, an address decoder 7005 and a data signal line 7007. For signal encryption, the embodiment is provided with an encryption device 7003, a decryption device 7004 and a key buffer 7006.

An ordinary memory cell array can be employed as the memory-cell array 7002 to exhibit sufficient performance.

In general, each memory cell comprises typically 1 transistor and 1 capacitor. However, a memory cell of another type can also be used in the memory-cell array 7002.

Figure 32:
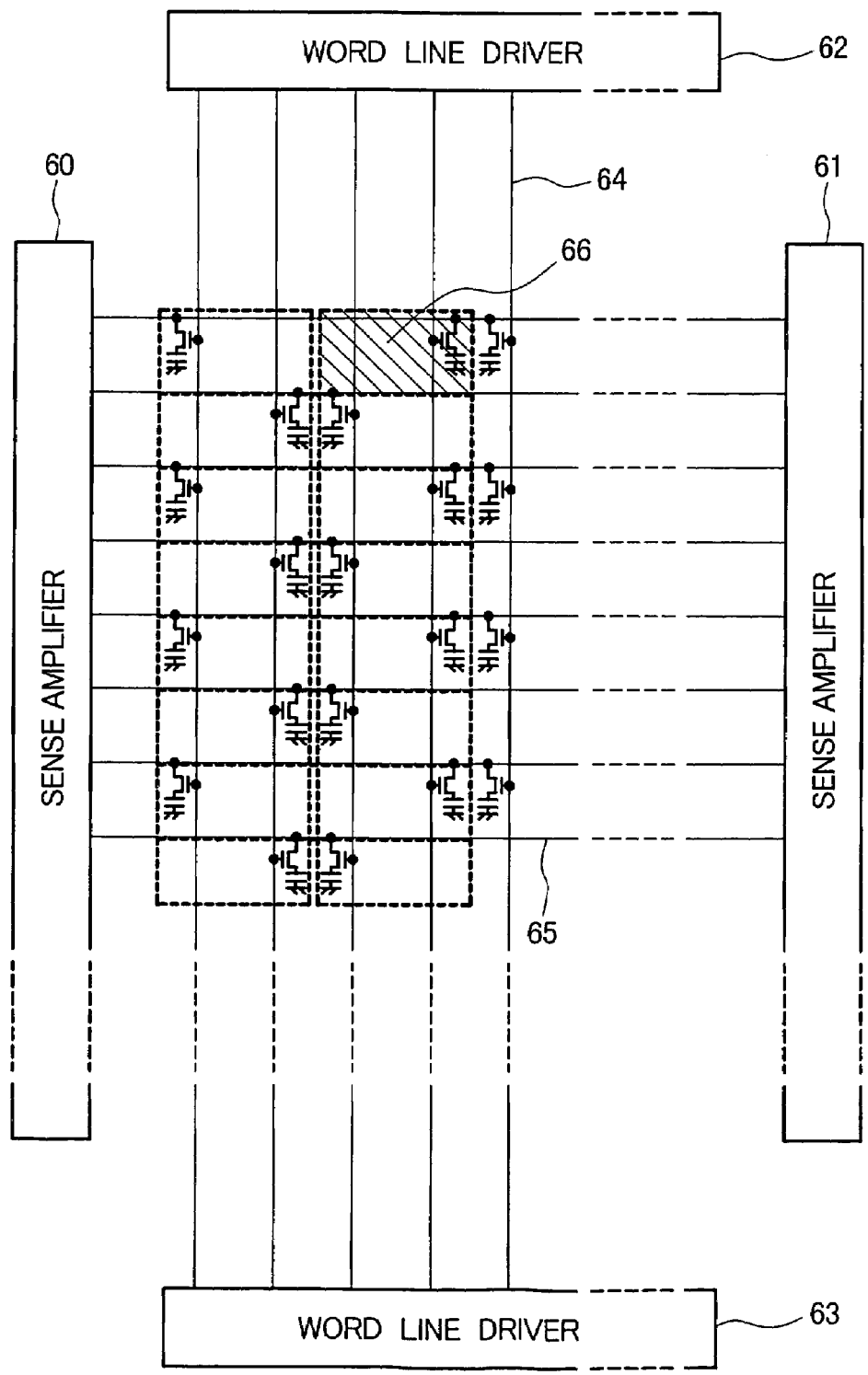
FIG. 32 is a diagram showing a representative example of a memory array.

FIG. 32 is a diagram showing a representative example of the memory-cell array 7002. An area 66 enclosed by a dotted line in FIG. 32 is a memory cell. Each memory cell 66 is connected to sense amplifiers 60 and 61 by bit lines 65.

Each memory cell 66 is connected to word-line drivers 62 and 63 by word lines 64. The technological concepts of the present invention are applied to the semiconductor memory device to exhibit an extremely effective effect of security protection. It should be noted that outputs of the sense amplifiers 60 and 61 shown in FIG. 32 are data read out from the memory-cell array 7002. On the other hand, the capacitor of a memory cell 66 selected by a word line 64 is electrically charged or discharged through a bit line 65 in accordance with data being written into the memory-cell array 7002. It is worth noting that an ordinary memory-cell array is capable of sufficiently functioning as the memory-cell array 7002 employed in this embodiment of the present invention. It is needless to say that a memory-cell array of another type can of course be employed as the memory-cell array 7002 in this embodiment of the present invention.

The detailed operation of this embodiment is explained as follows. An operation to write data into the memory-cell array 7002 is carried out as follows. First of all, the data is supplied to the encryption device 7003 from the data signal line 7007. The encryption device 7003 also fetches a key from the key buffer 7006 and uses the key for encrypting the data. In the mean time, an address specified on the address signal line 7008 is decoded by the address decoder 7005 into a word select signal which is supplied to the memory-cell array 7002. In the memory-cell array 7002, a memory cell is selected by the word select signal generated as a result of decoding the address. Finally, the data encrypted by the encryption device 7003 is written into the selected memory cell.

On the other hand, an operation to read out data from the memory-cell array 7002 is carried out as follows. An address specified on the address signal line 7008 is decoded by the address decoder 7005 into a word select signal which is supplied to the memory-cell array 7002. In the memory-cell array 7002, a memory cell is selected by the word select signal generated as a result of decoding the address. Then, data is read out from the selected memory cell and supplied to the decryption device 7004.

The decryption device 7004 decrypts the data by using the encryption key fetched from the key buffer 7006. The decrypted data is then output to the data signal line 7007. It should be noted that the key stored in the key buffer 7006 can be changed by an external means. Such a facility to change a key may also be available for a key buffer other than those of the embodiments described in this specification.

As described above, in an embodiment of the present invention, data transferred through the data signal line 7007 is encrypted before being supplied to the memory-cell array 7002, and data read out from the memory-cell array 7002 is decrypted before being output to the data signal line 7007.

Thus, the present invention can be applied to a semiconductor device including a memory-cell array as the present invention is applied to the information processing devices described so far. As a result, the bit pattern of data actually stored in memory cells is different from the bit pattern of the original data to be stored into the memory cells. It is thus difficult to infer the original data from the pattern of a current consumed during an operation to read out or write the data from or into the memory cells.

As described above, the concepts of the present invention can be applied to a semiconductor memory device employing ordinary memory cells. It is needless to say that the scope of the present invention is not limited to this embodiment and embodiments to be described later. As described above, in this embodiment, an address is used for selecting a row in a general memory-cell array having a matrix form. It should be noted, however, that the concept of the present invention can also be applied to an embodiment in which an address is used for selecting a column of a memory-cell matrix.

By using what is described above as a background, in the embodiments to be described below, the so-called semiconductor memory device may also be referred to as an information processing device, a more generic technical term than the semiconductor memory device. In other words, in the present specification, information processing devices include a semiconductor memory device.

Figure 33:
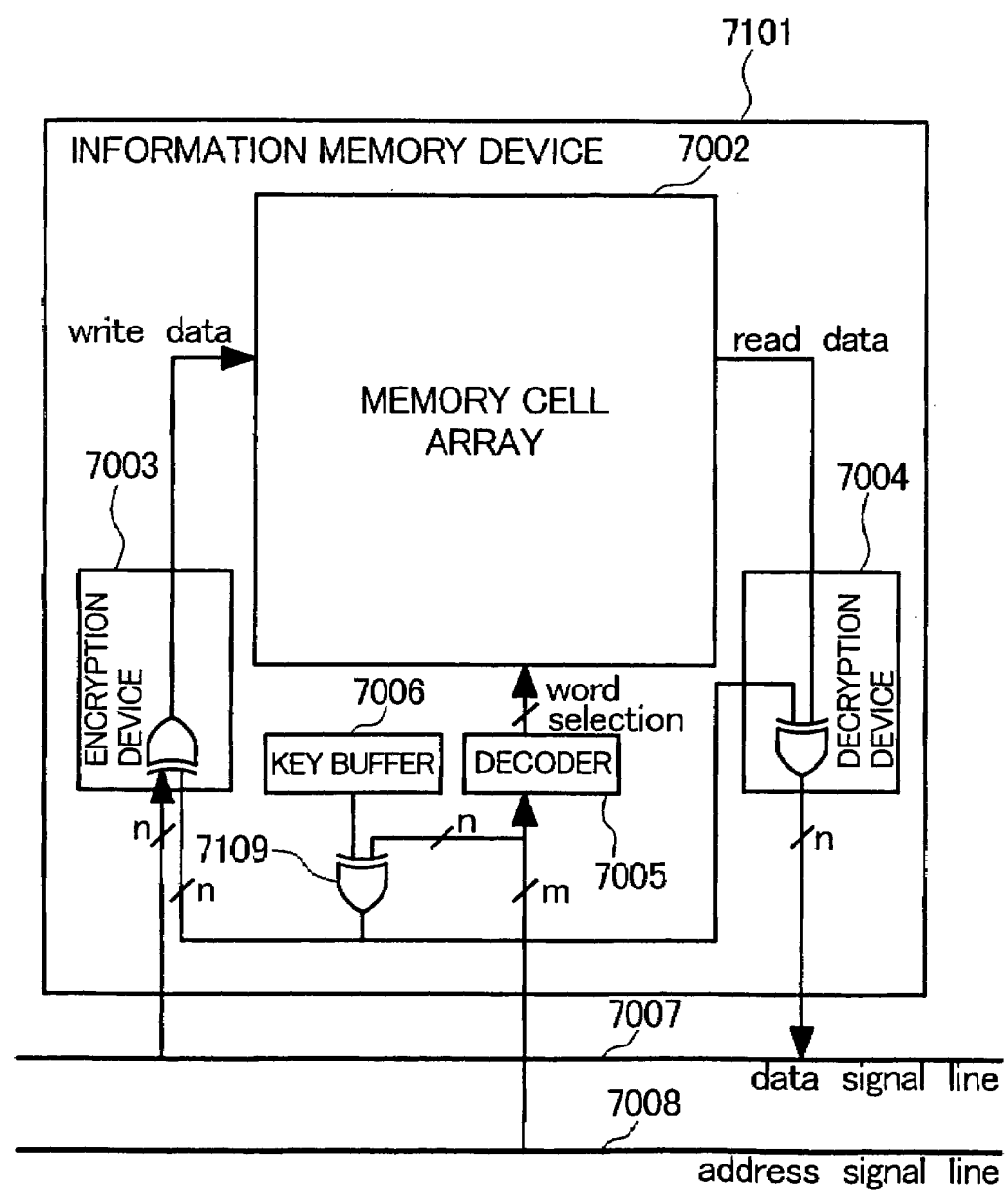
FIG. 33 is a diagram showing the basic configuration of a twenty-fourth embodiment of the information processing device specified in the present application for a patent.

FIG. 33 is a diagram showing the basic configuration of a twenty-fourth embodiment of an information processing device provided by the present invention. This embodiment is an implementation of the so-called semiconductor memory device in which a key for encryption is used for encrypting data.

Much like an ordinary semiconductor memory device, the information processing device implemented by this embodiment comprises a memory-cell array 7002, an address decoder 7005 and a data signal line 7007. For encryption and decryption of a signal, the embodiment also includes an encryption device 7003, a decryption device 7004, a key buffer 7006 and an exclusive logical OR computation (EOR) gate 7109 for generating a new key for encryption from a key stored in the key buffer 7006 and a portion of an address. In this embodiment, an ordinary memory-cell array can be used as a memory-cell array 7002 to assure sufficient performance.

An operation to write data into the memory-cell array 7002 is carried out as follows.

First of all, the data appearing on the data signal line 7007 is supplied to the encryption device 7003. In the mean time, the exclusive logical OR computation (EOR) gate 7109 computes an exclusive logical OR of a key stored in the key buffer 7006 and a portion of an address appearing on the address signal line 7008. The sum is used by the encryption device 7003 for encrypting the data received from the data signal line 7007. On the other hand, the address appearing on the address signal line 7008 is decoded by the address decoder 7005 into a word select signal which is supplied to the memory-cell array 7002.

In the memory-cell array 7002, a memory cell is selected by the word select signal generated as a result of decoding the address. Finally, the data encrypted by the encryption device 7003 is written into the selected memory cell.

On the other hand, an operation to read out data from the memory-cell array 7002 is carried out as follows. An address specified on the address signal line 7008 is decoded by the address decoder 7005 into a word select signal which is supplied to the memory-cell array 7002. In the memory-cell array 7002, a memory cell is selected by the word select signal generated as a result of decoding the address. Then, data is read out from the selected memory cell and supplied to the decryption device 7004.

As described above, data received from the data signal line 7007 is encrypted before being stored into the memory-cell array 7002. In an operation to read out data from the memory-cell array 7002, on the other hand, the data is decrypted before being output to the data signal line 7007. Thus, the present invention can be applied to a semiconductor device including a memory-cell array equally to the present invention is applied to the information processing devices described so far. As a result, the bit pattern of data actually stored in memory cells is different from the bit pattern of the original data to be stored into the memory cells. It is thus difficult to infer the original data from the pattern of a current consumed during an operation to read out or write the data from or into the memory cells.

Figure 34:
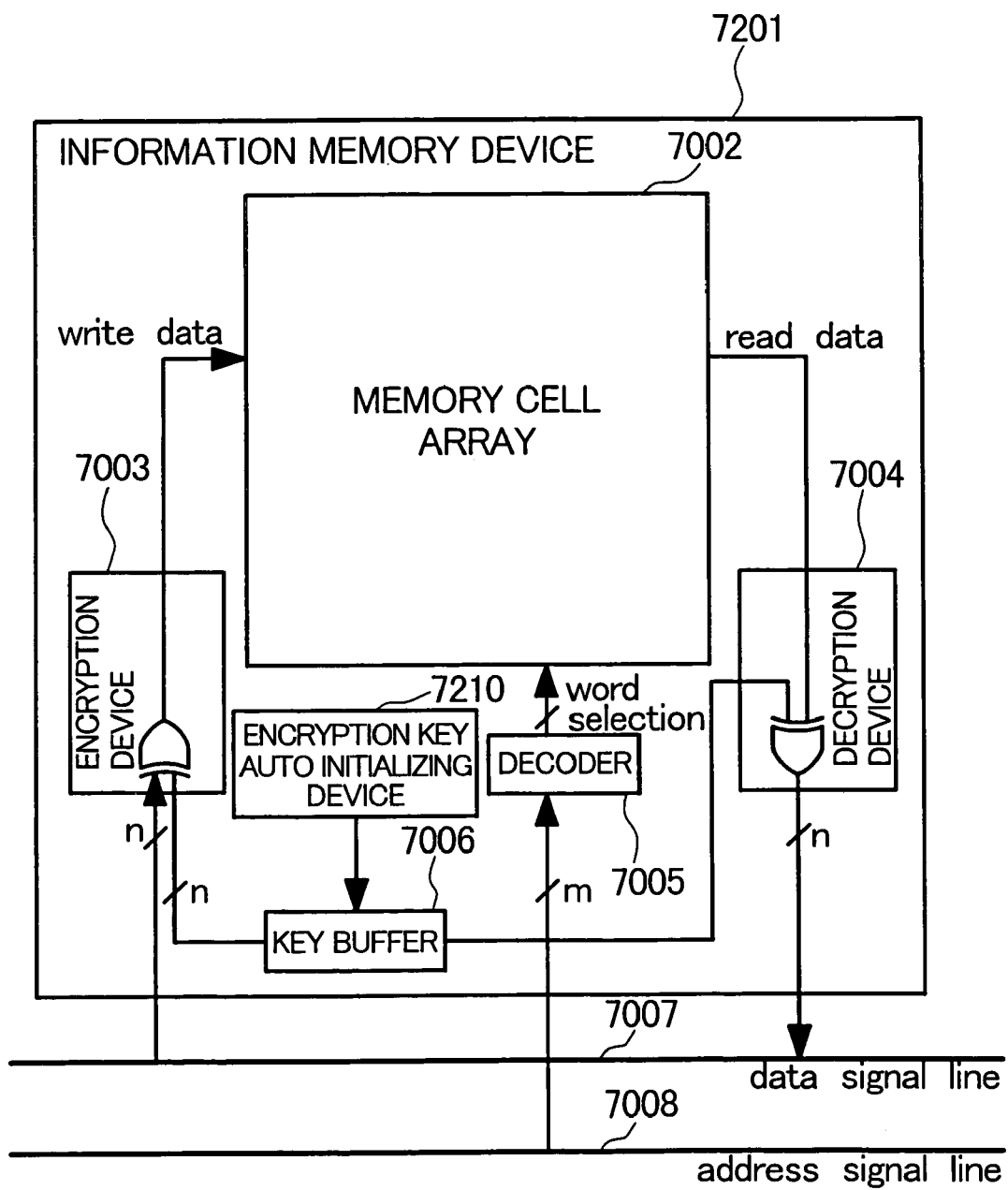
FIG. 34 is a diagram showing the basic configuration of a twenty-fifth embodiment of the information processing device specified in the present application for a patent.

FIG. 34 is a diagram showing the basic configuration of a twenty-fifth embodiment of the information processing device provided by the present invention. This embodiment is an implementation of the so-called semiconductor memory device in which a key for encryption is used for encrypting data. In this embodiment, the key for encryption is automatically initialized.

In the information memory device implemented by this embodiment, the key buffer 7006 employed in the embodiment shown in FIG. 31 is connected to an encryption-key auto initializing device 7210 for initializing a key for encryption. Since the rest of the configuration of this embodiment is the same as the embodiments explained previously, it is not necessary to repeat the detailed explanation.

An ordinary random-number generation device which sets an initial value is used as the encryption-key auto initializing device 7210. When the information processing device is activated or reset, the encryption-key auto initializing device 7210 automatically generates a key for encryption based on a random number and sets the generated encryption key in the key buffer 7006. The key for encryption is changed each time the information processing device is activated or reset. Thus, even for the same data, the current consumption pattern generated during a read or write operation changes from activation to activation. It is thus difficult to infer the original data from the pattern of a current consumed during an operation to read out or write the data from or into the memory cells.

Figure 35:
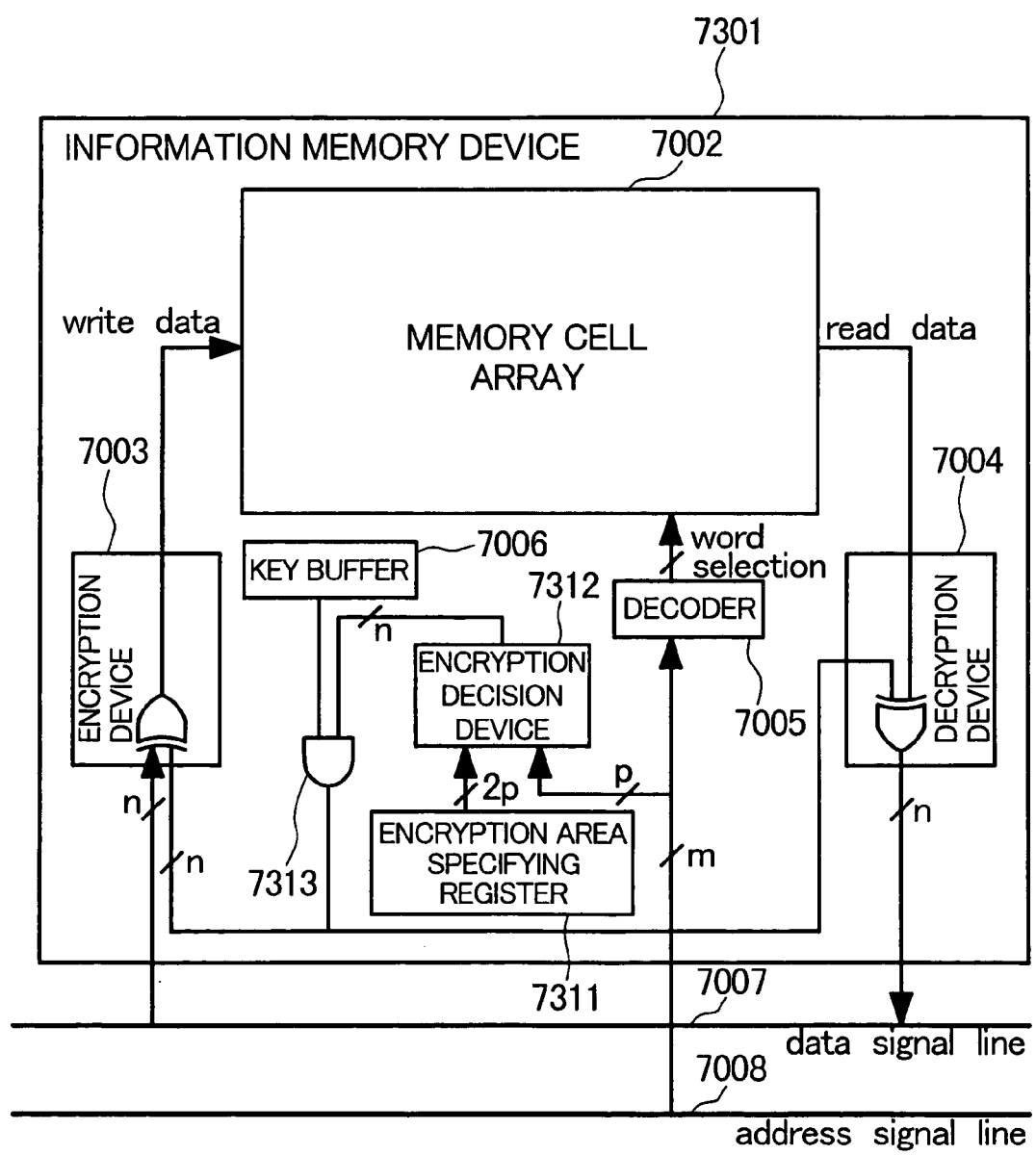
FIG. 35 is a diagram showing the basic configuration of a twenty-sixth embodiment of the information processing device specified in the present application for a patent.

FIG. 35 is a diagram showing the basic configuration of a twenty-sixth embodiment of the information processing device provided by the present invention. This embodiment is an implementation of the so-called semiconductor memory device which forms a judgment as to whether or not encryption is required.

As shown in the figure, the information memory device 7301 implemented by this embodiment comprises a memory-cell array 7002, an address decoder 7005, an encryption device 7003, a decryption device 7004, a key buffer 7006, an encryption-area specifying register 7311 and an encryption decision device 7312. In this embodiment, an ordinary memory-cell array can be used as a memory-cell array 7002 to assure sufficient performance.

The memory-cell array 7002 is divided by address into a plurality of storage areas. The encryption-area specifying register 7311 is used for storing information on whether or not encryption is required for each of the storage areas. The encryption decision device 7312 determines whether or not encryption is required for the current transfer of data in accordance with an address appearing on an address signal line 7008 and information stored in the encryption-area specifying register 7311.

FIG. 20 is a diagram showing a typical implementation of the encryption decision device employed in this embodiment. This implementation is the same as the encryption decision device described above. Assume that the memory-cell array 7002 is divided into $2^p$ storage areas. In this case, the encryption-area specifying register 7311 has a length of $2^p$ bits each for indicating whether or not encryption is necessary for one of the storage areas. As shown in the figure, the p high-order bits of the address signal line 7008 and data stored in the encryption-area specifying register 7311 are supplied to the encryption decision device 7312. The encryption decision device 7312 is thus capable of forming a judgment as to whether or not encryption is necessary for the current transfer of data.

To put it in detail, each of AND gates 7315 receives a decoded result of the p high-order bits of the address signal line 7008 and a bit of the encryption-area specifying register 7311. A 1 output of an AND gate 7315 indicates that a storage area represented by the p high-order bits of the address signal line 7008 requires encryption and the storage area is accessed in the current transfer of data. On the other hand, a 0 output of an AND gate 7315 indicates that a storage area represented by the p high-order bits of the address signal line 7008 does not require encryption and/or the storage area is not accessed in the current transfer of data. The outputs of the AND gates 7315 are supplied to a logical-sum computation (OR) gate 7314 for computing a logical sum of the outputs. A 1 signal output by the gate 7314 thus indicates that encryption is necessary for the current transfer of data. On the other hand, a 0 signal output by the gate 7314 thus indicates that encryption is not necessary for the current transfer of data.

The signal output by the gate 7314 is the output of the encryption decision device 7312 supplied to an AND circuit 7313 of the information memory device 7301 which computes a logical product of the output and a key for encryption, and supplies the logical product to the encryption device 7003 and the decryption device 7004. When encryption is necessary, a logical-sum computation (AND) gate 7313 outputs the key for encryption. When encryption is not necessary, on the other hand, the AND gate 7313 outputs 0. When the 0 output is supplied to the encryption device 7003 or 7004, the data to be transferred is passed on by the encryption device 7003 or 7004 as it is without being encrypted or decrypted.

The decryption procedure for a read operation is the same as the write operation. To put it in detail, the read address and the contents of the encryption-area specifying register 7311 are used for determining whether the key for encryption or a value of 0 is to be used for decryption.

As described above, the memory-cell array is divided by address into a plurality of storage areas and information is set in the encryption-area specifying register 7311 for each of the areas to indicate whether or not the storage area needs encryption. For a storage area requiring encryption, the bit pattern appearing on the data signal line 7007 is different from the bit pattern of data stored in memory cells. It is thus difficult to infer the actual data from the pattern of a current consumed during an operation to write or read out data into or from the memory cells.

Twenty-seventh and twenty-eighth embodiments are each an implementation of a data processing apparatus including the so-called semiconductor memory device and another information processing device.

Figure 36:
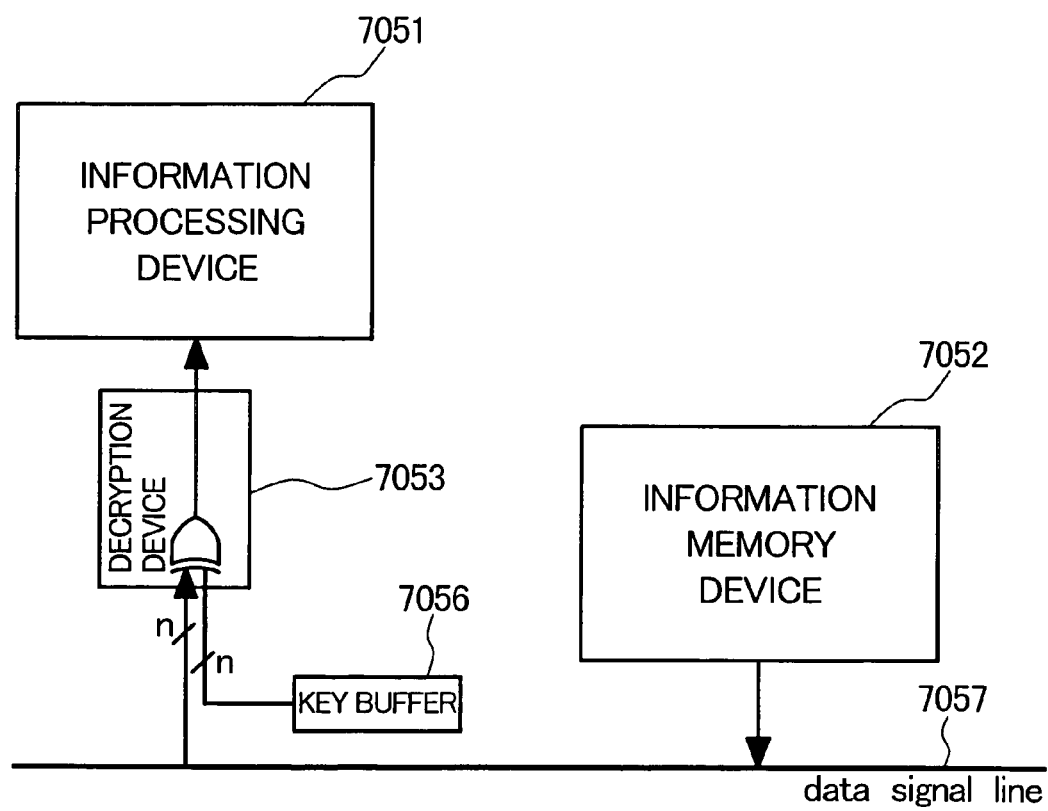
FIG. 36 is a diagram showing the basic configuration of a twenty-seventh embodiment of the data processing apparatus specified in the present application for a patent.

FIG. 36 is a diagram showing the basic configuration of a twenty-seventh embodiment of the data processing apparatus provided by the present invention.

The operation of this embodiment is explained below by assuming that data stored in an information memory device 7052 has been encrypted in advance. It should be noted that any of the methods explained so far can be adopted as a technique of storing encrypted data in the information memory device 7052. As another information processing device employed in this embodiment, an information processing device 7051 is connected to the information memory device 7052 by a data signal line 7057. Between the information processing device 7051 and the data signal line 7057, there are provided a decryption device 7053 and a key buffer 7056 for storing a key used by the decryption device 7053 for decrypting data.

As the decryption device 7053 and the key buffer 7056, any of the decryption devices and the key buffers explained so far can be used to assure sufficient performance.

It should be noted that, as described earlier, the information memory device 7052 is used for storing information encrypted in advance in a format that can be decrypted by the decryption device 7053 by using a key for encryption stored in the key buffer 7056. The encrypted data is supplied to the decryption device 7053 through the data signal line 7057 for decrypting the data. Finally, the decrypted data is supplied by the decryption device 7053 to the information processing device 7051.

Thus, information stored in the information memory device 7052 and transferred through the data signal line 7057 has a bit pattern different from that of information used in the information processing apparatus 7051. As a result, it is difficult to infer the information from a current consumption pattern of the information memory device 7052 and/or the data signal line 7057.

Figure 37:
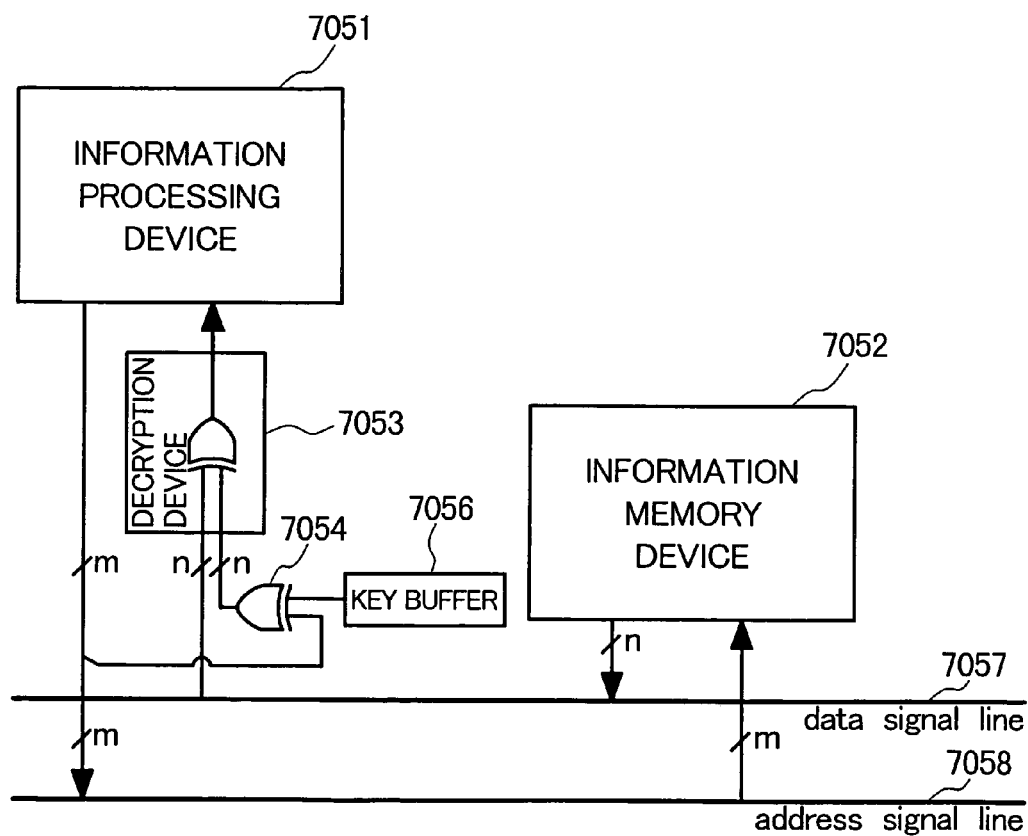
FIG. 37 is a diagram showing the basic configuration of a twenty-eighth embodiment of the data processing apparatus specified in the present application for a patent.

FIG. 37 is a diagram showing the basic configuration of a twenty-eighth embodiment of the data processing apparatus provided by the present invention. This embodiment is a typical implementation of the data processing apparatus which uses a key for encryption of data.

The operation of this embodiment is explained below by assuming that data stored in an information memory device 7052 has been encrypted in advance. It should be noted that any of the methods explained so far can be adopted as a technique of storing encrypted data in the information memory device 7052. As another information processing device employed in this embodiment, an information processing device 7051 is connected to the information memory device 7052 by a data signal line 7057 and an address signal line 7058. Between the information processing device 7051 and the data signal line 7057, there are provided a decryption device 7053, an exclusive logical OR computation (EOR) gate 7054 and a key buffer 7056 for storing a key used by the decryption device 7053 for decrypting data. As the decryption device 7053 and the key buffer 7056, any of the decryption devices and the key buffers explained so far can be used to assure sufficient performance.

An encryption key used by the decryption device 7053 for decrypting data is a signal output by the EOR gate 7054. The EOR gate 7054 computes an exclusive logical OR of encryption information stored in the key buffer 7056 and a portion of a storage address at which the data is stored in the information memory device 7052. The information memory device 7052 is used for storing information encrypted in advance in a format that can be decrypted by the decryption device 7053 by using the encryption key.

When the information processing device 7051 outputs an address to the address signal line 7058, the information memory device 7052 outputs encrypted data stored at the address to the data signal line 7057 as it is. At that time, the EOR gate 7054 computes an exclusive logical OR of encryption information stored in the key buffer 7056 and a portion of the address, outputting the sum to the decryption device 7053 as a key. The decryption device 7053 decrypts the data by using the key before supplying the data to the information processing device 7051.

Thus, information stored in the information memory device 7052 and transferred through the data signal line 7057 has a bit pattern different from that of information used in the information processing apparatus 7051. In addition, the same power consumption can result from different bit patterns of different pieces of data read out from different addresses. This is because the key for encryption varies from address to address. As a result, it is even more difficult to infer the information from a current consumption pattern of the information memory device 7052 and/or the data signal line 7057 than the twenty-seventh embodiment of the present invention.

Figure 38:
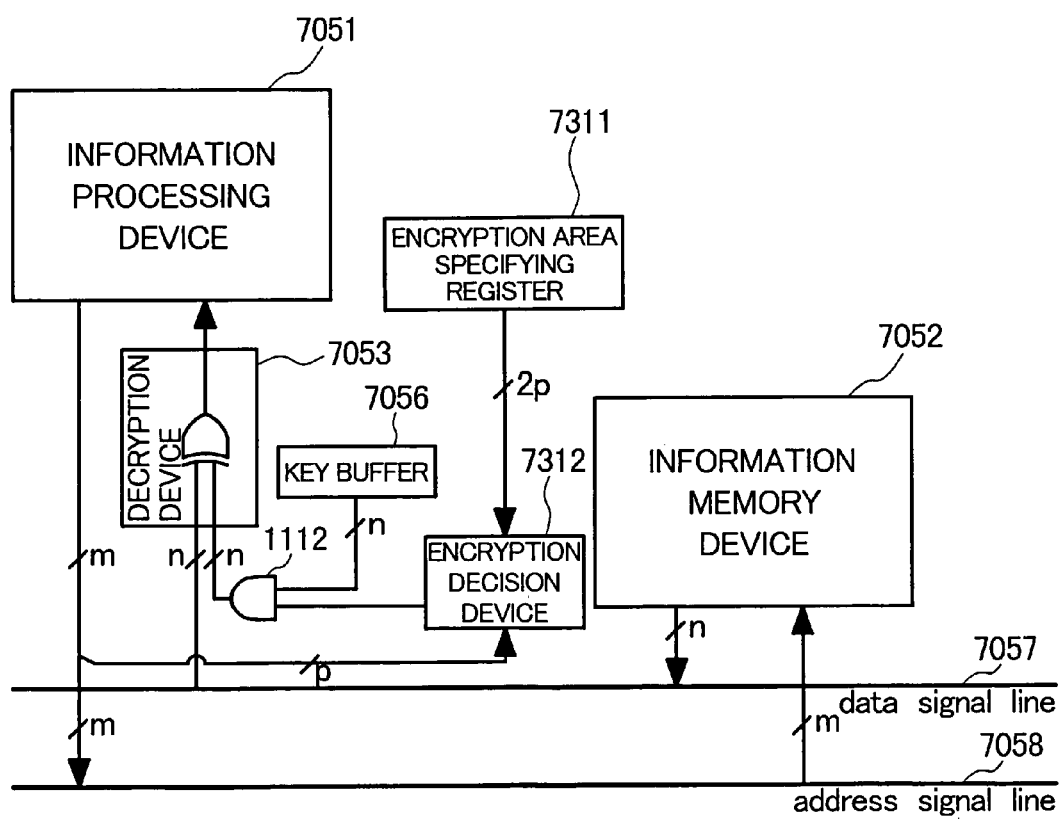
FIG. 38 is a diagram showing the basic configuration of a twenty-ninth embodiment of the data processing apparatus specified in the present application for a patent.

FIG. 38 is a diagram showing the basic configuration of a twenty-ninth embodiment of the data processing apparatus provided by the present invention. The data processing apparatus implemented by this embodiment comprises the so-called semiconductor memory device and another information processing device.

As shown in the figure, this embodiment comprises an information processing device 7051 and an information memory device 7052 which are connected to each other by a data signal line 7057 and an address signal line 7058. Between the information processing device 7051 and the data signal line 7057, there are provided a decryption device 7053, a logical-product computation (AND) gate 1112, an encryption-area specifying register 7311, an encryption decision device 7312 and a key buffer 7056 for storing a key used by the decryption device 7053 for decrypting data. As the decryption device 7053 and the key buffer 7056, any of the decryption devices and the key buffers explained so far can be used to assure sufficient performance.

The following description explains only a characteristic of this embodiment, that is, an operation to determine whether or not an encryption is required in the current transfer of data.

The information memory device 7052 is divided by address into a plurality of storage areas. The encryption-area specifying register 7311 is used for storing information on whether or not encryption has been done for each of the storage areas. The encryption decision device 7312 determines whether or not a decryption is required for the current transfer of data in accordance with an address appearing on an address signal line 7058 and information stored in the encryption-area specifying register 7311.

FIG. 20 is a diagram showing a typical implementation of the encryption decision device 7312 employed in this embodiment. The detailed explanation of the operation of the encryption decision device 7312 is not repeated. The information memory device 7052 is used for storing information encrypted in advance in a format that can be decrypted by the decryption device 7053 by using the encryption key. In a read operation, the information processing device 7051 asserts an address on the address signal line 7058. When the address appears on the address signal line 7058, the information memory device 7052 outputs data to the data signal line 7057. The encryption decision device 7312 determines whether or not the data output to the data signal line 7057 is encrypted data by using the address appearing on an address signal line 7058 and information stored in the encryption-area specifying register 7311. If data stored at the address appearing on the address signal line 7058 is determined to have been encrypted, the encryption decision device 7312 outputs 1. If data stored at the address appearing on the address signal line 7058 is determined to be data not encrypted before, on the other hand, the encryption decision device 7312 outputs 0.

The output of the encryption decision device 7312 is supplied to the AND circuit 1112 of the data processing apparatus which computes a logical product of the output and a key for encryption, supplying the logical product to the decryption device 7053. When an access is made to an area for which encryption is necessary, the AND gate 1112 passes on the key for encryption. When an access is made to an area for which encryption is not necessary, on the other hand, the AND gate 1112 outputs 0. When the 0 output is supplied to the decryption device 7053, the data to be transferred is passed on by the decryption device 7053 to the information processing device 7051 as it is without being decrypted since the decryption device 7053 is an EOR gate. When the key for encryption is supplied to the decryption device 7053, the data being transferred is decrypted by the decryption device 7053 before being passed on to the information processing device 7051. In this way, the data eventually supplied to the information processing device 7051 is the original data which can then be correctly used in the information processing device 7051.

For an area requiring encryption, the bit pattern appearing on the data signal line 7057 is different from the bit pattern of data stored in the information memory device 7052. It is thus difficult to infer the actual data from the pattern of a current consumed during an operation to read out data from the information memory device 7052 or the pattern of a current consumed in the data signal line 7057.

Figure 39:
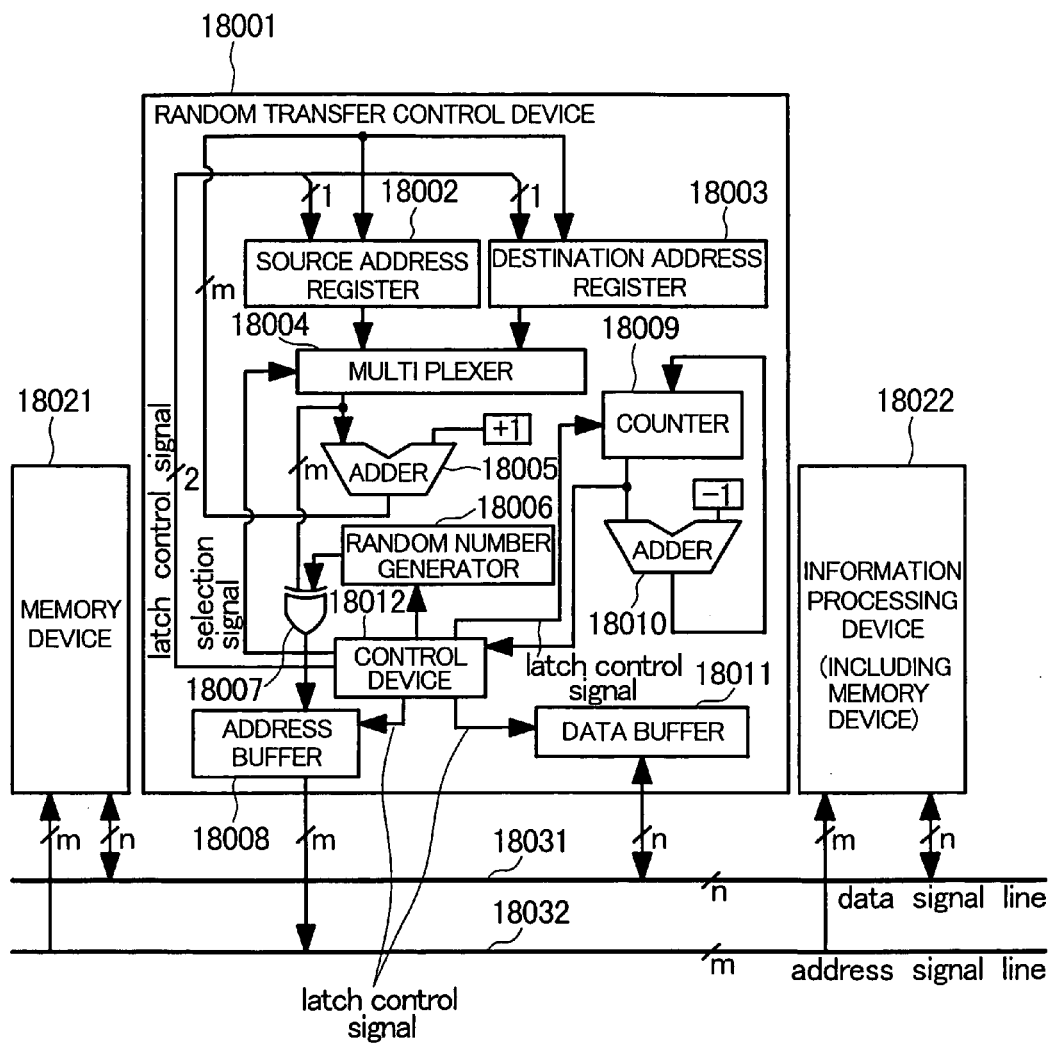
FIG. 39 is a diagram showing the basic configuration of a thirtieth embodiment of the data processing apparatus specified in the present application for a patent.

FIG. 39 is a diagram showing the basic configuration of a thirteenth embodiment of the data processing apparatus provided by the present invention. The embodiment implements a semiconductor device system comprising the so-called semiconductor memory device and another information processing device.

The embodiment includes a random transfer control device 18001 comprising a source address register 18002, a destination address register 18003, a multiplexer 18004, an adder 18005, a random-number generation unit 18006, an exclusive logical OR computation (EOR) gate 18007, an address buffer 18008, a counter 18009, another adder 18010, a data buffer 18011 and a control circuit 18012. The source address register 18002 and the destination address register 18003 are used for storing a transfer source address and a transfer destination address respectively. The multiplexer 18004 is used for selecting a transfer source address or a transfer destination address stored in the source address register 18002 and the destination address register 18003 respectively. The adder 18005 is used for updating the transfer source address and the transfer destination address stored in the source address register 18002 and the destination address register 18003 respectively. The random-number generation unit 18006 generates a random number supplied to the EOR gate 18007. The EOR gate 18007 computes an exclusive logical OR of a transfer address received from the multiplexer 18004 and the random number received from the random-number generation unit 18006 in order to randomize the transfer order of transfer addresses. The address buffer 18008 is used for temporarily storing an address with the order thereof changed by randomization. The counter 18009 counts the number of data transfers. The data buffer 18011 is used for storing data corresponding to an address stored in the address buffer 18008. The other adder 18010 is used for decrementing the contents of the counter 18009 by 1. The control circuit 18012 is used for controlling the other components of the random transfer control device 18001. A transfer of data begins with operations to set a transfer source address in the source address register 18002, a transfer destination address in the destination address register 18003 and the number of bytes to be transferred in the counter 18009. The initial value of the number of bytes to be transferred is the power of 2. The initial value of the transfer source address set in the source address register 18002 has to be a number resulting in a remainder of 0 if divided by the number of bytes to be transferred. By the same token, the initial value of the transfer destination address set in the destination address register 18003 must be a number resulting in a remainder of 0 if divided by the number of bytes to be transferred. Next, transfer operations of the control circuit will be described in order.

STEP 0: First of all, the control circuit 18012 requests the random-number generation unit 18006 to generate a random number. Upon this request, the random-number generation unit 18006 generates a random number smaller than the number of bytes to be transferred and holds the random number.

STEP 1: Then, the control circuit 18012 outputs a select signal to the multiplexer 18004, requesting the multiplexer 18004 to select the transfer source address from the source address register 18002. The EOR gate 18007 computes an exclusive logical OR of a transfer address received from the multiplexer 18004 and a random number received from the random-number generation unit 18006, supplying the sum to the address buffer 18008 as a randomized address.

STEP 2: Then, the control circuit 18012 drives the address buffer 18008 to output the randomized address to an address signal line 18032. After data stored in an information memory device 18021 at the address on the address signal line 18032 is asserted on a data signal line 18031, the control circuit 18012 outputs a latch signal to the data buffer 18011 to store the data into the data buffer 18011. The adder 18005 then increments the transfer source address stored in the source address register 18002 by 1. To put it in detail, the control circuit 18012 executes control to add 1 to the transfer source address stored in the source address register 18002 and store the result of addition back into the source address register 18002.

STEP 3: Then, the control circuit 18012 outputs a select signal to the multiplexer 18004, requesting the multiplexer 18004 to select the transfer destination address from the destination address register 18003. The EOR gate 18007 computes an exclusive logical OR of a transfer address received from the multiplexer 18004 and the random number received from the random-number generation unit 18006, supplying the sum to the address buffer 18008 as a randomized address.

STEP 4: Then, the control circuit 18012 drives the address buffer 18008 to output the randomized address to the address signal line 18032 and the data buffer 18011 to output the data stored therein to the data signal line 18031. The control circuit 18012 further outputs a control signal to write the data on the data signal line 18031 into the memory device 18021 or a memory in an information processing device 18022 at the address appearing on the address signal line 18032.

STEP 5: Then, the adder 18005 increments the transfer destination address stored in the destination address register 18003 by 1. To put it in detail, the control circuit 18012 executes control to add 1 to the transfer destination address stored in the destination address register 18003 and store the result of addition back into the destination address register 18003.

STEP 6: The number of bytes to be transferred in the counter 18009 is decremented by 1 by the adder 18010. To put it in detail, the control circuit 18012 executes control to add −1 to the number of bytes to be transferred in the counter 18009 and store the result of addition back into the counter 18009.

STEP 7: The control circuit 18012 forms a judgment as to whether or not the contents of the counter 18009 have become equal to 0. If the contents of the counter 18009 have become equal to 0, the flow of the processing goes back to STEP 1.

As is obvious from the above description, the order to transfer pieces of data is changed by a random number generated by a random-number generation unit at a value varying from transfer to transfer. That is to say, the transfer order is different from the original order of transfer source and destination addresses. Thus, the actual current consumption pattern is different from the current consumption pattern that would be observed if the transfer order had not been changed. As a result, it is difficult to infer the original data from the actual current consumption pattern.

In accordance with the present invention, it is therefore possible to provide an information processing device having a high level of security. In addition, the present invention also makes it possible to provide an information memory device offering a high level of security. Moreover, according to the present invention, it is also possible to provide a card and an information processing system which have a high level of security.

TABLE 1

| PBD | DATA | CDD | Output for charging and discharging device in this invention |
|---|---|---|---|
| 0 | 0 | 0 | 1 |
| 0 | 0 | 1 | 0 |
| 0 | 1 | 0 | 0 |
| 0 | 1 | 1 | 1 |
| 1 | 0 | 0 | 0 |
| 1 | 0 | 1 | 1 |
| 1 | 1 | 0 | 1 |
| 1 | 1 | 1 | 0 |

TABLE 2

| X | Y | X ExOR Y |
|---|---|---|
| 0 | 0 | 0 |
| 1 | 0 | 1 |
| 0 | 1 | 1 |
| 1 | 1 | 0 |

TABLE 3

| X | Not X |
|---|---|
| 0 | 1 |
| 1 | 0 |

TABLE 4

| Address | Data from CPU |
|---|---|
| F4 | 5D |
| F5 | A0 |
| F6 | FE |

TABLE 5

| SKEYBIT | DATA |
|---|---|
| (1 bit) | (8 bit) |

What is claimed is:

1. A semiconductor chip comprising:
an information processing device;
an information memory device;
an encryption device;
a decryption device; and
a data bus,
wherein two value information corresponds to two different voltages in the semiconductor chip,
wherein data is transferred from the information processing device to the information memory device through the data bus and stored in the information memory device after the data has been encrypted by the encryption device, and
wherein data read from the information memory device is input into the information processing device through the data bus after the data has been decrypted by the decryption device; wherein the sum of the amount of power consumed by a charging and discharging device and the amount of power as a current flowing through any signal line of the memory device is fixed by utilizing bits inversion of a digital signal representing the data and supplying the signal to an electrical charge and discharge device; wherein the signal line is electrically charged and discharged with the encrypted data different from an original data; and reducing the power consumption.

2. The semiconductor chip according to claim 1, wherein the encryption performed by the encryption device is an exclusive OR operation of the data output from the information processing device and key data, and
wherein the decryption performed by the decryption device is exclusive OR operation by the data read from the information memory device and a key data.

3. The semiconductor chip according to claim 1, wherein the encryption performed by the encryption device is an exclusive OR operation of the data output from the information processing device and key data appended to part of destination address data of the data in the information memory device; and
- wherein the decryption performed by the decryption device is an exclusive OR operation of the data read from the information memory device and key data appended to a part of source address data of the data in the information memory device.

4. The semiconductor chip according to claim 2, further comprising:
- a random number generator,
- wherein the key data is a random number generated by the random number generator.

5. The semiconductor chip according to claim 2, further comprising:
- a key buffer which is writable from the information processing device,
- wherein the key buffer stores the key data transferred from the information processing device.

6. The semiconductor chip according to claim 1, wherein the encryption device determines whether to encrypt the data output from the information processing device according to the destination address of the data in the information memory device, and
- wherein the decryption device determines whether to decrypt the data read from the information memory device according to the source address of the data in the information memory device.

7. The semiconductor chip according to claim 1, wherein the encryption device determines whether to encrypt the data output from the information processing device according to a data pattern, and
- wherein the decryption device determines whether to decrypt the data read from the information memory device unit according to data pattern.

8. A semiconductor chip comprising:
- an information processing device;
- an information memory device;
- a first encryption device;
- a second encryption device;
- a first decryption device;
- a second decryption device; and
- a data bus,
- wherein two value information corresponds to two different voltages in the semiconductor chip,
- wherein data output from the information processing device is encrypted by the first encryption device and output to the data bus,
- wherein the data encrypted by the first encryption device is transferred to the first decryption device through the data bus, decrypted by the first decryption device and stored in the memory device,
- wherein the data read from the information memory device is encrypted by the second encryption device and output to the data bus, and
- wherein the data encrypted by the second encryption device is transferred to the second decryption device through the data bus, decrypted by the second decryption device and input to the information processing device; wherein the sum of the amount of power consumed by a charging and discharging device and the amount of power as a current flowing through any signal line of the memory device is fixed by utilizing bits inversion of a digital signal representing the data and supplying the signal to an electrical charge and discharge device; wherein the signal line is electrically charged and discharged with the encrypted data different from an original data; and reducing the power consumption.

9. The semiconductor chip according to claim 8, wherein the encryption performed by the first encryption device is an exclusive OR operation of a data output from the information processing device and key data,
- wherein the encryption performed by the second encryption device is an exclusive OR operation of the data transferred from the first encryption device and key data, and
- wherein the decryption performed by the second decryption device is an exclusive OR operation of the data transferred from the second encryption device and the key data.

10. The semiconductor chip according to claim 9, further comprising:
- a random number generation,
- wherein the key data is a random number generated by the random number generator.

* * * * *